United States Patent
McKnight et al.

(10) Patent No.: US 12,497,341 B2
(45) Date of Patent: Dec. 16, 2025

(54) REACTION METHODS FOR PRODUCING NITROGENOUS PHOSPHORYL COMPOUNDS THAT ARE IN SITU FLUID COMPOSITIONS

(71) Applicant: Soilgenic Technologies, LLC, High Point, NC (US)

(72) Inventors: Gary David McKnight, High Point, NC (US); Randall Linwood Rayborn, Burlington, NC (US)

(73) Assignee: SOILGENIC TECHNOLOGIES, LLC, High Point, NC (US)

( * ) Notice: Subject to any disclaimer, the term of this patent is extended or adjusted under 35 U.S.C. 154(b) by 0 days.

(21) Appl. No.: 19/069,544

(22) Filed: Mar. 4, 2025

(65) Prior Publication Data

US 2025/0197306 A1    Jun. 19, 2025

Related U.S. Application Data

(63) Continuation of application No. 18/890,344, filed on Sep. 19, 2024, now Pat. No. 12,258,300, which is a continuation of application No. 17/888,342, filed on Aug. 15, 2022, now Pat. No. 12,098,109, which is a continuation-in-part of application No. 17/695,783, filed on Mar. 15, 2022.

(60) Provisional application No. 63/161,064, filed on Mar. 15, 2021.

(51) Int. Cl.
| | |
|---|---|
| *C05F 3/00* | (2006.01) |
| *C05C 3/00* | (2006.01) |
| *C05D 9/00* | (2006.01) |
| *C07F 9/28* | (2006.01) |

(52) U.S. Cl.
CPC ............. *C05F 3/00* (2013.01); *C05C 3/00* (2013.01); *C05D 9/00* (2013.01); *C07F 9/28* (2013.01)

(58) Field of Classification Search
CPC ..... C05F 3/00; C05C 3/00; C05D 9/00; C07F 9/28
See application file for complete search history.

(56) References Cited

U.S. PATENT DOCUMENTS

| | | | |
|---|---|---|---|
| 4,517,003 A | 5/1985 | Kolc et al. | |
| 4,517,004 A | 5/1985 | Swerdloff et al. | |
| 4,530,714 A | 7/1985 | Kolc et al. | |
| 5,698,003 A | 12/1997 | Omilinsky | |
| 5,770,771 A | 6/1998 | Sulzer et al. | |
| 5,872,293 A | 2/1999 | Sulzer et al. | |
| 5,883,297 A | 3/1999 | Sulzer et al. | |
| 5,955,630 A | 9/1999 | Cheng et al. | |
| 6,802,882 B2 | 10/2004 | Barth et al. | |
| 8,075,659 B2 | 12/2011 | Wissemeier et al. | |
| 8,513,460 B2 | 8/2013 | Kysilka et al. | |
| 9,637,420 B2 | 5/2017 | McKnight et al. | |
| 9,650,306 B2 | 5/2017 | McKnight et al. | |
| 10,633,300 B2 | 4/2020 | McKnight et al. | |
| 10,974,999 B2 | 4/2021 | McKnight et al. | |
| 11,312,667 B2 | 4/2022 | McKnight et al. | |
| 12,098,109 B2 | 9/2024 | McKnight et al. | |
| 2018/0319716 A1* | 11/2018 | McKnight | C05C 11/00 |
| 2019/0127289 A1* | 5/2019 | McKnight | C05G 5/37 |
| 2019/0169081 A1 | 6/2019 | McKnight et al. | |
| 2023/0140913 A1 | 5/2023 | McKnight et al. | |

FOREIGN PATENT DOCUMENTS

| | | |
|---|---|---|
| DE | 102005053541 A1 | 5/2007 |
| DE | 102006015362 A1 | 10/2007 |
| GB | 898302 A | 6/1962 |
| WO | 2007054392 A1 | 5/2007 |

* cited by examiner

*Primary Examiner* — Wayne A Langel
(74) *Attorney, Agent, or Firm* — Jason A. Smith; Shumaker, Loop & Kendrick, LLP

(57) ABSTRACT

A method of making one or more alkyl thiophosphoric triamides.

20 Claims, No Drawings

REACTION METHODS FOR PRODUCING NITROGENOUS PHOSPHORYL COMPOUNDS THAT ARE IN SITU FLUID COMPOSITIONS

The present invention claims priority under 35 USC 120 and is a continuation in part of U.S. application Ser. No. 17/695,783 filed Mar. 15, 2022, which in turn claims priority under 35 USC 119(e) to U.S. Provisional Application No. 63/161,064 filed Mar. 15, 2021, the entire contents of all of which are incorporated by reference in their entireties.

FIELD OF THE INVENTION

The invention relates to low cost processes for the manufacture of nitrogenous phosphoryl compounds that are in situ fluid compositions by elimination of the costly process steps that exist with the current state of art. Said low cost processes result in ready to use fluid products that can be applied directly to a substrate. Of particular interest are nitrogenous phosphoryl compounds that possess biologically active properties.

Animal waste contains most of the essential nutrients required for plant growth. However, animal waste also contains microbes that convert urea to ammonium ions, nitrification of the ammonium ions to $NO_2$ and $NO_3$ and denitrification of $NO_2$ or $NO_3$ to $N_2$. $N_2O$ is produced as an intermediate of nitrification and denitrification processes and $N_2O$ is a 300 times more potent greenhouse gas than $CO_2$. The instant invention discloses low-cost, fluid suspension compositions comprising a combination of urease, nitrification and denitrification inhibitors that decrease the loss of nitrogen from animal waste and lessen the biological formation of the greenhouse gas $N_2O$. These compositions comprise nitrogenous phosphoryl compounds and nitrification inhibitors that utilize manufacturing processes for the formation of low cost, fluid suspensions comprising one or more inhibitor particles selected from the group consisting of a) one or more urease inhibitor particles, b) one or more nitrification inhibitor particles, c) one or more fused particles, and d) combinations thereof, wherein said one or more fused particles composition comprise one or more urease inhibitors and one or more nitrification inhibitors, and wherein said one or more inhibitor particles are formed in situ in the manufacturing process of the fluid suspension compositions eliminating many of the costly processing steps that exist in the current state of the art. These low-cost, fluid suspension compositions of urease and nitrification inhibitors can further comprise additional nitrification and denitrification inhibitors. Combining additional nitrification and denitrification inhibitors in ready to use fluid suspension compositions provides multiple modes of action that can be applied directly to animal waste increasing the effectiveness in slowing biological processes of nitrification and denitrification.

BACKGROUND OF THE INVENTION

Current methods to make liquid nitrogenous phosphoryl compositions are based on one or more steps selected from the group consisting of:

1. reacting phosphoryl trichloride and/or thiophosphoryl trichloride with one or more alkylamines utilizing a liquid reaction medium for the preparation of monoalkylamide phosphoryl dichlorides and/or monoalkylamide thiophosphoryl dichlorides and the resulting by-product alkyl ammonium chlorides, wherein said reaction medium comprises one or more volatile, non-reactive, aprotic organic liquids,
   a. if a hydrochloric acid absorber is not utilized to keep the one or more alkylamines from forming the corresponding one or more alkylammonium chloride salts, then recovery of the alkylamine from the by-product, alkyl ammonium chloride, is required to free the one or more alkylamines to react with phosphoryl chloride functional groups,
2. reacting the remaining one or more alkylamide phosphoryl dichloride and/or one or more alkylamide thiophosphoryl dichloride with ammonia or ammonium generating compounds to form the desired nitrogenous phosphoryl compounds,
3. separating inorganic chloride by-products from the desired nitrogenous phosphoryl compounds,
4. removing the volatile, non-reactive aprotic organic liquid and HCl absorbent (if a tertiary amine used),
5. purifying nitrogenous phosphoryl compounds and isolating the solid, waxy, temperature sensitive, sticky nitrogenous phosphoryl compounds to generate a flowable powder composition,
6. packaging and transporting the flowable powder composition comprising nitrogenous phosphoryl compounds,
7. dissolving the flowable powder composition comprising nitrogenous phosphoryl compounds within a non-aqueous organic liquid delivery system capable of imparting a continuous liquid solution coating comprising nitrogenous phosphoryl compounds onto the surface of substrates.

A generic flow diagram for the process to yield liquid nitrogenous phosphoryl compositions is shown in Scheme 1:

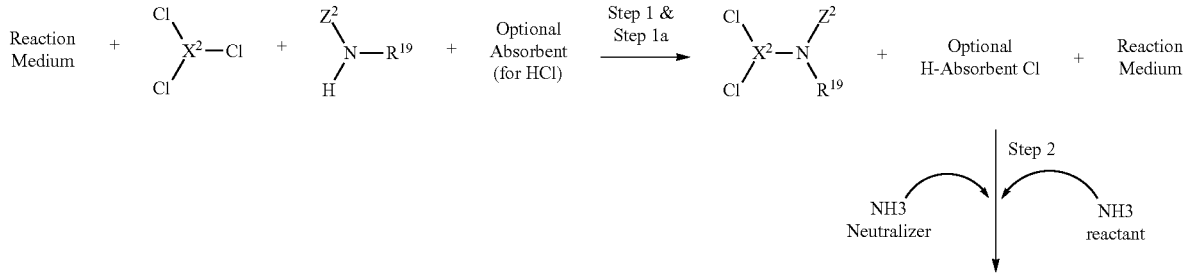

Scheme 1 Generic Nitrogenous Phosphoryl Process

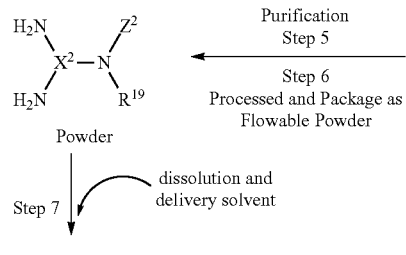

Powder

Step 7 ⇅ dissolution and delivery solvent

Liquid nitrogenous phosphoryl composition

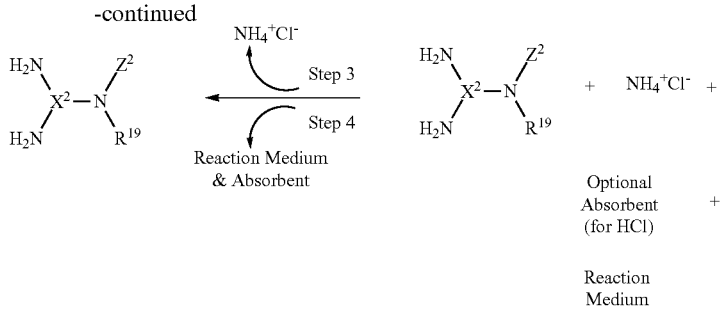

wherein:
a) $X^2$ is one or more members selected from the group consisting of i) P=O and ii) P=S, wherein the nitrogen of the nitrogenous portion of said compounds are bonded to the "P",
b) $Z^2$ is H (hydrogen)
$R^{19}$ is one or more alkyl radicals selected from the group consisting of i) —$C_1H_3$, —$C_2H_5$, —$C_3H_7$, and —$C_4H_9$.

The current processing technologies yield high purity nitrogenous phosphoryl compounds, wherein the nitrogenous phosphoryl compounds' performance is adequate at low levels application to plant growth medium. However, steps to drive the synthesis to a higher purity, flowable powder composition and consequently dissolve the powder into a solvating delivery system carries a cost burden that limits its utility on low cost substrates such as urea.

Patent No. GB898302, Hoechst Ag, proposed a method for producing nitrogenous phosphoryl compounds by reacting the N-substituted phosphoric or thiophosphoric acid amide dichloride with ammonia using chloroform as an aprotic, non-reactive organic liquid. The process included separating the ammonium chloride formed and distilling off the chloroform. The crude product was obtained as residue and could be purified by recrystallization in organic liquids such as benzene. The nitrogenous phosphoryl compounds generated were suggested to be used as components in fixing agents for fixing pigments in a wear-resistant manner on fibrous material. While this process will generate a composition containing the desired nitrogenous phosphoryl compounds, the utilization of chloroform and benzene as processing organic liquids have health and environmental issues, and the resulting residue has to be purified and then dispersed in an organic liquid to liquefy for ease of use.

A series of patents by Kolc and Swerdloff (U.S. Pat. Nos. 4,517,003, 4,517,004, and 4,530,714) propose generating several nitrogenous phosphoryl compounds using generic laboratory methods where temperatures and pressures are not critical with suggested temperature ranges of −80° C. to 200° C., wherein the exact proportions of the reactants are not critical, and the order of reaction is not critical. They suggested the potential inclusion of inert reaction organic liquids such as ethyl ether, carbon tetrachloride, methylene chloride, benzene, dioxane, toluene, xylene, tetrahydrofuran, methyl sulfoxide (DMSO), and dimethylformamide. These types of reactions produce a hydrogen chloride by-product, which will react with amines producing amine chloride salts. If this hydrogen chloride by-product is not absorbed or removed, the formation of the amine chloride salts will interfere with the further reaction of the amines with the phosphoro-chlorides. Kolc and Swerdloff suggest using hydrogen chloride acceptors which are non-reactive with phosphoro-chlorides to allow the desired amine to remain free to participate in the reaction. These hydrogen chloride acceptors can form precipitates in the Kolc and Swerdloff mixtures, which they suggest can be removed by such conventional procedures as extraction, filtration, or centrifugation. The reaction methods are small-scale laboratory experiments designed to yield a composition comprising the desired compounds, wherein the desired compounds can be at least partially separated by such conventional procedures as evaporation and be at least partially purified by conventional procedures such as distillation and extraction, for the purpose of testing the compound's biological activity. However, these reaction methodologies are poorly suited for commercial industrial processes. These methods work well in a laboratory where poor reaction controls can be overcome with purification steps to yield the desired nitrogenous phosphoryl compounds, but they prove to be difficult to be instituted in an industrial manufacturing environment due to high processing cost, low yields, and the hazards associated with the recommended organic liquids, such as flammability and toxicity. More dangerously, two of the suggested organic liquids enumerated as being non-reactive reaction mediums, (dimethyl sulfoxide and dimethylformamide) are in fact known to be phosphoryl chloride reactive organic liquids in a highly exothermic matter.

Sulzer (U.S. Pat. No. 5,770,771) describes a continuous process for the preparation of hydrocarbylthiophosphoric triamides where ammonium and N-hydrocarbylammoniothiophosphoryl dichloride are mixed in a reaction chamber in a ratio of 16:1, producing a reaction mixture comprising hydrocarbylthiophosphoric triamide and a trialkylamine (HCl absorber). The ammonium chloride co-product formed is kept in solution in the ammonium which has been added in large excess. The residence time of the reaction mixture in the reactor is from 1 to 10 minutes. The product of interest is separated off by means of distillation. Although not stated, the pressure requirement for the reaction vessel to contain the 11 mole excess of ammonia would be 3700 to 4300 psi. This high pressure requirement necessitates the utilization of high pressure specialty equipment and safety equipment resulting in significantly higher costs to produce the hydrocarbylthiophosphoric triamides.

Sulzer (U.S. Pat. No. 5,872,293) teaches the use of at least 16-fold molar excess of ammonia during the ammonia reaction to form the desired nitrogenous phosphoryl compounds. The ammonia is present in a sufficient excess amount relative to the ammonium chloride to form a separate liquid phase in which the ammonium chloride solids dissolve. The ammonium chloride liquid phase is separated from the remainder of the mixture comprising at least one inert liquid organic solvent, a tertiary amine, and the desired nitrogenous phosphoryl compounds. The pressure requirement for the reaction vessel to contain the 11 mole excess of ammonia would be 3700 to 4300 psi. This high pressure requirement necessitates the utilization of high pressure specialty equipment and safety equipment resulting in much higher costs to produce the hydrocarbylthiophosphoric triamides.

Sulzer (U.S. Pat. No. 5,883,297) teaches a process that involves separated or recovered nitrogenous phophoryl compounds continuously introduced as a stream of liquid containing nitrogenous phophoryl compounds into a wiped film evaporator operating at a temperature range of about 60°–140° C., and at a pressure that avoids solids formation on the heating surface of the wiped film evaporator. The process allows for the continuous collection of the nitrogenous phosphoryl compounds.

Huttenlock et al. (WO 2007/054392) describe a process for the preparation of alkylthiophosphoric triamides from ammonia and alkylthiophosphoryl dichloride by which gaseous ammonia is passed through an amido-dichloride solution and allowed to react. The residence time of the reaction mixture in the reactor is 60 minutes. The nitrogenous phosphoryl compounds of interest are isolated by means of phase separation, precipitated in the phase by lowering the temperature, and purified via a filtration step.

Cheng (U.S. Pat. No. 5,955,630) teaches a method for the recovery of the desired nitrogenous phosphoryl compounds wherein the reaction mixtures are continuously fed to a wiped film evaporator which removes the volatiles (i.e., the reaction medium solvent and trialkylamine) from the desired nitrogenous phosphoryl compounds and process conditions to ensure that there is no solids formation on the heated surfaces of the wiped film evaporator. The invention also reveals the liquid mixture containing desired nitrogenous phosphoryl compounds is continuously fed to the wiped film evaporator wherein hot nitrogen (about 65° C., atmospheric pressure) is passed upwardly in countercurrent flow to the down-flow product stream to further reduce the small residual solvent content of the desired nitrogenous phosphoryl compounds to about a 0.5% solvent maximum.

Kysilka (U.S. Pat. No. 8,513,460) teaches a method to make a purity of at least 98% of the desired nitrogenous phosphoryl compounds by utilizing toluene (aromatic solvent) as Solvent System One for two equivalents of hydrocarbylamine to react with one equivalent of phosphoryl or thiophosphoryl chloride and then react with four equivalents of ammonia. One equivalent of hydrocarbylamine forms the monoamide of phosphoryl or thiophosphoryl chloride, which is soluble in the aromatic phase. The second equivalent of hydrocarbylamine forms the corresponding hydrocarbylammonium chloride which is insoluble in the aromatic phase and is removed by filtration. The resulting hot filtrate is cooled to a temperature range of 0 to 25° C. where the N-(hydrocarbyl)phosphoric or thiophosphoric triamide precipitates. Purity was increased by repeated recrystallization of the crude product from toluene.

Wissemeier (U.S. Pat. No. 8,075,659) discloses the preparation of a mixture of a first primary or secondary amine and a second primary or secondary amine. A method of preparing the preparation utilizing known process technologies of reacting thiophosphoryl chloride first with a mixture and subsequently with ammonia-preparations with improved urease-inhibitory effect which comprise at least two different (thio)phosphoric triamides. The method also relates to urea-comprising fertilizers which comprise these preparations. The invention furthermore relates to a method of preparing these preparations, to the use of these preparations in the fertilization with urea-comprising fertilizers, and to the use of urea-comprising fertilizers which comprise these preparations in agriculture or in horticulture.

Many of these inventions are focused on producing high purity, solid nitrogenous phosphorous compounds. The drive to achieve high purity, solid nitrogenous phosphoryl compounds that are marketed as flowable powders requires difficult processing steps that drive up the manufacturing cost. What is required are low cost, fluid nitrogenous phosphoryl compositions that meets expected levels of performance and compositions that can be applied to substrates utilizing simple blending equipment. Such an invention would allow farmers and small co-ops access to state of the art fertilizer at a low cost and will lead to mass adoption of treated urea, improving overall food production while lowering the amount of pollution in our water and air.

The agricultural industry is under extreme pressure to increase food production to feed a growing world population while minimally impacting the environment. Natural fertilizers such as animal waste can assist in increasing crop yields as animal waste contains most of the essential nutrients required for plant growth. Utilizing animal waste to improve soil fertility can also impart other benefits to soil such as soil tilth, water-holding/retaining capacity, oxygen content, and microbial biomass. However, animal waste also contains microbes that convert urea to ammonium ions, nitrification of the ammonium ions to $NO_2$ and $NO_3$ and denitrification of $NO_2$ or $NO_3$ to $N_2$. $N_2O$ is produced as an intermediate in the nitrification and denitrification processes, and $N_2O$ is a 300 times more potent greenhouse gas than $CO_2$. Some have estimated that agricultural activities contribute 8-18% of greenhouse gas emission. Some studies have shown 30 to 50% of the global agricultural $N_2O$ emission comes from animal waste. Accordingly, it would be beneficial to reduce the amount of $N_2O$ that is generated by animal waste that is used in agriculture.

Liquid non-aqueous solution compositions comprising urease and nitrification inhibitors have been developed for use on animal waste to slow the biological degradation of urea and ammonium ions for stabilization of a nitrogen value of animal waste while simultaneously decreasing formation of $N_2O$. McKnight (U.S. Pat. Nos. 9,637,420; 9,650,306; 10,633,300; 10,974,999; and 11,312,667) describes improved liquid delivery compositions of urease inhibitors and/or nitrification inhibitors designed for manure-based fertilizers. The utilization of non-aqueous liquid solution compositions of nitrification inhibitors and urease inhibitors that are fluid at temperatures as low as −20° C. allows for ease of application to animal waste throughout the year. However, these compositions are based on a costly urease inhibitor, NBPT, and they require processing steps to dissolve the solid NBPT and the nitrification inhibitors into a solution. Although fluid liquid systems are preferred, the cost of these liquid systems limits their utility for treating animal waste.

Barth (U.S. Pat. No. 6,802,882) teaches the use of polyacids within a mixture wherein the mixture contains selected pyrazole derivatives functioning as nitrification inhibitors to yield stabilizers of liquid manure. These mixtures also contain water, which maintains the liquid fluidity of the composition.

McKnight (U.S. Patent Application Publication 2019/0169081) discloses dry, flowable additive compositions for slowing the biological degradation of urea and manure, which results in stabilization of a nitrogen value of animal waste while simultaneously decreasing formation of $N_2O$. These dry, flowable additive compositions are shown to comprise one or more nitrification inhibitor particles coated with one or more urease inhibitors, wherein the one or more urease inhibitors have been dissolved in one or more non-aqueous organic solvents to form liquid solutions. McKnight also teaches that the dry, flowable additive compositions can be dissolved in water and applied as an aqueous solution, wherein the aqueous solution could be applied to animal waste by an automated spraying, metering system and/or by a manual sprayer. While the aqueous composition innovation can deliver a more cost-effective level of inhibition to animal waste compared to the non-aqueous inhibitor solutions, the application of a dry flowable powder to animal waste is time consuming and requires a lot of manual labor. This innovation also relies on costly raw starting materials that are needed to produce a coated dry additive. While one can overcome the inconvenience of powder by dissolving it in water, this approach carries the cost of requiring another processing step.

BRIEF SUMMARY OF THE INVENTION

The present invention relates to a low cost, fluid delivery system comprising an optimized level of urease and nitrification inhibition properties that can be applied to animal waste by an automated spraying or metering/mixing system. We expect this technology to be widely adopted by animal waste generators and farmers because it efficiently uses animal waste products in a low cost manner with potential for greatly enhancing crop yield. The mass adoption of this technology would result in better quality natural fertilizers while improving overall environmental impact of fertilization.

In an embodiment, the present invention relates to stable, fluid suspension compositions that comprise one or more inhibitor particles selected from the group consisting of a) one or more urease inhibitor particles, b) one or more nitrification inhibitor particles, c) one or more fused particles, and d) combinations thereof, wherein said one or more fused particles compositions comprise one or more urease inhibitors and one or more nitrification inhibitors. In another embodiment, said fluid suspension compositions are be applied directly to animal waste utilizing automated spraying systems or can be metered into liquid animal waste to slow down the biological degradation of urea and ammonium ions, resulting in the stabilization of a nitrogen value of animal waste while simultaneously decreasing formation of $N_2O$.

In an embodiment, said fluid suspension compositions further comprise one or more additional nitrification inhibitors selected from the group consisting of 2-chloro-6-(trichloromethyl)pyridine, 4-amino-1,2,4-triazole-HCl, 2,4-diamino-6-trichloromethyltriazine CL-1580, dicyandiamide (DCD), thiourea, 1-mercapto-1,2,4-triazole, ammonium thiosulfate, one or more dimethyl pyrazole salts selected from the group consisting of i) organic salts, ii) inorganic salts and iii) combinations thereof and 2-amino-4-chloro-6-methylpyrimidine, wherein the fluid suspension compositions can be formulated to provide multiple modes of action thereby providing increased protection against nitrification and denitrification biological processes.

In an embodiment, lower cost methods to make ready-to-use fluid compositions comprising nitrogenous phosphoryl compounds are disclosed. These fluid compositions possess the pre-requisite properties to enable their application onto the surface of granular solids utilizing simple blending equipment that commingle the fluid composition with solid granules, allowing farmers and small co-ops access to high tech, state of the art fertilizers at low cost.

In an embodiment, lower cost methods to make ready-to-use compositions comprise one or more process steps selected from the group consisting of a) maintaining the desired nitrogenous phosphoryl compounds in a fluid state throughout its processing b) not utilizing a low boiling point, non-reactive aprotic liquid as the reaction medium that requires its removal from the ready-to-use composition c) not removing the inorganic chloride by-products, d) not using expensive HCl absorbers, e) avoiding the difficulties and cost associated with the solid nitrogenous phosphoryl compounds' purification steps, f) avoiding the steps of collecting and packaging the waxy, sticky, temperature and oxygen sensitive solid nitrogenous phosphoryl compounds as flowable powder and g) avoiding the step of dissolving the nitrogenous phosphoryl compounds powder into a non-aqueous, organo liquid delivery system. In a variation, the disclosed methods result in fluid nitrogenous phosphoryl compositions wherein the nitrogenous phosphoryl compounds are dispersed within a non-aqueous, organo liquid delivery system (NOLDS) as a solution, a colloid or a suspension. In a variation, the nitrogenous phosphoryl compounds' compositions are fluid at a temperature range of about −40 to 100° C. In another variation, the fluid formulations' compositional weight percent comprises nitrogenous phosphoryl compounds at about 20% to about 95%.

In an embodiment, the present invention provides low cost processes for preparing fluid nitrogenous phosphoryl compositions wherein the nitrogenous phosphoryl compounds comprise one or more structures selected from the group consisting of:

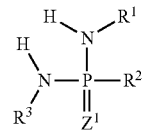

Structure I and

Structure II wherein the Structure I $Z^1$ functional group is not present

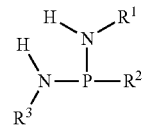

a. wherein:
  i. $R^2$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX^1$, $OCH_3$, $OC_2H_5$, $OC_3H_7$, $OC_4H_9$, $OC_5H_{11}$, $OC_6H_{13}$, and $HNR^4$, wherein
    (1) $R^4$ is one or more members selected from the group consisting of H, $CH_3$, $C_2H_5$, $C_3H_7$, $C_4H_9$, $C_5H_{11}$ and $C_6H_{13}$,
    (2) $X^1$ is one or more members selected from the group consisting of
      (a) H, Na, Li, and K,
      (b) $NH_4$, (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine, ii. $R^1$ is one or more members selected from the group consisting of $CH_3$, $C_2H_5$, $C_3H_7$, $C_4H_9$, $C_5H_{11}$ and $C_6H_{13}$, iii. $R^3$ is one or more members selected from the group consisting of H, $CH_3$, $C_2H_5$, $C_3H_7$, $C_4H_9$, $C_5H_{11}$ and $C_6H_{13}$, iv. $Z^1$ is one or more members selected from the group consisting of Oxygen and Sulfur or optionally $Z^1$ is not present.

In an embodiment, one or more nitrogenous phosphoryl compounds are the reaction product of one or more phosphoryl chloride functional groups with one or more nitrogenous compounds within Organic Liquid System One wherein said Organic Liquid System One comprises the liquid reaction medium for making the desired nitrogenous phosphoryl compounds. In a variation, the composition of Organic Liquid System One comprises one or more aprotic organic liquids. In another variation, the composition of Organic Liquid System One comprises one or more aprotic organic liquids that are non-reactive with phosphoryl chlorides. In another variation, one or more non-phosphoryl chloride reactive aprotic organic liquids of Organic Liquid System One are optionally added individually during the reaction steps to produce one or more fluid nitrogenous phosphoryl compositions.

In an embodiment, Organic Liquid System Two is optionally added after the reaction consumes all or most of the phosphoryl chlorides functional groups to improve the methods of making one or more fluid nitrogenous phosphoryl compounds. Organic Liquid System Two impart one or more properties to the nitrogenous phosphoryl liquid compositions selected from the group consisting of a) assisting in removing reaction by-product chloride salts from the fluid compositions, b) maintaining the by-product chloride salts in a stable or semi-stable suspension c) lowering viscosity and improving fluidity of the fluid compositions at temperatures of $(-20)°$ C. or less, d) improving fluidity under summer storage conditions, e) improving evenness and homogeneity of the fluid coating onto urea, f) improving temperature stability of the nitrogenous phosphoryl compounds, and g) improving shipping, storage, and pumping of fluid nitrogenous phosphoryl compositions.

In an embodiment, the composition of Organic Liquid System Two comprises one or more organic liquids selected from the group consisting of a) aprotic organic liquids and b) protic organic liquids. In another variation, the non-aqueous organic liquid delivery system that delivers the dispersed, desired nitrogenous phosphoryl compounds as an even, continuous coating solution or as a stable suspension to a substrate comprises Organic Liquid System Two.

In an embodiment, one of the novel aspects of the methods to make compounds and compositions of the present invention is the lower cost of manufacturing one or more fluid nitrogenous phosphoryl compositions through the elimination of some of the standard processing steps. In a variation, the innovative methods to make yield adequate levels of the desired nitrogenous phosphoryl compounds to meet expected levels of performance in plant growth mediums at reduced cost.

In an embodiment, the disclosed methods do not require many of the required steps of the prior art. Thus, the present methods comprise one or more steps selected from the group consisting of:

a) no filtering of dangerous composition containing toxic, flammable reaction mediums that require highly specialized equipment to remove the inorganic by-products safely, b) not requiring specialized equipment to handle the purification of the desired nitrogenous phosphoryl compounds' solids, c) not requiring multiple washing with volatile solvents for purification of one or more desired nitrogenous phosphoryl compounds, d) not requiring shipping and storage of the one or more nitrogenous phosphoryl compounds' in solid forms that have been shown to be less stable versus those dispersed in an organic liquid, e) not requiring an overhead equipment for removal of Organic Liquid System One from fluid compositions, e) not requiring separate solids dissolving step to create a solution, or a colloid, or a suspension of the one or more desired nitrogenous phosphoryl compounds, f) not requiring removal of chloride by-products from fluid compositions, g) reducing the amount of waste generation, and h) eliminating the step required to make fluid compositions comprising one or more nitrogenous phosphoryl compounds.

DETAILED DESCRIPTION

Definitions

Phosphoryl chloride functional group(s) refers one or more functional group selected from the group consisting of a) Cl—P=O, Cl—P, and Cl—P=S.

Liquid refers to a state of matter.

Suspension refers to solid particles dispersed within a liquid.

Colloid refers to a mixture that has particles ranging from between 1 and 1000 nanometers in diameter, yet is still able to remain evenly distributed throughout the liquid Fluid refers to a liquid, a colloid or a suspension as defined above.

Solution refers to a solute being completely dissolved in an organic liquid.

Nitrogenous phosphoryl compound refers to a structure wherein one or more nitrogen containing compounds are bonded through nitrogen to a phosphorus atom.

% is used to denote weight percent.

loading refers to the weight percent of one or more nitrogenous phosphoryl compounds dissolved in an organic liquid.

In an embodiment, phosphoryl chlorides comprise one or more members selected from the group consisting of a) phosphorous trichloride ($PCl_3$), b) phosphoryl trichloride ($POCl_3$), and c) thiophosphoryl trichloride ($PSCl_3$)

In an embodiment, the present invention provides low cost methods of making one or more fluid nitrogenous phosphoryl compositions (phosphoryl trichloride and/or thiophosphoryl trichloride compositions) wherein one or more nitrogenous phosphoryl compounds comprise one or more members selected from the group consisting of:

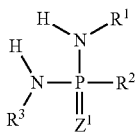

Structure I and

Structure II wherein the Structure I $Z^1$ functional group is not present

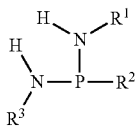

b. wherein:
  i. $R^2$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX^1$, $OCH_3$, $OC_2H_5$, $OC_3H_7$, $OC_4H_9$, $OC_5H_{11}$, $OC_6H_{13}$, and $HNR^4$, wherein
    (1) $R^4$ is one or more members selected from the group consisting of H, $CH_3$, $C_2H_5$, $C_3H_7$, $C_4H_9$, $C_5H_{11}$, $C_6H_5$, and $C_6H_{13}$,
    (2) $X^1$ is one or more members selected from the group consisting of
      (a) H, Na, Li, and K,
      (b) $NH_4$,
      (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
  ii. $R^1$ is one or more members selected from the group consisting of $CH_3$, $C_2H_5$, $C_3H_7$, $C_4H_9$, $C_5H_{11}$ and $C_6H_{13}$,
  iii. $R^3$ is one or more members selected from the group consisting of H, $CH_3$, $C_2H_5$, $C_3H_7$, $C_4H_9$, $C_5H_{11}$ and $C_6H_{13}$,
  iv. $Z^1$ is one or more members selected from the group consisting of Oxygen and Sulfur or optionally $Z^1$ is not present.

In an embodiment, the non-reactive, Organic Liquid System One comprises one or more aprotic organic liquids, wherein said one of more aprotic organic liquids are selected from the group consisting of a) aprotic organic liquids with a boiling point less than or equal to 120° C. and b) aprotic organic liquids with a boiling point greater than 120° C. In a variation, the non-reactive, Organic Liquid System One meets one or more of the properties selected from the group consisting of a) good solvency of the intermediates b) good solvency of final nitrogenous phosphoryl compounds, c) low cost, d) readily available, e) does not degrade the nitrogenous phosphoryl compounds, f) low viscosity, g) poor solvency of the nitrogenous phosphoryl compounds and h) easily recyclable. In a variation, the non-reactive, Organic Liquid System One comprises said one or more aprotic organic liquids with a boiling point less than or equal to 120° C. selected from the group consisting of a) one or more hydrocarbons selected from the group consisting of i) one or more paraffinic liquids, ii) one or more cycloparaffinics, and iii) one or more aromatic hydrocarbons, b) one or more liquid halocarbons c) one or more halohydrocarbons, and d) one or more ethers selected from the group consisting of i) 1,4-dioxane, ii) 1,3-dioxolane, iii) methyltetrahydrofuran, iv) dimethoxyethane, v) 1,3-dioxane, vi) 1,3-dioxolane, vii) 2,2-dimethyl-1,3-dioxolane, viii) diethyl ether, ix) tetrahydrofuran, and x) tetrahydropyran, e) d-limonene, f) 1,2-dimethyloxyethane and f) one or more esters selected from the group consisting of i) $C_1$-$C_6$ alkylformate and ii) $C_1$-$C_6$ alkylacetate. In another variation, the non-reactive, Organic Liquid System One comprises said one or more aprotic organic liquids with a boiling point greater than 120° C. selected from the group consisting of a) one or more alkylene carbonates selected from the group consisting of i) ethylene carbonate, ii) propylene carbonate and iii) butylene carbonate b) one or more 1-alkyl-2-pyrrolidone selected from the group wherein the alkyl functionality is a $C_1$-$C_8$ alkyl radical, c) one or more hydrocarbons selected from the group consisting of i) one or more paraffinic liquids, ii) one or more cycloparaffinics, iii) one or more aromatic hydrocarbons, iv) one or more aliphatic hydrocarbons, v) one or more acyclic hydrocarbons, vi) one or more unsaturated hydrocarbon, and vii) one or more polyalphaolefins, d) one or more $C_1$-$C_{18}$ fatty triglycerides, e) one or more organo phosphorous liquids selected from the group consisting of hexamethylphosphoramide and one or more trialkylphosphates selected from the structure:

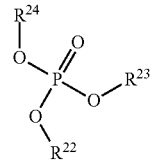

wherein:

$R^{22}$ is alkyl radical —$C_1H_3$ to —$C_6H_{13}$ $R^{23}$ is alkyl radical —$C_1H_3$ to —$C_6H_{13}$ $R^{24}$ is alkyl radical —$C_1H_3$ to —$C_6H_{13}$ f) sulfolane, g) 2-methoxyethyl ether, h) cyclohexylpyrrolidone, i) one or more polyols capped with $C_1$-$C_6$ organic acid wherein the polyol portion is selected from the group consisting of (i) ethylene glycol, (ii) 1,3 propylene glycol, (iii) 1,2 propylene glycol, (iv) butylene glycol, (v) trimethylol propane, (vi) trimethylol ethane, (vii) pentaerythritol, (viii) sorbitol, (ix) sorbitan, (x) glucose, (xi) fructose, (xii) galactose and (xiii) glycerin, j) one or more alkylene glycol alkyl ethers acetates selected from the group consisting of (i) dipropylene glycol methyl ether acetate, (ii) tripropylene glycol methyl ether acetate, and (iii) tripropylene glycol butyl ether acetate, k) isophorone, l) one or more diesters selected from the group consisting of (i) $C_1$-$C_6$ dialkylsuccinate, (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate, m) dimethyl-2-imidazolidinone, n) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and or) one or more dialkylene glycols dialkyl ethers, (glymes) selected from the structure:

$$R^{11}\text{—}O\text{—}(R^{12}\text{—}O)_n\text{—}R^{13} \quad\quad 5$$

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is one or more integers selected from the group of 1 to 10.

In a variation, said Organic Liquid System One comprises one or more aprotic organic liquids with a boiling point greater than 120° C. wherein the non-aqueous organic liquid delivery system for imparting nitrogenous phosphoryl compounds onto the surface of substrates comprises the Organic Liquid System One wherein the remaining Organic Liquid System One has a boiling point greater than 120° C. In a variation, the Organic Liquid System One comprising said one or more aprotic organic liquids with a boiling point greater than 120° C. meets one or more of the requirements selected from the group consisting of:
a) being environmentally safe,
b) having a flashpoint above 145° F.,
c) being rated safe for contact with humans and animals,
d) improving the processability/costing of the method to make the fluid nitrogenous phosphoryl compositions,
   i) increasing the percent nitrogenous phosphoryl compounds and their precursors loading at processing temperatures,
   ii) lowering viscosity of reaction mixtures,
   iii) improving separation phase for removal of reaction by-products,
   iv) incorporating the chloride salt by-products into a stable suspension,
e) serving as the delivery system or a component of a delivery system that delivers the desired nitrogenous compound to the surface of a substrate,
f) being non-reactive with phosphoryl chloride functional groups,
g) assisting in stabilizing the inorganic by-product salts in a liquefied suspension, and
h) not causing the degradation of the nitrogenous phosphoryl compounds.

In an embodiment, the Organic Liquid System One comprises one or more aprotic organic liquids with a boiling point less than or equal to 120° C., which is removed by methods known by those skilled in the art and optionally replaced by Organic Liquid System Two after the reaction has consumed all or most of the phosphoryl chloride functional groups. In a variation, the Organic Liquid System One comprising one or more aprotic organic liquids with a boiling point less than or equal to 120° C. is removed and optionally replaced by Organic Liquid System Two after the removal of all or most of the salt by-products of the reaction to form solutions of the desire nitrogenous phosphoryl compounds. In a variation, the composition of Organic Liquid System Two comprises one or more organic liquids selected from the group consisting of 1) aprotic organic liquids and 2) protic organic liquids wherein one or more of said aprotic organic liquids are selected from the group consisting of:

a) dimethyl sulfoxide,
b) one or more sulfoxide(s) selected from the group consisting of dialkyl, diaryl, or alkylaryl sulfoxide(s) selected from the formula structure:

$$R^9S(O)xR^{10}$$

wherein
i) $R^9$ and $R^{10}$ are each independently a $C_1$-$C_6$ alkylene group, an aryl group or $C_1$-$C_3$ alkylenearyl group,
ii) or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring,
iii) and x is 1 or 2,
c) one or more alkylene carbonates selected from the group consisting of i) ethylene carbonate, ii) propylene carbonate, and iii) butylene carbonate,
d) one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin,
e) one or more alkylene glycol alkyl ethers acetates selected from the group consisting of i) dipropylene glycol methyl ether acetate, ii) tripropylene glycol methyl ether acetate, and iii) tripropylene glycol butyl ether acetate,
f) one or more diesters selected from the group consisting of i) $C_1$-$C_6$ dialkylsuccinate, ii) $C_1$-$C_6$ dialkyladipate, iii) $C_1$-$C_6$ dialkylmethylglutarate, iv) $C_1$-$C_6$ dialkyl glutarate, v) $C_1$-$C_6$ dialkyl ethylsuccinate, and vi) $C_1$-$C_6$ dialkyl maleate,
g) one or more 1-alkyl-2-pyrrolidone selected from the group wherein the alkyl functionality is a $C_1$-$C_8$ alkyl radical,
h) one or more members selected from the group consisting of i) dimethylacetamide, ii) dimethylformamide, iii) dimethyl-2-imidazolidinone, iv) isophorone, v) hexamethylphosphoramide, vi) 2-methoxyethyl ether, vii) N,N-dimethyldecanamide, viii) N,N-dimethyloctanamide, ix) limonene, x) sulfolane
i) one or more trialkylphosphates selected from the group represented by the structure:

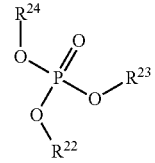

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
j) one or more dialkylene glycols dialkyl ethers, (glymes) selected from the structure:

$$R^{11}\text{—}O\text{—}(R^{12}\text{—}O)_n\text{—}R^{13}$$

wherein:
$R^{11}$ is one or more alkyl radicals selected from the group consisting of $C_1$ to $C_6$, $R^{12}$ is one or more alkylene radicals selected from the group consisting of $C_1$ to $C_4$, $R^{13}$ is one or more alkyl radicals selected from the group consisting of $C_1$ to $C_6$, and n is one or more integers selected from the group of 1 to 10, k) one or more hydrocarbons selected from the group consisting of i) one or more paraffinic liquids, ii) one or more cycloparaffinics, iii) one or more aromatic hydrocarbons, iv) aliphatic hydrocarbons, v) acyclic hydrocarbons, vi) unsaturated hydrocarbon, and vii) polyalphaolefins, l) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and m) one or more $C_1$-$C_{18}$ fatty triglycerides, and wherein said protic organic liquid is one or more members selected from the group consisting of:

a) one or more alkanols selected from the group consisting of $C_1$-$C_{10}$ alkanols, b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin, c) one or more polyalkylene glycols selected from the group consisting of poly($C_1$-$C_{10}$ alkylene) glycols, d) one or more dioxolane compound selected from the group consisting of i) 2,2-dimethyl-1,3-dioxolane-4-methanol and ii) 2,2-diisobutyl-1,3-dioxolane-4-methanol, e) one or more alkylene glycol alkyl ethers selected from the structure:

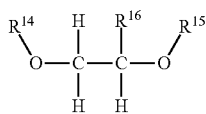

wherein $R^{14}$ is one or more members selected from the group consisting of $CH_3$, $C_2H_5$, $C_3H_7$, $C_6H_5$, and $C_4H_9$, $R^{15}$ is one or more members selected from the group consisting of H and

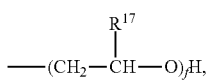

wherein $R^{17}$ is one or more members selected from the group consisting of H and $CH_3$, and f is an integer between 1 and 15, and $R^{16}$ is one or more members selected from the group consisting of H and $CH_3$, f) one or more alkyl lactates selected from the group consisting of i) ethyl lactate, ii) propyl lactate and iii) butyl lactate, g) one or more alkanolamines selected from the group consisting of alkanolamines selected from the structure:

wherein $R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$, $R^6$ is one or more members selected from the group consisting of H, $CH_3$, $C_2H_5$, $C_2H_4OR^8$ and $C_3H_6OH$, $R^7$ is one or more members selected from the group consisting of H, $C_2H_4OR^8$ and $C_3H_6OH$, wherein $R^8$ is $(C_2H_4O)_gH$ wherein g is an integer between 1 and 10, h) and glycerol carbonate.

A generic flow diagram for the improved process to yield lower cost of one or more liquid nitrogenous phosphoryl compositions is shown below in scheme 2:

In an embodiment, a process to yield one or more low cost, fluid nitrogenous phosphoryl compositions comprise one or more steps selected from the group consisting of:

1. reacting one or more phosphoryl chloride functional groups within Organic Liquid System One with one or more alkylamines to make one or more monoalkylamide phosphoryl dichlorides and/or one or more monoalkylamide thiophosphoryl dichlorides, wherein the by-product, hydrochloric acid (HCl) is consumed by one or more methods selected from the group consisting of:

a. reacting ammonia or other alkali compounds with the hydrochloric acid from one or more alkylammonium chlorides freeing the one or more alkylamines to fully react to form one or more monoalkylamide phosphoryl dichlorides and/or one or more monoalkylamide thiophosphoryl dichlorides, b. utilizing an HCl absorbent such as one or more trialkylamine to absorb the HCl, 2. reacting one or more monoalkylamide phosphoryl dichlorides and/or one or more monoalkylamide thiophosphoryl dichloride with ammonia or an ammonia generating compound resulting in desired one or more nitrogenous phosphoryl compounds, 3. removing inorganic chloride by-products by methods known by those skilled in the art such as, a) filtration, b) sedimentation and removal of organic layer, c) liquefaction of the inorganic salt by-products and subsequent draining off of by-products i) liquefaction of ammonium chloride with excess ammonia and pressurization of the reaction vessel #1, ii) liquefaction of chloride by-products with water addition which has been optionally de-oxygenated, optionally deionized and/or optionally distilled, 4) not removing the inorganic by-products wherein the inorganic by-products are maintained in a stable or semi-stable fluid suspension within the NOLDS, 5) removal of volatile components of Organic Liquid System One through methods know in the art such as reduced pressures and temperatures less than 100° C., a) optionally Organic Liquid System One contains components with boiling point above 120° C. and therefore are not removed from said one or more low cost, fluid nitrogenous phosphoryl compositions, and 6) adding Organic Liquid System Two, wherein Organic Liquid System Two meet one or more of the following:
a) are environmentally safe,
b) have a flashpoint above 145° F.,
c) rated safe for contact with humans and animals,
e) serves as the delivery system or components of a delivery system that delivers the desired nitrogenous compound to the surface of a substrate,
f) does not degrade the one or more nitrogenous phosphoryl compounds, wherein a fluid composition comprising at least one nitrogenous phosphoryl compound at levels of 20-80% wherein the composition is fluid at (−20) to 55° C., and wherein the one or more low cost, fluid nitrogenous phosphoryl compositions comprise one or more physical states selected from the group consisting of a) liquid solutions, b) colloid and c) suspension.

In a variation, the method to make fluid compositions comprising one or more nitrogenous phosphoryl compounds at levels of 20-90% wherein the composition is fluid at: (−40) to 100° C., (−20) to 80° C., (−20) to 70° C., (−10) to 70° C., 0 to 70° C., 10 to 70° C., 20 to 70° C., (−20) to 60° C., 20 to 60° C., or 25 to 55° C. In an embodiment, the method further comprises one or more methods/steps selected from the group consisting of a) polishing filtration of the fluid nitrogenous phosphoryl compounds to clear solution compositions, b) no filtration, pump to storage tank allow solids to settle to the bottom of the tank for removal, and c) maintain the inorganic by-products in a stable fluid suspension.

In another variation, the method to make the fluid compositions comprising one or more nitrogenous phosphoryl compounds at levels of 20-90%, 30-85%, 40-85%, 50-90%, 50-80%, 20-30%, 20-40%, 20-50%, 30-40%, 30-50%, 40-50%, 40-60%, 50-70%, or 50-60% wherein the composition is fluid at (−40) to 100° C. Methods to make one or more fluid nitrogenous phosphoryl compositions further comprises one or more methods selected from the group consisting of pumping a) to storage tanks, b) to shipping containers and/or bulk transportation, c) to a vessel for further formulation optimization, and d) to application set-ups to impart a continuous homogenous liquid coating solution or a stable suspension comprising nitrogenous phosphoryl compounds.

In an embodiment, one or more nitrogenous phosphoryl compounds comprise adducts of the reaction of a) one or more phosphoryl chlorides selected from the group consisting of: i) phosphoryl trichloride, ii) phosphoryl trichloride and iii) thiophosphoryl trichloride with b) one or more alkylamines selected from the group consisting of i) one or more monoalkyl amines and ii) one or more dialkyl amines wherein the alkyl functionalities of one or more monoalkyl amines and/or one or more dialkyl amines is selected from the group consisting of (a) —$C_1H_3$, (b) —$C_2H_5$, (c) —$C_3H_7$, (d) —$C_4H_9$, (e) —$C_5H_{11}$, (f) —$C_6H_5$, and (g) —$C_6H_{13}$. In a variation, said alkyl functionalities comprise linear or branched alkyl groups.

In a variation, the molar ratio of the reactants of a) one or more said phosphoryl chlorides to b) one or more said alkylamines comprises one or more ratios of one or more phosphoryl chlorides:one or more alkylamines is selected from the group consisting of a) 1:2, b) 1:1.75, c) 0.75:1, d) 1:1.5, e) 1:1.25, f) 1:1.2, g) 1:1.1, h) 1:1.05, i) 0.95:1, and j) 1:1.3.

In an embodiment, the temperature of the reaction in Step 1 of said one or more phosphoryl chlorides with one or more alkylamines comprises one or more members selected from the group consisting of a) −40° C. to 100° C., b) −40° C. to 80° C., c) −40° C. to 60° C., d) −30° C. to 60° C., e) −30° C. to 40° C., f) −30° C. to 20° C., g) −20° C. to 20° C., h) −20° C. to 10° C., i) −20° C. to 0° C., j) −20° C. to −10° C., k) −10° C. to 10° C., and l) −10° C. to 0° C. In a variation, the temperature of the reaction in Step 1 of said one or more phosphoryl chlorides with one or more said alkylamines is selected to optimize the selectivity of each of the chlorides on phosphoryl chlorides to result in the formation of primarily monoalkylamide phosphoryl chlorides.

In an embodiment, the temperature of the reaction in Step 1a of said one or more alkylammonium chlorides with one or more ammonia and/or ammonia generating compounds comprises one or more members selected from the group consisting of a) −40° C. to 100° C., b) −40° C. to 80° C., c) −40° C. to 60° C., d) −30° C. to 60° C., e) −30° C. to 40° C., f) −30° C. to 20° C., g) −20° C. to 20° C., h) −20° C. to 10° C., i) −20° C. to 0° C., j) −20° C. to −10° C., k) −10° C. to 10° C., and l) −10° C. to 0° C. In a variation, Step 1a of the reaction releases one or more alkylamines from their chloride salts to further react with phosphoryl chlorides. In a variation, a hydrochloric acid absorbent is utilized in Step 1 eliminating the requirement for Step 1a.

In an embodiment, the temperature of the reaction in Step 1 and Step 1a are selected to take advantage of the selectivity of each of chlorides on phosphoryl chlorides to optimize the formation of the monoalkylamide phosphoryl chloride. In a variation, the agitation speed is maintained at a rate to ensure quick mixing of amine and ammonia reactants. In another variation, the agitation is slowed at some point during the ammonia gas charge.

In an embodiment, HCl reactants comprise one or more members selected from the group consisting of a) ammonia, b) ammonium bicarbonate, c) ammonium carbonate, d) ammonium hydroxide, e) magnesium carbonate, f) magnesium oxide, g) magnesium hydroxide, h) calcium carbonate, i) calcium oxide, j) calcium hydroxide, k) potassium carbonate, l) potassium bicarbonate, m) sodium carbonate, and n) sodium bicarbonate.

In an embodiment, an HCl absorbent comprises one or more trialkylamines wherein the alkyl portion of said one or more trialkylamine is selected from the group consisting of i) methyl, ii) ethyl, iii) propyl, iv) butyl and mixtures thereof.

In an embodiment, because the overall process results in fluid nitrogenous phosphoryl compositions, Organic Liquid System One optionally comprises organic liquids that can be added at any time during the reaction phase of the process and that meet one or more of the following criteria:
a) are environmentally safe,
b) have a flashpoint above 145° F.,
c) are rated safe for contact with humans and animals,
d) improve processability/cost of the method to make one or more fluid nitrogenous phosphoryl compositions,
  i) increase % nitrogenous phosphoryl compounds and their precursors loading of Organic Liquid System One at processing temperatures,
  ii) lower viscosity of reaction mixtures,
  iii) improve separation phase for removal of reaction by-products,
  iv) possess poor dissolution of one or more nitrogenous phosphoryl compounds, v) assist in stabilizing the inorganic chloride by-product salts in a fluid suspension,
e) serve as the delivery system or a component of a delivery system that delivers the one or more nitrogenous phosphoryl compounds onto the surface of a substrate,
f) is non-reactive with phosphoryl chloride functional groups, and/or
g) does not degrade the nitrogenous phosphoryl compounds.

In an embodiment, a stable suspension composition comprises a) one or more nitrogenous phosphoryl compounds, b) one or more inorganic chloride salts and an Organic Liquid System One comprises one or more aprotic organic liquids non-reactive to phosphoryl chloride functional group, wherein said Organic Liquid System One comprises said one or more aprotic organic liquids with a boiling point greater than 120° C. and wherein said one or more aprotic organic liquids are selected from the group consisting of:
a) one or more alkylene carbonates, b) one or more 1-alkyl-2-pyrrolidone selected from the group wherein the alkyl functionality is a $C_1$-$C_8$ alkyl radical, c) one or more hydrocarbons, d) one or more $C_1$-$C_{18}$ fatty triglycerides, e) one or more organo phosphorous liquids selected from the group consisting of hexamethylphosphoramide and one or more trialkylphosphates selected from the structure:

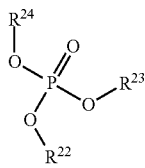

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$,
f) sulfolane, g) 2-methoxyethyl ether, h) cyclohexylpyrrolidone, i) one or more polyols capped with $C_1$-$C_6$ organic acid, j) one or more alkylene glycol alkyl ethers acetates, k) isophorone, l) one or more diesters, m) dimethyl-2-imidazolidinone, n) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and o) one or more dialkylene glycols dialkyl ethers, (glymes) selected from the structure:

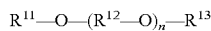

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is one or more integers selected from the group of 1 to 10.

In a variation, said one or more alkylene carbonates are selected from the group consisting of i) ethylene carbonate, ii) propylene carbonate and iii) butylene carbonate In a variation, said one or more hydrocarbons are selected from the group consisting of i) one or more paraffinic liquids, ii) one or more cycloparaffinics, iii) one or more aromatic hydrocarbons, iv) one or more aliphatic hydrocarbons, v) one or more acyclic hydrocarbons, vi) one or more unsaturated hydrocarbon, and vii) one or more polyalphaolefins.

In a variation, said one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin.

In a variation, said one or more alkylene glycol alkyl ethers acetates selected from the group consisting of (i) dipropylene glycol methyl ether acetate, (ii) tripropylene glycol methyl ether acetate, and (iii) tripropylene glycol butyl ether acetate.

In a variation, said one or more diesters selected from the group consisting of (i) $C_1$-$C_6$ dialkylsuccinate, (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate.

In a variation, one or more particles within said stable suspension composition comprises one or more members selected from the group a) one or more chloride salts, b) one or more nitrogenous phosphoryl compounds, and c) one or more fusion particles. Not to be bound by theory and based on belief and observations, said fusion particles are formed in-situ during the reaction of one or more phosphoryl chlorides with one or more alkylamines. In another variation, said one or more fusion particles comprise one or more chloride salts and one or more nitrogenous phosphoryl compounds. In another variation, the unexpected stability of the suspension is the result of the formation of small particles in situ and the presence of said fusion particle.

In a variation, said stable suspension composition further comprises Organic Liquid System Two.

In a variation, said stable suspension composition further comprises one or more members selected from the group consisting of a) one or more colorants, b) one or more scents, c) one or more odor masking agents, d) one or more nitrogenous phosphoryl compound organic stabilizers, and e) one or more surfactants.

In a variation, when an excellent nitrogenous phosphoryl compound solvent, such as DMSO, is combined with said stable suspension compositions, the results are a) a destabilizing or the suspension and b) the particles are difficult to remove through filtration due to the presence of the formation of a cohesive, sticky residue. In another variation, ammonium chloride is insoluble in DMSO.

In an embodiment, liquid solution compositions comprise methods to make that result in one or more nitrogenous phosphoryl compounds completely dissolved into a solution within a non-aqueous, organo liquid delivery system resulting in one or more fluid nitrogenous phosphoryl compositions. In a variation, said non-aqueous, organo liquid delivery system comprises low volatility Organic liquid System One wherein low volatility Organic Liquid System One comprises aprotic organic liquid that are non-reactive with phosphoryl chloride functional groups and wherein said low volatility Organic Liquid System One comprises organic liquids with boiling points greater than or equal to 120° C. In another variation, said non-aqueous, organo liquid delivery system comprises one or more member selected from the group consisting of a) low volatility Organic Liquid System One and b) Organic Liquid System Two wherein one or more fluid phosphoryl nitrogenous compositions meet the following:
  a) are environmentally safe,
  b) having a flashpoint above 145° F.,
  c) are rated safe for contact with humans and animals,
  d) having % loading of one or more phosphoryl nitrogenous compounds of 20-95% and are fluid at temperature range of −40 to 100° C.
  e) can be applied to nitrogen source fertilizer granules through application by commercial sprayers and metered applicators onto fertilizer granules mobilized by mixing, stirring and/or blending to ensure an even coating of the solution of nitrogenous phosphoryl compounds on the surfaces of said nitrogen source fertilizer granules through commingling of said solution with said nitrogen source fertilizer granules.

boiling point less than or equal to 120° C. In a variation, said Organic Liquid System One comprises one or more aprotic organic liquids selected from the group consisting of a) one or more hydrocarbons selected from the group consisting of i) one or more paraffinic liquids, ii) one or more cycloparaffinics, and iii) one or more aromatic hydrocarbons, b) one or more liquid halocarbons c) one or more halohydrocarbons, and d) one or more ethers selected from the group consisting of i) 1,4-dioxane, ii) 1,3-dioxolane, iii) methyltetrahydrofuran, iv) dimethoxyethane, v) 1,3-dioxane, vi) 1,3-dioxolane, vii) 2,2-dimethyl-1,3-dioxolane, viii) diethyl ether, ix) tetrahydrofuran, and x) tetrahydropyran, e) d-limonene, f) 1,2-dimethyloxyethane and f) one or more esters selected from the group consisting of i) $C_1$-$C_6$ alkylformate and ii) $C_1$-$C_6$ alkylacetate.

In a variation, the composition of reaction vessel #1 further comprises one or more aprotic organic liquids that

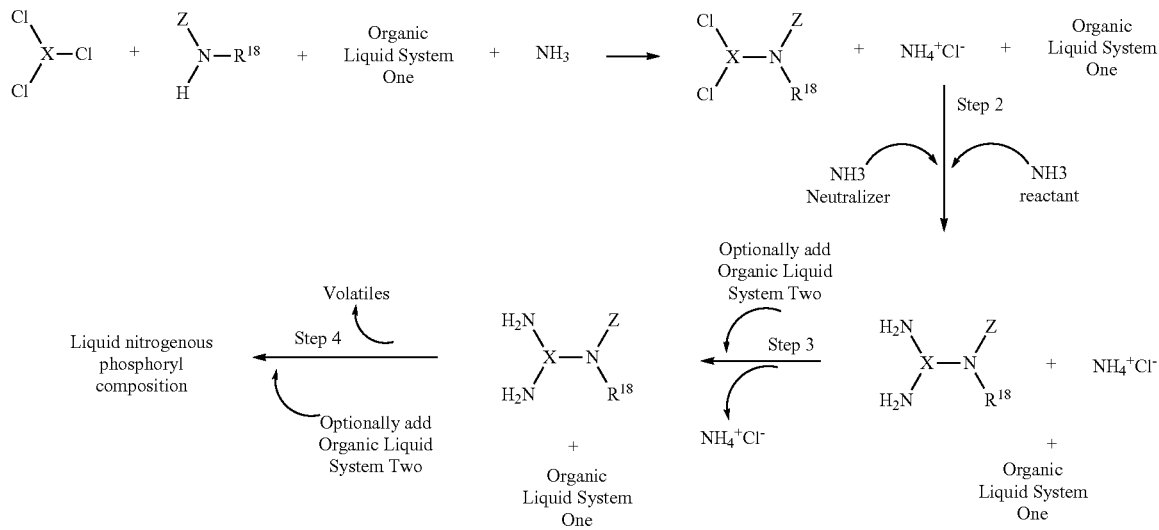

Scheme 2 Flow Diagram of a Solution Low Cost Process wherein:
  a) X is one or more members selected from the group consisting of i) P=O, ii) P, and iii) P=S
  b) Z is one or more members selected from the group consisting of i) one or more alkyl radicals selected from the group consisting of (a) —$C_1H_3$, (b) —$C_2H_5$, (c) —$C_3H_7$, (d) —$C_4H_9$, (e) —$C_5H_{11}$, (f) —$C_6H_5$, and g) H (hydrogen)
  c) $R^{18}$ is one or more alkyl radicals selected from the group consisting of (a) —$C_1H_3$, (b) —$C_2H_5$, (c) —$C_3H_7$, (d) —$C_4H_9$, (e) —$C_5H_{11}$, and (f) —$C_6H_5$.

In an embodiment, methods to make liquid solutions of one or more nitrogenous phosphoryl compositions comprise a reaction of one or more phosphoryl chlorides with one or more alkylamines in an aprotic, nonreactive organic solvent medium in reaction vessel #1 according to methods to make known by those in the art.

In a variation, said reaction medium is charged into reaction vessel #1 wherein said reaction medium comprises Organic Liquid System One, wherein said Organic Liquid System One comprises one or more non-phosphoryl chloride reactive aprotic organic liquids selected from the group consisting of one or more aprotic organic liquids with a are non-reactive with one or more phosphoryl chlorides and wherein the one or more aprotic organic liquids have a boiling point greater than 120° C.

In a variation, reaction vessel #1 has been deoxygenated and is filled with an inert gas.

In a variation, the contents of reaction vessel #1 are adjusted to a temperature range of (−40) to 20° C. In another variation, the contents of reaction vessel #1 are adjusted one or more temperature ranges of (−40) to (−20)° C., c) (−40) to 0° C., d) (−40) to (−10)° C., e) (−30) to 20° C., f) (−30) to 10° C., g) (−30) to (−10)° C., h) (−20) to 20° C., i) (−20) to 10° C., j) (−20) to 0° C., k) (−20) to (−10)° C., l) (−10) to 20° C., m) (−10) to 10° C., n) (−10) to 0° C., o) 0 to 20° C., and p) 0 to 10° C., In a variation, the contents of reaction vessel #1 are under strong agitation.

In a variation, said one or more alkylamines are slowly charged to reaction vessel #1.

In a variation, the charging of said one or more alkylamines is above the surface and/or sub-surface of the contents in reaction vessel #1. In another variation, the rate of charging said one or more alkylamines to the contents of reaction vessel #1 is dependent on maintaining the temperature of the contents of reaction vessel #1 at less than 5° C., In another variation, the rate of charging said one or more alkylamines to the contents of reaction vessel #1 is dependent on maintaining the temperature of the contents of reaction vessel #1 at less than one or more of the following temperatures i) (−20)° C., ii) (−15)° C., iii) (−10)° C., iv) (−5)° C., v) 0° C., vi) 5° C., and vii) <(−20)° C., In a variation, said one or more alkylamines is premixed with a portion of said Organic Liquid System One and then slowly charged to reaction vessel #1, In a variation, said one or more phosphoryl chlorides comprise one or more phosphoryl trichlorides and wherein the molar ratio range of the one or more said alkylamines to the one or more said phosphoryl trichlorides is 0.7:1.5. In another variation, the molar ratio of said one or more alkylamines to said one or more phosphoryl trichlorides is selected from the group consisting of (a) 0.7:1.0, (b) 0.8:1.0, (c) 0.9:1.0, (d) 0.95:1.0, (e) 1.0:1.0, (f) 1.05:1.0, (g) 1.1:1.0, (h) 1.2:1.0, (i) 1.3:1.0, (j) 1.4:1.0, (k) 1.5:1.0, (l) 0.7:1.0 and m) 0.9:1.0, In a variation, the composition of the contents do not comprise one or more trialkylamines that are utilized as HCl absorbants, In an embodiment, ammonia gas and/or ammonia generating compounds are charged to the contents of reaction vessel #1 under agitation.

In a variation, said ammonia gas and/or ammonia generating compounds are charged very slowly, initially, to the contents of reaction vessel #1.

In a variation, the charging of said ammonia gas and/or ammonia generating compound is above the surface and/or sub-surface of the said contents in reaction vessel #1.

In a variation, the rate of charging said ammonia gas and/or ammonia generating compound is dependent on maintaining the temperature of the contents of reaction vessel #1 at less than 100° C. In another variation, the rate of charging said ammonia gas and/or ammonia generating compound is dependent on maintaining the temperature of the contents of reaction vessel #1 at less than one or more of the following temperatures i) ≤(−20)° C., ii) ≤(−15)° C., iii) ≤(−10)° C., iv) ≤(−5)° C., v) ≤(−0)° C., f) ≤5° C., vi) ≤(−20)° C., vii) ≤5° C., viii) ≤10° C., ix) ≤15° C., x) ≤20° C., xi) ≤25° C., xii) ≤30° C., xiii) ≤40° C., xiv) ≤50° C., xv) ≤60° C., xvi) ≤70° C., xvii) ≤80° C., xviii) ≤90° C., and xix) ≤100° C.

In a variation, the rate of charge of ammonia gas and/or ammonia generating compound can be optionally slow in the beginning with very slow agitation.

In a variation, the temperature of the contents of reaction vessel #1 are initially at ≤(−10° C.) In another variation, the temperature of the contents of reaction vessel #1 are maintained at a temperature range of (−10) to 5° C. through the first ¼ to ½ of the ammonia gas and/or ammonia generating compound, and allowed to slowly increase temperatures to a range of 30 to 100° C. for the remaining ¾ to ½ of the remaining charge of ammonia gas and/or ammonia generating compound.

In an embodiment, upon completion of the charging of ammonia gas and/or ammonia generating compound, the contents of reaction vessel #1 are mixed for an additional 5-120 additional minutes at a temperature range of 30-100° C.

In a variation, the contents of reaction vessel #1 are mixed for additional minutes comprising one or more time ranges selected from the group consisting of (1) 5-120 minutes, (2) 10-120 minutes, (3) 20-120 minutes, (4) 30-120 minutes, (5) 40-120 minutes, (6) 50-120 minutes, (7) 1-120 minutes, (8) 60-120 minutes, (9) 5-60 minutes, (10) 10-60 minutes, (11) 20-60 minutes, (12) 30-60 minutes, (13) 40-60 minutes, and (14) 50-60 minutes.

In another variation, the temperature of reaction vessel #1's contents are maintained at one or more of the following temperature ranges (1) 30 to 40° C., (2) 30 to 50° C., (3) 30 to 60° C., (4) 30 to 70° C., (5) 30 to 80° C., (6) 30 to 90° C., (7) 30 to 100° C., (8) to 60° C., (9) 40 to 70° C., (10) 40 to 80° C., (11) 40 to 90° C., (12) 40 to 100° C., (13) 50 to 60° C., and (14) 50 to 70° C.

In an embodiment, upon completion of the reaction phase, the one or more inorganic chloride by-products in reaction vessel #1 are removed from the contents of reaction vessel #1 by one or more methods known by those skilled in the art selected from the group consisting of a) filtration, b) sedimentation and removal of organic layer, and c) liquefaction of the inorganic chloride salt by-products and subsequent draining off of by-products, i) liquefaction through excess ammonia or ammonium hydroxide, ii) liquefaction through excess ammonia or ammonium hydroxide, wherein the reaction vessel #1 is pressurized with excess ammonia to decrease the amount of water present, and iii) liquefaction through dissolving by-products with water which has been optionally de-oxygenated.

In an embodiment, the remaining organic contents from reaction vessel #1 is heated to less than 70° C. and placed under a vacuum of 0.1-40 mm of Hg to strip out the volatile components of Organic Liquid System One.

In a variation, Organic Liquid System Two is charged to organic contents of reaction vessel #1 as needed to maintain fluidity of the organic contents from reaction vessel #1. In another variation, Organic Liquid System Two is charged to the contents of the stripped organic content from reaction vessel #1 after all of the volatile components of Organic Liquid System One have been removed resulting in a liquid solution. In another variation, said liquid solution of one or more nitrogenous phosphoryl compounds has any remaining inorganic chloride salt by-products removed by filtration and/or sedimentation.

In a variation, a colorant is added to said liquid solution of one or more nitrogenous phosphoryl compounds.

In a variation, a scent is added to said liquid solution of one or more nitrogenous phosphoryl compounds.

In a variation, a buffer is added to said liquid solution of one or more nitrogenous phosphoryl compounds.

In a variation, one or more surfactants are added to the contents of reaction vessel #1, wherein the one or more surfactants comprises one or more members selected from the group consisting of (a) one or more cationic surfactants, (b) one or more amphoteric surfactants, (c) one or more Zwitterionic surfactants, (d) one or more anionic surfactants and (e) one or more nonionic surfactants.

In a variation, Organic Liquid Systems Two and high boiling point members of Organic Liquid System One serves as the delivery system or components of a delivery system that delivers the one or more nitrogenous phosphoryl compounds to the surface of a substrate, In a variation, said liquid solutions comprise one or more nitrogenous phosphoryl compounds at levels of 20-80% and wherein said liquid solution is fluid at (−25) to 55° C.

Scheme 3 Flow Diagram of a Suspension Low Cost Process

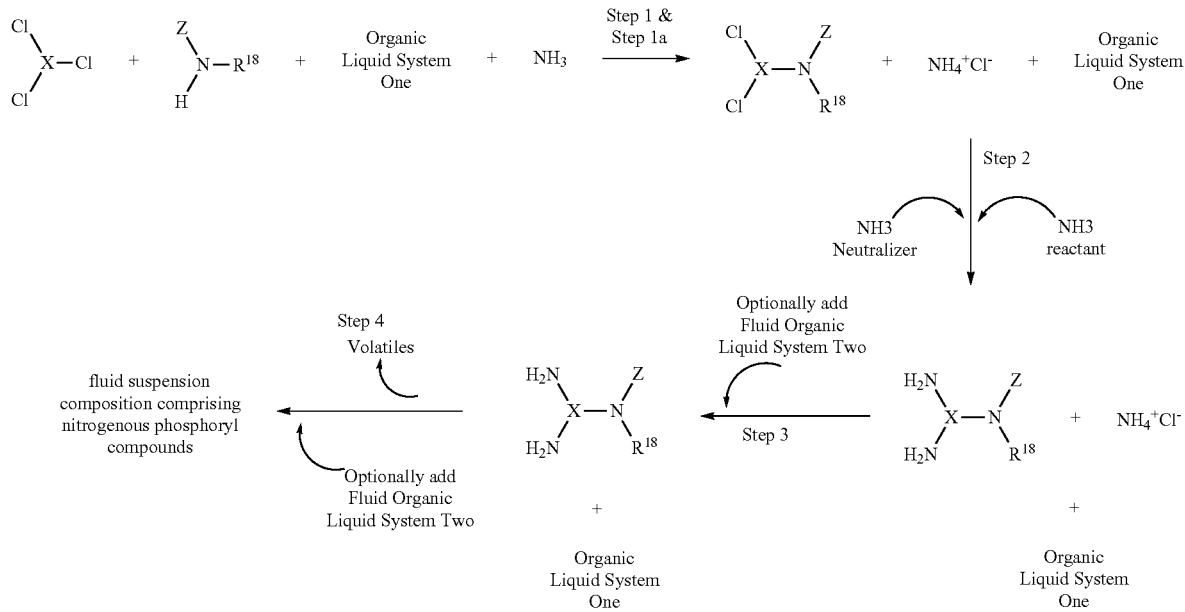

wherein:
- a) X is one or more members selected from the group consisting of i) P=O, ii) P, and iii) P=S
- b) Z is one or more members selected from the group consisting of i) one or more alkyl radicals selected from the group consisting of (a) —$C_1H_3$, (b) —$C_2H_5$, (c) —$C_3H_7$, (d) —$C_4H_9$, (e) —$C_5H_{11}$, (f) —$C_6H_5$, and g) H (hydrogen)
- c) $R^{18}$ is one or more alkyl radicals selected from the group consisting of (a) —$C_1H_3$, (b) —$C_2H_5$, (c) —$C_3H_7$, (d) —$C_4H_9$, (e) —$C_5H_{11}$, and (f) —$C_6H_5$.

In an embodiment, methods to make of one or more nitrogenous phosphoryl compounds that result in fluid suspensions compositions comprise a reaction of one or more phosphoryl chlorides with one or more alkylamines in an aprotic, nonreactive organic solvent medium in reaction vessel #1 according to methods to make known by those in the art.

In a variation, said reaction medium is charged into reaction vessel #1 wherein said reaction medium comprises Organic Liquid System One, wherein said Organic Liquid System One comprises one or more non-phosphoryl chloride reactive aprotic organic liquids selected from the group consisting of one or more aprotic organic liquids with a boiling point greater than 120° C. selected from the group consisting of a) one or more alkylene carbonates selected from the group consisting of i) ethylene carbonate, ii) propylene carbonate and iii) butylene carbonate b) one or more 1-alkyl-2-pyrrolidone selected from the group wherein the alkyl functionality is a $C_1$-$C_8$ alkyl radical, c) one or more hydrocarbons selected from the group consisting of i) one or more paraffinic liquids, ii) one or more cycloparaffinics, iii) one or more aromatic hydrocarbons, iv) one or more aliphatic hydrocarbons, v) one or more acyclic hydrocarbons, vi) one or more unsaturated hydrocarbon, and vii) one or more polyalphaolefins, d) one or more $C_1$-$C_{18}$ fatty triglycerides, e) one or more organo phosphorous liquids selected from the group consisting of hexamethylphosphoramide and one or more trialkylphosphates selected from the structure:

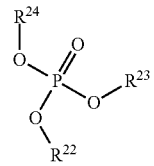

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
f) sulfolane, g) 2-methoxyethyl ether, h) cyclohexylpyrrolidone, i) one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin, j) one or more alkylene glycol alkyl ethers acetates selected from the group consisting of (i) dipropylene glycol methyl ether acetate, (ii) tripropylene glycol methyl ether acetate, and (iii) tripropylene glycol butyl ether acetate, k) isophorone, l) one or more diesters selected from the group consisting of (i) $C_1$-$C_6$ dialkylsuccinate, (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate, m) dimethyl-2-imidazolidinone, n) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and o) one or more dialkylene glycols dialkyl ethers, (glymes) selected from the structure:

$R^{11}$—O—($R^{12}$—O)$_n$—$R^{13}$ wherein:
R$^{11}$ is one or more alkyl radicals selected from the group consisting of C$_1$ to C$_6$,
R$^2$ is one or more alkylene radicals selected from the group consisting of C$_1$ to C$_4$,
R$^{13}$ is one or more alkyl radicals selected from the group consisting of C$_1$ to C$_6$,
and n is one or more integers selected from the group of 1 to 10.

In another variation, said Organic Liquid System One comprises one or more non-phosphoryl chloride reactive aprotic organic liquids selected from the group consisting of aprotic organic liquids with a boiling point greater than 160° C.

In another variation the composition of reaction vessel #1 further comprises one or more aprotic organic liquids with a boiling point less than or equal to 120° C.

In a variation, reaction vessel #1 has been deoxygenated and is filled with an inert gas.

In a variation, the contents of reaction vessel #1 are adjusted to a temperature range of (−40) to 20° C. In another variation, the contents of reaction vessel #1 are adjusted one or more temperature ranges of (−40) to (−20)° C., c) (−40) to 0° C., d) (−40) to (−10)° C., e) (−30) to 20° C., f) (−30) to 10° C., g) (−30) to (−10)° C., h) (−20) to 20° C., i) (−20) to 10° C., j) (−20) to 0° C., k) (−20) to (−10° C., 1) (−10) to 20° C., m) (−10) to 10° C., n) (−10) to 0° C., o) 0 to 20° C., and p) 0 to 10° C., In a variation, the contents of reaction vessel #1 are under strong agitation.

In a variation, said one or more alkylamines are slowly charged to reaction vessel #1.

In a variation, the charging of said one or more alkylamines is above the surface and/or sub-surface of the contents in reaction vessel #1. In another variation, the rate of charging said one or more alkylamines to the contents of reaction vessel #1 is dependent on maintaining the temperature of the contents of reaction vessel #1 at less than 5° C., In another variation, the rate of charging said one or more alkylamines to the contents of reaction vessel #1 is dependent on maintaining the temperature of the contents of reaction vessel #1 at less than one or more of the following temperatures i) (−20)° C., ii) (−15)° C., iii) (−10)° C., iv) (−5)° C., v) 0° C., vi) 5° C., and vii) <(−20)° C., In a variation, said one or more alkylamines is premixed with a portion of said Organic Liquid System One and then slowly charged to reaction vessel #1, In a variation, said one or more phosphoryl chlorides comprise one or more phosphoryl trichlorides and wherein the molar ratio range of the one or more said alkylamines to the one or more said phosphoryl trichlorides is 0.7:1.5. In another variation, the molar ratio of said one or more alkylamines to said one or more phosphoryl trichlorides is selected from the group consisting of (a) 0.7:1.0, (b) 0.8:1.0, (c) 0.9:1.0, (d) 0.95:1.0, (e) 1.0:1.0, (f) 1.05:1.0, (g) 1.1:1.0, (h) 1.2:1.0, (i) 1.3:1.0, (j) 1.4:1.0, (k) 1.5:1.0, (l) 0.7:1.0 and m) 0.9:1.0, In a variation, the composition of the contents does not comprise one or more trialkylamines that are utilized as HCl absorbants.

In a variation, after completing the charge of one or more alkylamines to reaction vessel #1, the contents of reaction vessel #1 are mixed for additional minutes comprising one or more time ranges selected from the group consisting of (1) 5-200 minutes, (2) 10-120 minutes, (3) 20-120 minutes, (4) 30-120 minutes, (5) 40-120 minutes, (6) 50-120 minutes, (7) 1-120 minutes, (8) 60-120 minutes, (9) 5-60 minutes, (10) 10-60 minutes, (11) 20-60 minutes, (12) 30-60 minutes, (13) 40-60 minutes, and (14) 50-60 minutes.

In a variation, the temperature of reaction vessel #1's contents are maintained at (−40) to 20° C. In another variation, the contents of reaction vessel #1 are adjusted to one or more temperature ranges of (−40) to (−20)° C., c) (−40) to 0° C., d) (−40) to (−10)° C., e) (−30) to 20° C., f) (−30) to 10° C., g) (−30) to (−10)° C., h) (−20) to 20° C., i) (−20) to 10° C., j) (−20) to 0° C., k) (−20) to (−10)° C., 1) (−10) to 20° C., m) (−10) to 10° C., n) (−10) to 0° C., o) 0 to 20° C., and p) 0 to 10° C.

In a variation, upon completing the charging of one or more alkylamines to the contents of reaction vessel #1, the ammonium functionality of the one or more alkyl ammonium chlorides is displaced through the addition one or more alkalis comprising one or more metal cations selected from the group consisting of (1) Na, (2) K, (3) Ca, (4) Mg, (5) Zn, (6) Mn, (7) Fe, (8) Cu, (9) Co, (10) Mo, and (11) Ni. In another variation, after the contents of reaction vessel #1 have mixed for an extra period of time, the agitation is slowed until the surface of the contents are slowly moving and then said one or more alkalis can be sifted onto the surface of the contents of reaction vessel #1.

In an embodiment, the one or more alkylamines comprise one or more alkyl functionalities selected from the group consisting of i) one or more linear alkyl functionalities and ii) one or more branched alkyl functionalities and wherein the one or more i) linear alkyl functionalities and ii) branched alkyl functionalities are selected from the group consisting of (i) —C$_1$H$_3$, (ii) —C$_2$H$_5$, (iii) —C$_3$H$_7$, (iv) —C$_4$H$_9$, (v) —C$_5$H$_{11}$, (vi) —C$_6$H$_5$, and (vii) —C$_6$H$_{13}$ In an embodiment, ammonia gas and/or ammonia generating compounds are charged to the contents of reaction vessel #1 under agitation.

In a variation, said ammonia gas and/or ammonia generating compounds are charged very slowly, initially, to the contents of reaction vessel #1.

In a variation, the charging of said ammonia gas and/or ammonia generating compound is above the surface and/or sub-surface of the said contents in reaction vessel #1.

In a variation, the rate of charging said ammonia gas and/or ammonia generating compound is dependent on maintaining the temperature of the contents of reaction vessel #1 at less than 100° C. In another variation, the rate of charging said ammonia gas and/or ammonia generating compound is dependent on maintaining the temperature of the contents of reaction vessel #1 at less than one or more of the following temperatures i) ≤(−20)° C., ii) ≤(−15)° C., iii) ≤(−10)° C., iv) ≤(−5)° C., v) ≤(−0)° C., f) ≤5° C., vi) ≤(−20)° C., vii) ≤5° C., viii) ≤10° C., ix) ≤15° C., x) ≤20° C., xi) ≤25° C., xii) ≤30° C., xiii) ≤40° C., xiv) ≤50° C., xv) ≤60° C., xvi) ≤70° C., xvii) ≤80° C., xviii) ≤90° C., and xix) ≤100° C.

In a variation, the rate of charge of ammonia gas and/or ammonia generating compound can be optionally slow in the beginning with very slow agitation.

In a variation, the temperature of the contents of reaction vessel #1 are initially at ≤(−10° C.) In another variation, the temperature of the contents of reaction vessel #1 are maintained at a temperature range of (−10) to 5° C. through the first ¼ to ½ of the ammonia gas and/or ammonia generating compound, and allowed to slowly increase temperatures to a range of 30 to 100° C. for the remaining ¾ to ½ of the remaining charge of ammonia gas and/or ammonia generating compound.

In an embodiment, upon completion of the charging of ammonia gas and/or ammonia generating compound, the contents of reaction vessel #1 are mixed for an additional 5-120 additional minutes at a temperature range of 30-100° C.

In a variation, after completing the charge of ammonia and/or ammonia generating compounds, the contents of reaction vessel #1 are mixed for additional minutes comprising one or more time ranges selected from the group consisting of (1) 5-120 minutes, (2) 10-120 minutes, (3) 20-120 minutes, (4) 30-120 minutes, (5) 40-120 minutes, (6) 50-120 minutes, (7) 1-120 minutes, (8) 60-120 minutes, (9) 5-60 minutes, (10) 10-60 minutes, (11) 20-60 minutes, (12) 30-60 minutes, (13) 40-60 minutes, and (14) 50-60 minutes.

In another variation, the temperature of reaction vessel #1's contents are maintained at one or more of the following temperature ranges (1) 30 to 40° C., (2) 30 to 50° C., (3) 30 to 60° C., (4) 30 to 70° C., (5) 30 to 80° C., (6) 30 to 90° C., (7) 30 to 100° C., (8) to 60° C., (9) 40 to 70° C., (10) 40 to 80° C., (11) 40 to 90° C., (12) 40 to 100° C., (13) 50 to 60° C., and (14) 50 to 70° C.

In an embodiment, upon completion of the reaction of the contents of reaction vessel #1, the contents of reaction vessel #1 are cooled to <40° C. and packaged.

In a variation, upon completion of the reaction of the contents of reaction vessel #1, the ammonium functionality of the ammonium chloride is displaced through the addition one or more alkalis comprising one or more metal cations selected from the group consisting of (1) Na, (2) K, (3) Ca, (4) Mg, (5) Zn, (6) Mn, (7) Fe, (8) Cu, (9) Co, (10) Mo, and (11) Ni.

In a variation, the one or more particles within the fluid suspension of nitrogenous phosphoryl compounds comprise (1) one or more chloride salts, (2) one or more nitrogenous phosphoryl compounds, and (3) one or more in situ "binary fused particles" of one or more chloride salts and one or more nitrogenous phosphoryl compounds.

In a variation, upon completion of the reaction of the contents of reaction vessel #1, a colorant is optionally added to the contents of reaction vessel #1, In a variation, upon completion of the reaction of the contents of reaction vessel #1, a scent is optionally added to the contents of reaction vessel #1, In a variation, upon completion of the reaction of the contents of reaction vessel #1, a buffer is optionally added to the contents of reaction vessel #1, In a variation, upon completion of the reaction of the contents of reaction vessel #1, Organic Liquid System Two is optionally added to the contents of reaction vessel #1.

In a variation, upon completion of the reaction of the contents of reaction vessel #1, one or more surfactants are added to the contents of reaction vessel #1, wherein the one or more surfactants comprises one or more members selected from the group consisting of (a) one or more cationic surfactants, (b) one or more amphoteric surfactants, (c) one or more Zwitterionic surfactants, (d) one or more anionic surfactants and (e) one or more nonionic surfactants.

In a variation, said Organic Liquid System Two comprises one or more organic liquids selected from the group consisting of (1) aprotic organic liquids and (2) protic organic liquids wherein one or more of said aprotic organic liquids are selected from the group consisting of:
(a) dimethyl sulfoxide,
(b) one or more sulfoxide(s) selected from the group consisting of dialkyl, diaryl, or alkylaryl sulfoxide(s) selected from the formula structure:

$R^9S(O)xR^{10}$ 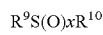

wherein
(i) $R^9$ and $R^{10}$ are each independently a $C_1$-$C_6$ alkylene group, an aryl group or $C_1$-$C_3$ alkylenearyl group,
(ii) or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring,
(iii) and x is 1 or 2,
(c) one or more alkylene carbonates selected from the group consisting of (i) ethylene carbonate, (ii) propylene carbonate, and (iii) butylene carbonate,
(d) one or more polyols capped with $C_1$-$C_6$ organic acid wherein the polyol portion is selected from the group consisting of (i) ethylene glycol, (ii) 1,3 propylene glycol, (iii) 1,2 propylene glycol, (iv) butylene glycol, (v) trimethylol propane, (vi) trimethylol ethane, (vii) pentaerythritol, (viii) sorbitol, (ix) sorbitan, (x) glucose, (xi) fructose, (xii) galactose and (xiii) glycerin,
(e) one or more alkylene glycol alkyl ethers acetates selected from the group consisting of (i) dipropylene glycol methyl ether acetate, (ii) tripropylene glycol methyl ether acetate, and (iii) tripropylene glycol butyl ether acetate,
(f) one or more diesters selected from the group consisting of (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate,
(g) one or more 1-alkyl-2-pyrrolidone selected from the group wherein the alkyl functionality is a $C_1$-$C_8$ alkyl radical,
(h) one or more members selected from the group consisting of (i) dimethylacetamide, (ii) dimethylformamide, (iii) dimethyl-2-imidazolidinone, (iv) isophorone, (v) hexamethylphosphoramide, (vi) 2-methoxyethyl ether, (vii) N,N-dimethyldecanamide, (viii) N,N-dimethyloctanamide, (ix) limonene, and (x) sulfolane
(i) one or more trialkylphosphates selected from the group represented by the structure:

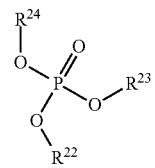

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
(j) one or more dialkylene glycols dialkyl ethers, (glymes) selected from the structure:

$R^{11}$—O—$(R^{12}$—O$)_n$—$R^{13}$ 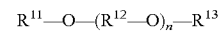

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is one or more integers selected from the group of 1 to 10, (k) one or more hydrocarbons selected from the group consisting of (i) one or more paraffinic liquids, (ii) one or more cycloparaffinics, (iii) one or more aromatic hydrocarbons, (iv) aliphatic hydrocarbons, (v) acyclic hydrocarbons, (vi) unsaturated hydrocarbon, and (vii) polyalphaolefins,
(l) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and
(m) one or more $C_1$-$C_{18}$ fatty triglycerides,
and wherein said protic organic liquid is one or more members selected from the group consisting of:
(a) one or more alcohols selected from the group consisting of the family of $C_1$-$C_{10}$ alkanols,
(b) one or more polyols selected from the group consisting of (i) trimethylol propane, (ii) trimethylol ethane, (iii) pentaerythritol, (iv) sorbitol, (v) sorbitan, (vi) glucose, (vii) fructose, (viii) galactose, and (ix) glycerin,
(c) one or more polyalkylene glycols selected from the group consisting of poly($C_1$-$C_{10}$ alkylene) glycols,
(d) one or more dioxolane compound selected from the group consisting of (i) 2,2-dimethyl-1,3-dioxolane-4-methanol and (ii) 2,2-diisobutyl-1,3-dioxolane-4-methanol,
(e) one or more alkylene glycol alkyl ethers selected from the formula structure:

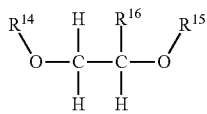

wherein
$R^{14}$ is one or more members selected from the group consisting of $CH_3$, $C_2H_5$, $C_3H_7$, $C_6H_5$, and $C_4H_9$,
$R^{15}$ is one or more members selected from the group consisting of H and $$—(CH_2—\overset{R^{17}}{\underset{|}{CH}}—O)_fH,$$

wherein
$R^{17}$ is one or more members selected from the group consisting of H and $CH_3$, and f is an integer between 1 and 15, and
wherein $R^{16}$ is one or more members selected from the group consisting of H and $CH_3$,
(f) one or more alkyl lactates selected from the group consisting of (i) ethyl lactate, (ii) propyl lactate and (iii) butyl lactate,
(g) one or more alkanolamines selected from the group consisting of alkanolamines selected from the formula structure:

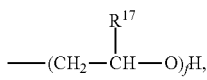

wherein
$R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$,
$R^6$ is one or more members selected from the group consisting of H, $CH_3$, $C_2H_5$, $C_2H_4OR^8$ and $C_3H_6OH$,
$R^7$ is one or more members selected from the group consisting of H, $C_2H_4OR^8$ and $C_3H_6OH$, and
wherein
$R^8$ is $(C_2H_4O)_gH$
wherein
g is an integer between 1-10,
(h) and glycerol carbonate.

In a variation, said one or more cationic surfactants comprises one or more members selected from the group consisting of (a) isostearylamino propalkonium chloride, (b) olealkonium chloride, (c) triethylmethylammonium chloride, (d) methyl triethanol ammonium methyl sulfate, (e) ethyl triethanol ammonium ethyl sulfate, (f) coconut trimethylammonium chloride, (g) coconut trimethylammonium methyl sulfate, (h) coconut dimethylethylammonium ethyl sulfate, (f) lauryl trimethylammonium chloride, (g) lauryl trimethylammonium methyl sulfate, (h) lauryl dimethylethylammonium ethyl sulfate, (i) one or more fatty acid amido propyl trimethyl ammonium chloride wherein the one or more fatty acids is selected from the group consisting of (1) capric acid, (2) caprylic acid, (3) lauric acid, (4) isostearic acid, and (5) oleic acid, (j) one or more fatty acid amido propyl trimethyl ammonium methyl sulfates wherein the one or more fatty acids is selected from the group consisting of (1) capric acid, (2) caprylic acid, (3) lauric acid, (4) isostearic acid, and (5) oleic acid, (k) one or more fatty acid amido propyl ethyl dimethyl ammonium ethyl sulfate wherein the one or more fatty acids is selected from the group consisting of (1) capric acid, (2) caprylic acid, (3) lauric acid, (4) isostearic acid, and (5) oleic acid, (m) methyl triethanol ammonium chloride, (n) N-ethyl-N,N-dipolyethoxyethyl-N-tallowalkylammonium ethosulfate, (o) N-methyl-N,N-dipolyethoxyethyl-N-tallowalkylammonium methosulfate, and (p) N-methyl-N,N-dipolyethoxyethyl-N-tallowalkylammonium chloride.

In a variation, one or more nonionic surfactants comprises (1) one or more alkoxylated functionalities wherein, alkoxylated refers to the reaction of one or more alkoxides selected from the group consisting of (a) ethylene oxide, (b) propylene and (c) mixtures thereof with one or more functionalities wherein said one or more functionalities are selected from the group consisting of (a) one or more alkanolamides, (b) sorbitan monooleate, (c) sorbitan trioleate, (d) one or more alcohols wherein the one or more alcohols are selected from the group consisting of (i) octanol, (ii) isooctanol, (iii) 2-ethyl hexanol, (iv) nonanol, (v) decanol, (vi) isodecanol, (vii) undecanol, (viii) lauryl alcohol, (ix) trideceth alcohol, (x) oleyl alcohol, (xi) linoleyl alcohol, (xii) linolenyl alcohol, and mixtures thereof, e) tallow amine, f) lauryl amine, (g) oleyl amine and (h) one or more fatty acids wherein the one or more fatty acid are selected from the group consisting of (i) capric acid, (ii) caprylic acid, (iii) lauric acid, (iv) oleic acid, (v) isostearic acid, (vi) linoleic acid, (vii) linolenic acid, (viii) ricinoleic acid, and mixtures thereof, (2) one or more alkanolamides, (3) sorbitan monooleate, (4) sorbitan trioleate, and (5) one or more ethylene oxide/propylene oxide block copolymers.

In a variation, one or more anionic surfactants comprises (1) one or more alkyldiphenyloxide disulfonates, (2) linear alkylbenzene sulfonates, (3) one or more alpha olefin sulfonates, (4) alkylsulfates, (5) alkyl ethoxy sulfates, (6)

alkyl sulfonates, (7) alkyl alkoxy carboxylates, (8) monoalkyl phosphates, (9) dialkyl phosphates, (10) sarcosinates, (11) sulfosuccinates, (12) isethionates, and (13) taurates.

In an embodiment, the present invention relates to a method to make one or more nitrogenous phosphoryl compounds, wherein said one or more nitrogenous phosphoryl compounds comprise one or more alkylphosphoric triamides selected from Structure I:

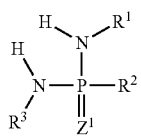

Structure I wherein:
a) $R^2$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX^1$, $OCH_3$, $OC_2H_5$, $OC_3H_7$, $OC_4H_9$, $OC_5H_{11}$, $OC_6H_{13}$, and $HNR^4$,
wherein
i) $R^4$ is one or more members selected from the group consisting of H, $CH_3$, $C_2H_5$, $C_3H_7$, $C_4H_9$, $C_5Hui$, $C_6H_5$, and $C_6H_{13}$,
ii) $X^1$ is one or more members selected from the group consisting of
(1) H, Na, Li, and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
b) $R^1$ is one or more members selected from the group consisting of $CH_3$, $C_2H_5$, $C_3H_7$, $C_4H_9$, $C_5H_{11}$ and $C_6H_{13}$,
c) $R^3$ is one or more members selected from the group consisting of H, $CH_3$, $C_2H_5$, $C_3H_7$, $C_4H_9$, $C_5H_{11}$ and $C_6H_{13}$,
d) $Z^1$ is Oxygen or Sulfur,
wherein said method to make one or more alkylphosphoric triamides results in liquid solution compositions wherein said method to make comprises the following steps:
a) reaction of one or more phosphoryl chlorides, wherein said one or more phosphoryl chlorides comprise one or more phosphoryl trichlorides selected from the structure:

wherein $Z^1$ is one or more members selected from the group consisting of Oxygen and Sulfur,
with one or more alkylamines in a reaction medium wherein said reaction medium comprises Organic Liquid System One resulting in one or more alkyl dichlorophosphoryl amides selected from the structure

wherein $R^1$ is one or more members selected from the group consisting of $CH_3$, $C_2H_5$, $C_3H_7$, $C_4H_9$, $C_5H_{11}$ and $C_6H_{13}$ and
one or more alkyl ammonium chlorides, b) reaction of said one or more alkyl ammonium chlorides with ammonia and/or one or more ammonia generating compounds to generate ammonium chloride and one or more alkylamines for reaction with one or more phosphoryl chlorides,
c) reaction of said one or more alkyl dichlorophosphoryl amides with ammonia and/or one or more ammonia generating compounds to generate ammonium chloride and the one or more alkylphosphoric triamides of Structure I,
d) removal of ammonium chloride by-products by one or more methods selected from the group consisting of
  i) filtration,
  ii) sedimentation and removal of organic layer,
    (1) optionally utilizing ultrasonic probes to enhance sedimentation
  iii) liquefaction of the inorganic salt by-products and subsequent draining off of by-products by one or more methods selected from the group consisting of:
    (1) liquefaction of ammonium chloride with excess ammonia and pressurization of the reaction vessel #1,
    (2) liquefaction of chloride by-products with water addition which has been optionally de-oxygenated, optionally deionized and/or optionally distilled,
    (3) combinations thereof,
e) consolidation of the organic composition and removal of the volatile components of said Organic Liquid System One by one or more methods selected from the group consisting of i) reduced pressure, ii) heating the organic composition to less than 100° C. and iii) combinations thereof,
f) replacing the volatile components of Organic Liquid System One with Organic Liquid System Two by one or more methods selected from the group consisting of i) during the process of removal of the volatile components of Organic Liquid System One, ii) after the process of removal of the volatile components of Organic Liquid System One and iii) combinations thereof, resulting in said one or more alkylphosphoric triamides compounds in liquid solution compositions, wherein said liquid solutions comprise 40-70% wt. of said one or more alkylphosphoric triamide compounds and wherein said liquid solution compositions are fluid at −20° C.,
wherein said Organic Liquid System One comprises one or more aprotic organic liquids that are non-reactive with phosphoryl chloride functional groups and wherein one or more ammonia generating compounds are selected from the group consisting of a) ammonium carbonate and b) ammonium bicarbonate.

In an embodiment, said one or more phosphoryl chlorides comprises $PSCl_3$ and wherein said $PSCl_3$ reacts with said one or more alkylamines and with ammonia to yield said one or more alkylphosphoric triamides selected from Structure I:

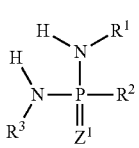

Structure I wherein:
a) $R^2$ is $HNR^4$,
    wherein
    i) $R^4$ is H,
b) $R^1$ is $C_4H_9$, wherein $C_4H_9$ is a linear alkyl functionality,
c) $R^3$ is H, and
d) $Z^1$ is Sulfur.

In an embodiment, said Organic Liquid System One comprises one or more aprotic liquids that are not reactive with one or more phosphoryl chlorides, and wherein said one or more aprotic liquids are selected from the group consisting of a) one or more aprotic liquids that have a boiling point equal to or below 120° C., b) one or more aprotic liquids that have a boiling point above 120° C., and c) mixtures thereof, and wherein said one or more aprotic liquids that have a boiling point equal to or below 120° C. comprise one or more aprotic liquids selected from the group consisting of a) one or more hydrocarbons selected from the group consisting of i) one or more paraffinic liquids, ii) one or more cycloparaffinics, and iii) one or more aromatic hydrocarbons, b) one or more liquid halocarbons c) one or more halohydrocarbons, and d) one or more ethers selected from the group consisting of i) 1,4-dioxane, ii) 1,3-dioxolane, iii) methyltetrahydrofuran, iv) dimethoxyethane, v) 1,3-dioxane, vi) 1,3-dioxolane, vii) 2,2-dimethyl-1,3-dioxolane, viii) diethyl ether, ix) tetrahydrofuran, and x) tetrahydropyran, e) d-limonene, f) 1,2-dimethyloxyethane and f) one or more esters selected from the group consisting of i) $C_1$-$C_6$ alkylformate and ii) $C_1$-$C_6$ alkylacetate.

In an embodiment, said reaction medium comprising said Organic Liquid System One, wherein said Organic Liquid System One comprises one or more aprotic solvents with a boiling point greater than 120° C. selected from the group consisting of:
a) one or more alkylene carbonates selected from the group consisting of i) ethylene carbonate, ii) propylene carbonate, and iii) butylene carbonate,
b) one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin,
c) one or more alkylene glycol alkyl ethers acetates selected from the group consisting of i) dipropylene glycol methyl ether acetate, ii) tripropylene glycol methyl ether acetate, and iii) tripropylene glycol butyl ether acetate,
d) one or more diesters selected from the group consisting of i) $C_1$-$C_6$ dialkylsuccinate, ii) $C_1$-$C_6$ dialkyladipate, iii) $C_1$-$C_6$ dialkylmethylglutarate, iv) $C_1$-$C_6$ dialkyl glutarate, v) $C_1$-$C_6$ dialkyl ethylsuccinate, and vi) $C_1$-$C_6$ dialkyl maleate,
e) one or more 1-alkyl-2-pyrrolidone selected from the group wherein the alkyl functionality is a $C_1$-$C_8$ alkyl radical,
f) one or more members selected from the group consisting of i) dimethylacetamide, ii) dimethylformamide, iii) dimethyl-2-imidazolidinone, iv) isophorone, v) hexamethylphosphoramide, vi) 2-methoxyethyl ether, vii) N,N-dimethyldecanamide, viii) N,N-dimethyloctanamide, ix) limonene, x) sulfolane
g) one or more trialkylphosphates selected from the group represented by the structure:

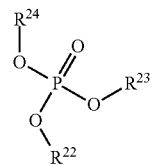

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
h) one or more dialkylene glycols dialkyl ethers, (glymes) selected from the structure:

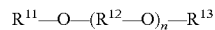

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is one or more integers selected from the group of 1 to 10,
i) one or more hydrocarbons selected from the group consisting of i) one or more paraffinic liquids, ii) one or more cycloparaffinics, iii) one or more aromatic hydrocarbons, iv) aliphatic hydrocarbons, v) acyclic hydrocarbons, vi) unsaturated hydrocarbon, and vii) polyalphaolefins,
j) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and
k) one or more $C_1$-$C_{18}$ fatty triglycerides.

In an embodiment, the molar ratio of the one or more said alkylamines to the one or more said phosphoryl trichlorides is 0.7 to 1.5:1.

In an embodiment, the temperature of the reaction of one or more phosphoryl chlorides with one or more alkylamines is (−40) to 20° C.

In an embodiment, said Organic Liquid System One is charged to a reaction vessel and the temperature of the contents of said reaction vessel is cooled to (−40) to 20° C. and then said one or more phosphoryl trichlorides are charged to said reaction vessel and cooled to (−40) to 20° C.

In an embodiment, said one or more alkylamines are charged slowly and sub-surface of the composition comprising said a) Organic Liquid System One and one or more phosphoryl trichlorides, and wherein the agitation of the contents of said reaction vessel is at medium to high speed resulting in a composition comprising a) Organic Liquid System One, b) said one or more phosphoryl trichlorides, c) said one or more alkyl dichlorophosphoryl amides and d) one or more chloride salts of said one or more alkylamines.

In an embodiment, the one or more chloride salts of said one or more alkylamines are reacted with ammonia freeing the one or more alkylamines to react with said phosphoryl trichlorides.

In an embodiment, the temperature of contents of said reaction vessel are maintained at less than 0° C.

In an embodiment, initially a very slow agitation speed of the contents of said reaction vessel is selected so as to reduce the mixing of the surface of the contents of said reaction vessel to low, wherein said ammonia is slowly charged to the headspace of said reaction vessel to react with said one or more alkyl ammonium chlorides.

In an embodiment, a temperature of contents of said reaction vessel are maintained at less than 0° C.

In an embodiment, after about 14 the total ammonia charge is completed, the agitation speed is then increased to medium or high and the temperature of the contents of said reaction vessel are slowly allowed to increase to less than 100° C., and wherein the temperature is controlled by cooling medium and by addition rate of ammonia and wherein the addition of ammonia results in the consumption of said one or more phosphoryl chlorides.

In an embodiment, the method to make further comprises an addition to the contents of the reaction vessel of one or more members selected from the group consisting of:
  a) a colorant,
  b) a scent,
  c) a buffer,
  d) one or more surfactants, wherein the one or more surfactants comprises one or more members selected from the group consisting of (1) one or more cationic surfactants, (2) one or more amphoteric surfactants, (3) one or more Zwitterionic surfactants, (4) one or more anionic surfactants and (5) one or more nonionic surfactants.

In an embodiment, the method to make does not comprise one or more of the following steps:
  a) recovery and purification of solid said one or more alkylphosphoric triamides compounds,
  b) packaging of solid said one or more alkylphosphoric triamides,
  c) shipping and storage of solid said one or more alkylphosphoric triamides, and/or
  d) dispersing of the solid said one or more alkylphosphoric triamides in a liquid delivery system.

In an embodiment, said Organic Liquid System Two comprises:
  a) dimethyl sulfoxide,
  b) one or more sulfoxide(s) selected from the group consisting of dialkyl, diaryl, or alkylaryl sulfoxide(s) selected from the formula structure:

$R^9S(O)xR^{10}$ wherein
    i) $R^9$ and $R^{10}$ are each independently a $C_1$-$C_6$ alkylene group, an aryl group or $C_1$-$C_3$ alkylenearyl group,
    ii) or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring,
    iii) and x is 1 or 2,
  c) one or more alkylene carbonates selected from the group consisting of i) ethylene carbonate, ii) propylene carbonate, and iii) butylene carbonate,
  d) one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin,
  e) one or more alkylene glycol alkyl ethers acetates selected from the group consisting of i) dipropylene glycol methyl ether acetate, ii) tripropylene glycol methyl ether acetate, and iii) tripropylene glycol butyl ether acetate,
  f) one or more diesters selected from the group consisting of i) $C_1$-$C_6$ dialkylsuccinate, ii) $C_1$-$C_6$ dialkyladipate, iii) $C_1$-$C_6$ dialkylmethylglutarate, iv) $C_1$-$C_6$ dialkyl glutarate, v) $C_1$-$C_6$ dialkyl ethylsuccinate, and vi) $C_1$-$C_6$ dialkyl maleate,
  g) one or more 1-alkyl-2-pyrrolidone selected from the group wherein the alkyl functionality is a $C_1$-$C_8$ alkyl radical,
  h) one or more members selected from the group consisting of i) dimethylacetamide, ii) dimethylformamide, iii) dimethyl-2-imidazolidinone, iv) isophorone, v) hexamethylphosphoramide, vi) 2-methoxyethyl ether, vii) N,N-dimethyldecanamide, viii) N,N-dimethyloctanamide, ix) limonene, x) sulfolane
  i) one or more trialkylphosphates selected from the group represented by the structure:

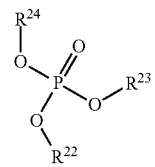

wherein:
    $R^{22}$ is alkyl radical —$C_1H_3$ to —$C_6H_{13}$
    $R^{23}$ is alkyl radical —$C_1H_3$ to —$C_6H_{13}$
    $R^{24}$ is alkyl radical —$C_1H_3$ to —$C_6H_{13}$
  j) one or more dialkylene glycols dialkyl ethers, (glymes) selected from the structure:

$R^{11}$—O—$(R^{12}$—O$)_n$—$R^{13}$ wherein:
    $R^{11}$ is one or more alkyl radicals selected from the group consisting of $C_1$ to $C_6$,
    $R^{12}$ is one or more alkylene radicals selected from the group consisting of $C_1$ to $C_4$,
    $R^{13}$ is one or more alkyl radicals selected from the group consisting of $C_1$ to $C_6$,
    and n is one or more integers selected from the group of 1 to 10,
  k) one or more hydrocarbons selected from the group consisting of i) one or more paraffinic liquids, ii) one or more cycloparaffinics, iii) one or more aromatic hydrocarbons, iv) aliphatic hydrocarbons, v) acyclic hydrocarbons, vi) unsaturated hydrocarbon, and vii) polyalphaolefins,
  l) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and
  m) one or more $C_1$-$C_{18}$ fatty triglycerides,
and wherein said protic organic liquid is one or more members selected from the group consisting of:
  a) one or more alkanols selected from the group consisting of $C_1$-$C_{10}$ alkanols,
  b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin,
  c) one or more polyalkylene glycols selected from the group consisting of poly($C_1$-$C_{10}$ alkylene) glycols, d) one or more dioxolane compounds selected from the group consisting of i) 2,2-dimethyl-1,3-dioxolane-4-methanol and ii) 2,2-diisobutyl-1,3-dioxolane-4-methanol, e) one or more alkylene glycol alkyl ethers selected from the structure:

$$R^{14}\diagdown O - \underset{\underset{H}{|}}{\overset{\overset{H}{|}}{C}} - \underset{\underset{H}{|}}{\overset{\overset{R^{16}}{|}}{C}} - O \diagup R^{15}$$

wherein
  $R^{14}$ is one or more members selected from the group consisting of $CH_3$, $C_2H_5$, $C_3H_7$, $C_6H_5$, and $C_4H_9$,
  $R^{15}$ is one or more members selected from the group consisting of H and $$-(CH_2-\overset{\overset{R^{17}}{|}}{CH}-O)_f H,$$

wherein
    $R^{17}$ is one or more members selected from the group consisting of H and $CH_3$,
    and f is an integer between 1 and 15, and
  $R^{16}$ is one or more members selected from the group consisting of H and $CH_3$, f) one or more alkyl lactates selected from the group consisting of i) ethyl lactate, ii) propyl lactate and iii) butyl lactate, g) one or more alkanolamines selected from the group consisting of alkanolamines selected from the structure:

$$R^7\diagdown \underset{R^5\diagup}{N} - R^6$$

wherein
  $R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$,
  $R^6$ is one or more members selected from the group consisting of H, $CH_3$, $C_2H_5$, $C_2H_4OR^8$ and $C_3H_6OH$,
  $R^7$ is one or more members selected from the group consisting of H, $C_2H_4OR^8$ and $C_3H_6OH$,
  wherein
    $R^8$ is $(C_2H_4O)_g H$
    wherein
      g is an integer between 1 and 10, h) and glycerol carbonate.

In an embodiment, the invention relates to a method to make one or more nitrogenous phosphoryl compounds, wherein said one or more nitrogenous phosphoryl compounds comprise one or more alkylphosphoric triamides selected from the Structure I:

Structure I $$\underset{R^3\diagup}{\overset{H\diagdown}{N}} - \underset{\overset{\|}{Z^1}}{P} - R^2 \quad , \quad \overset{H\diagdown}{\underset{H\diagup}{N}}\diagdown R^1$$

wherein:
  a) $R^2$ is one or more members selected from the group consisting of $CH_3$, $C_2H_5$, $C_3H_7$, $C_4H_9$, $C_5$Hui, $C_6H_{13}$, $C_6H_5$, $C_7H_7$, $OX^1$, $OCH_3$, $OC_2H_5$, $OC_3H_7$, $OC_4H_9$, $OC_5H_{11}$, $OC_6H_{13}$, and $HNR^4$,
    wherein
      i) $R^4$ is one or more members selected from the group consisting of H, $CH_3$, $C_2H_5$, $C_3H_7$, $C_4H_9$, $C_5$Hui, $C_6H_5$, and $C_6H_{13}$,
      ii) $X^1$ is one or more members selected from the group consisting of
        (1) H, Na, Li, and K,
        (2) $NH_4$,
        (3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
  b) $R^1$ is one or more members selected from the group consisting of $CH_3$, $C_2H_5$, $C_3H_7$, $C_4H_9$, $C_5H_{11}$ and $C_6H_{13}$,
  c) $R^3$ is one or more members selected from the group consisting of H, $CH_3$, $C_2H_5$, $C_3H_7$, $C_4H_9$, $C_5H_{11}$ and $C_6H_{13}$,
  d) $Z^1$ is one or more members selected from the group consisting of Oxygen and Sulfur,
wherein said method to make one or more alkylphosphoric triamides compounds results in fluid compositions, wherein said fluid composition comprises one or more physical states selected from the group consisting of a) colloid and b) suspension, wherein said method to make comprises the following steps:
  a) reaction of one or more phosphoryl chlorides, wherein said one or more phosphoryl chlorides comprise one or more phosphoryl trichlorides selected from the structure:

$$PZ^1Cl_3$$

wherein $Z^1$ is one or more members selected from the group consisting of Oxygen and Sulfur,
  with one or more alkylamines in a reaction medium wherein said reaction medium comprises Organic Liquid System One resulting in one or more alkyl dichlorophosphoryl amides selected from the structure $$R^1PZ^1Cl_2$$

wherein $R^1$ is one or more members selected from the group consisting of $CH_3$, $C_2H_5$, $C_3H_7$, $C_4H_9$, $C_5H_{11}$ and $C_6H_{13}$
  and one or more alkyl ammonium chlorides,
  b) reaction of said one or more alkyl ammonium chlorides with ammonia and/or one or more ammonia generating compounds to generate ammonium chloride and the one or more alkylamines for reaction with one or more phosphoryl chlorides, c) reaction of said one or more alkyl dichlorophosphoryl amides with ammonia and/or one or more ammonia generating compounds to generate ammonium chloride and said one or more alkylphosphoric triamides compounds in fluid compositions, wherein said fluid compositions comprise one or more physical states selected from the group consisting of a) colloid and b) suspensions, wherein said fluid compositions comprise 40-70% wt. of said one or more alkylphosphoric triamide compounds and wherein said fluid compositions are fluid at −20° C., wherein said Organic Liquid System One comprises one or more aprotic organic liquids that are non-reactive with phosphoryl chloride functional groups and have a boiling point above 120° C. and wherein one or more ammonia generating compounds are selected from the group consisting of a) ammonium carbonate and b) ammonium bicarbonate.

In an embodiment, said one or more phosphoryl chlorides comprises $PSCl_3$, and wherein said $PSCl^3$ reacts with said one or more alkylamines and with ammonia to yield said one or more alkylphosphoric triamides selected from Structure I:

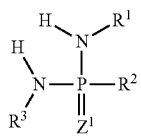

Structure I wherein:
  a) $R^2$ is $HNR^4$,
     wherein
       i) $R^4$ is H,
  b) $R^1$ is $C_4H_9$, wherein $C_4H_9$ is a linear alkyl functionality,
  c) $R^3$ is H, and
  d) $Z^1$ is Sulfur, In an embodiment, the reaction medium comprises said Organic Liquid System One, wherein said Organic Liquid System One comprises one or more aprotic liquids that are not reactive with one or more phosphoryl chlorides, wherein said one or more aprotic liquids have a boiling point above 120° C. are selected from the group consisting of:
  a) one or more alkylene carbonates selected from the group consisting of i) ethylene carbonate, ii) propylene carbonate, and iii) butylene carbonate,
  b) one or more polyols capped with $C_1$-$C_6$ organic acid wherein the polyol portion is selected from the group consisting of i) ethylene glycol, ii) 1,3 propylene glycol, iii) 1,2 propylene glycol, iv) butylene glycol, v) trimethylol propane, vi) trimethylol ethane, vii) pentaerythritol, viii) sorbitol, ix) sorbitan, x) glucose, xi) fructose, xii) galactose and xiii) glycerin,
  c) one or more alkylene glycol alkyl ethers acetates selected from the group consisting of i) dipropylene glycol methyl ether acetate, ii) tripropylene glycol methyl ether acetate, and iii) tripropylene glycol butyl ether acetate,
  d) one or more diesters selected from the group consisting of i) $C_1$-$C_6$ dialkylsuccinate, ii) $C_1$-$C_6$ dialkyladipate, iii) $C_1$-$C_6$ dialkylmethylglutarate, iv) $C_1$-$C_6$ dialkyl glutarate, v) $C_1$-$C_6$ dialkyl ethylsuccinate, and vi) $C_1$-$C_6$ dialkyl maleate,
  e) one or more 1-alkyl-2-pyrrolidone selected from the group wherein the alkyl functionality is a $C_1$-$C_8$ alkyl radical,
  f) one or more members selected from the group consisting of i) dimethylacetamide, ii) dimethylformamide, iii) dimethyl-2-imidazolidinone, iv) isophorone, v) hexamethylphosphoramide, vi) 2-methoxyethyl ether, vii) N,N-dimethyldecanamide, viii) N,N-dimethyloctanamide, ix) limonene, x) sulfolane
  g) one or more trialkylphosphates selected from the group represented by the structure:

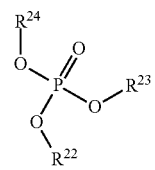

wherein:
  $R^{22}$ is alkyl radical —$C_1H_3$ to —$C_6H_{13}$
  $R^{23}$ is alkyl radical —$C_1H_3$ to —$C_6H_{13}$
  $R^{24}$ is alkyl radical —$C_1H_3$ to —$C_6H_{13}$
  h) one or more dialkylene glycols dialkyl ethers, (glymes) selected from the structure:

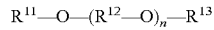

wherein:
  $R^{11}$ is one or more alkyl radicals selected from the group consisting of $C_1$ to $C_6$,
  $R^{12}$ is one or more alkylene radicals selected from the group consisting of $C_1$ to $C_4$,
  $R^{13}$ is one or more alkyl radicals selected from the group consisting of $C_1$ to $C_6$,
  and n is one or more integers selected from the group of 1 to 10,
  i) one or more hydrocarbons selected from the group consisting of i) one or more paraffinic liquids, ii) one or more cycloparaffinics, iii) one or more aromatic hydrocarbons, iv) aliphatic hydrocarbons, v) acyclic hydrocarbons, vi) unsaturated hydrocarbon, and vii) polyalphaolefins,
  j) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and
  k) one or more $C_1$-$C_{18}$ fatty triglycerides.

In an embodiment, said reaction medium further comprises an Organic Liquid System One, wherein said Organic Liquid System One comprises one or more aprotic solvents with a boiling point less than or equal to 120° C. selected from the group consisting of a) one or more hydrocarbons selected from the group consisting of i) one or more paraffinic liquids, ii) one or more cycloparaffinics, and iii) one or more aromatic hydrocarbons, b) one or more liquid halocarbons c) one or more halohydrocarbons, and d) one or more ethers selected from the group consisting of i) 1,4-dioxane, ii) 1,3-dioxolane, iii) methyltetrahydrofuran, iv) dimethoxyethane, v) 1,3-dioxane, vi) 1,3-dioxolane, vii) 2,2-dimethyl-1,3-dioxolane, viii) diethyl ether, ix) tetrahydrofuran, and x) tetrahydropyran, e) d-limonene, f) 1,2-dimethyloxyethane and f) one or more esters selected from the group consisting of i) $C_1$-$C_6$ alkylformate and ii) $C_1$-$C_6$ alkylacetate.

In an embodiment, the molar ratio of the one or more said alkylamines to the one or more said phosphoryl trichlorides is 0.7 to 1.5:1.

In an embodiment, the temperature of the reaction of one or more phosphoryl chlorides with one or more alkylamines is (−40) to 20° C.

In an embodiment, said Organic Liquid System One is charged to a reaction vessel and the temperature of the contents of said reaction vessel is cooled to (−40) to 20° C. and then said one or more phosphoryl trichlorides is charged to said reaction vessel and cooled to (−40) to 20° C.

In an embodiment, said one or more alkylamines are charged slowly and sub-surface of the composition comprising said a) Organic Liquid System One and b) said one or more phosphoryl trichlorides, wherein the agitation of the contents of said reaction vessel is at medium to high speed resulting in a composition comprising a) Organic Liquid System One, b) said one or more phosphoryl trichlorides, c) said one or more alkyl dichlorophosphoryl amides and d) one or more chloride salts of said one or more alkylamines.

In an embodiment, the one or more chloride salts of said one or more alkylamines are reacted with ammonia freeing the one or more alkylamines to react with said phosphoryl trichlorides.

In an embodiment, a temperature of contents of said reaction vessel are maintained at less than 0° C.

In an embodiment, initially a very slow agitation speed of the contents of said reaction vessel is selected so as to reduce the surface mixing with the reaction medium below the surface and wherein said ammonia is slowly charged to the headspace of reaction vessel to react with said one or more alkyl ammonium chlorides.

In an embodiment, a temperature of contents of said reaction vessel are maintained at less than 0° C.

In an embodiment, after about 14 the total ammonia charge is completed, the agitation speed is increased to medium or high and the temperature of the contents are slowly allowed to increase to less than 100° C., wherein the temperature is controlled by cooling medium and by addition rate of ammonia and wherein the addition of ammonia results in the consumption of said one or more phosphoryl chlorides.

In an embodiment, the method to make further comprises an addition to the contents of the reaction vessel of one or more members selected from the group consisting of:
a) Organic Liquid System Two to reaction vessel contents, wherein Organic Liquid System Two comprises one or more organic liquids selected from the group consisting of a) one or more aprotic organic liquids and b) one or more protic organic liquids wherein said one or more aprotic liquids are selected from the group consisting of:
  i) dimethyl sulfoxide,
  ii) one or more sulfoxide(s) selected from the group consisting of dialkyl, diaryl, or alkylaryl sulfoxide(s) selected from the formula structure:

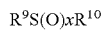

wherein
    (1) $R^9$ and $R^{10}$ are each independently a $C_1$-$C_6$ alkylene group, an aryl group or $C_1$-$C_3$ alkylenearyl group,
    (2) or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring,
    (3) and x is 1 or 2,
iii) one or more alkylene carbonates selected from the group consisting of (1) ethylene carbonate, (2) propylene carbonate, and (3) butylene carbonate,
iv) one or more polyols capped with $C_1$-$C_6$ organic acid wherein the polyol portion is selected from the group consisting of (1) ethylene glycol, (2) 1,3 propylene glycol, (3) 1,2 propylene glycol, (4) butylene glycol, (5) trimethylol propane, (6) trimethylol ethane, (7) pentaerythritol, (8) sorbitol, (9) sorbitan, (10) glucose, (11) fructose, (12) galactose and (13) glycerin,
v) one or more alkylene glycol alkyl ethers acetates selected from the group consisting of (1) dipropylene glycol methyl ether acetate, (2) tripropylene glycol methyl ether acetate, and (3) tripropylene glycol butyl ether acetate,
vi) one or more diesters selected from the group consisting of (1) $C_1$-$C_6$ dialkylsuccinate, (2) $C_1$-$C_6$ dialkyladipate, (3) $C_1$-$C_6$ dialkylmethylglutarate, (4) $C_1$-$C_6$ dialkyl glutarate, (5) $C_1$-$C_6$ dialkyl ethylsuccinate, and (6) $C_1$-$C_6$ dialkyl maleate,
vii) one or more 1-alkyl-2-pyrrolidone selected from the group wherein the alkyl functionality is a $C_1$-$C_8$ alkyl radical,
viii) one or more members selected from the group consisting of (1) dimethylacetamide, (2) dimethylformamide, (3) dimethyl-2-imidazolidinone, (4) isophorone, (5) hexamethylphosphoramide, (6) 2-methoxyethyl ether, (7) N,N-dimethyldecanamide, (8) N,N-dimethyloctanamide, (9) limonene, (10) sulfolane
ix) one or more trialkylphosphates selected from the group represented by the structure:

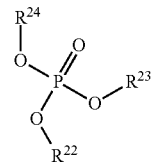

wherein:
  $R^{22}$ is alkyl radical —$C_1H_3$ to —$C_6H_{13}$
  $R^{23}$ is alkyl radical —$C_1H_3$ to —$C_6H_{13}$
  $R^{24}$ is alkyl radical —$C_1H_3$ to —$C_6H_{13}$
x) one or more dialkylene glycols dialkyl ethers, (glymes) selected from the structure:

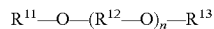

wherein:
  $R^{11}$ is one or more alkyl radicals selected from the group consisting of $C_1$ to $C_6$,
  $R^{12}$ is one or more alkylene radicals selected from the group consisting of $C_1$ to $C_4$,
  $R^{13}$ is one or more alkyl radicals selected from the group consisting of $C_1$ to $C_6$,
  and n is one or more integers selected from the group of 1 to 10,
xi) one or more hydrocarbons selected from the group consisting of (1) one or more paraffinic liquids, (2) one or more cycloparaffinics, (3) one or more aromatic hydrocarbons, (4) aliphatic hydrocarbons, (5) acyclic hydrocarbons, (6) unsaturated hydrocarbon, and (7) polyalphaolefins, xii) one or more fatty acid alkyl esters wherein the one or more fatty acid functionality is selected from the group consisting of $C_8$-$C_{18}$ fatty acids and wherein the alkyl functionality is one or more $C_1$-$C_6$ alkyl radicals, and xiii) one or more $C_1$-$C_{18}$ fatty triglycerides, and wherein said one or more protic organic liquid are selected from the group consisting of:

i) one or more alkanols selected from the group consisting of $C_1$-$C_{10}$ alkanols, ii) one or more polyols selected from the group consisting of (1) trimethylol propane, (2) trimethylol ethane, (3) pentaerythritol, (4) sorbitol, (5) sorbitan, (6) glucose, (7) fructose, (8) galactose, and (9) glycerin, iii) one or more polyalkylene glycols selected from the group consisting of poly($C_1$-$C_{10}$ alkylene) glycols, iv) one or more dioxolane compound selected from the group consisting of (1) 2,2-dimethyl-1,3-dioxolane-4-methanol and (2) 2,2-diisobutyl-1,3-dioxolane-4-methanol, v) one or more alkylene glycol alkyl ethers selected from the structure:

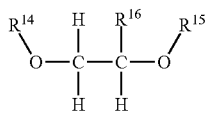

wherein
$R^{14}$ is one or more members selected from the group consisting of $CH_3$, $C_2H_5$, $C_3H_7$, $C_6H_5$, and $C_4H_9$,
$R^{15}$ is one or more members selected from the group consisting of H and —(CH$_2$—CH(R$^{17}$)—O)$_f$H, wherein
$R^{17}$ is one or more members selected from the group consisting of H and $CH_3$, and f is an integer between 1 and 15, and
$R^{16}$ is one or more members selected from the group consisting of H and $CH_3$, vi) one or more alkyl lactates selected from the group consisting of (1) ethyl lactate, (2) propyl lactate and (3) butyl lactate, vii) one or more alkanolamines selected from the group consisting of alkanolamines selected from the structure:

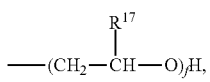

wherein
$R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$, $R^6$ is one or more members selected from the group consisting of H, $CH_3$, $C_2H_5$, $C_2H_4OR^8$ and $C_3H_6OH$, $R^7$ is one or more members selected from the group consisting of H, $C_2H_4OR^8$ and $C_3H_6OH$,
wherein
$R^8$ is $(C_2H_4O)_gH$
wherein
g is an integer between 1 and 10, viii) and glycerol carbonate, b) a colorant,
c) a scent,
e) a buffer,
f) one or more surfactants, wherein the one or more surfactants comprises one or more members selected from the group consisting of (a) one or more cationic surfactants, (b) one or more amphoteric surfactants, (c) one or more Zwitterionic surfactants, (d) one or more anionic surfactants and (e) one or more nonionic surfactants.

In an embodiment, the method to make does not comprise one or more of the following steps:
a) removing inorganic chloride salts,
b) stripping of volatile components of Organic Liquid System One,
c) handling and purifying volatile components recovered from the stripping of reaction vessel contents
d) handling of waste by-products and waste from purification steps
e) recovering and purifying solid said one or more alkylphosphoric triamides compounds,
f) packaging of solid said one or more alkylphosphoric triamides,
g) shipping and storage of solid said one or more alkylphosphoric triamides, and/or
h) dissolving of the solid said one or more alkylphosphoric triamide in a liquid delivery system.

In an embodiment, the present invention relates to a method to make one or more nitrogenous phosphoryl compounds, wherein said method comprises using specific gravity to create differential levels in a reaction medium wherein a first reactant and a second reactant react to generate an intermediate third reactant and an intermediate fourth reactant, said intermediate third reactant having a different specific gravity than the specific gravity of the first reactant, the specific gravity of the second reactant, and the specific gravity of the intermediate fourth reactant, wherein the different specific gravity causes the intermediate third reactant to rise to a surface of the reaction medium, wherein a fifth gaseous reactant is introduced at the surface of the reaction medium allowing the fifth gaseous reactant to react with the intermediate third reactant to generate the one or more nitrogenous phosphoryl compounds.

In an embodiment, when the intermediate third reactant is completely reacted, the reaction medium is homogenous and no longer has differential levels based upon specific gravity, In an embodiment, the intermediate fourth reactant subsequently reacts with the fifth gaseous reactant to generate one or more nitrogenous phosphoryl compounds.

In an embodiment, the reaction medium is kept at a temperature below 0° C.

In an embodiment, the reaction medium is agitated at a rate that allows the third reactant to rise to the surface.

In an embodiment, the fifth gaseous reactant is introduced below the surface of the reaction medium.

In an embodiment, the reaction medium comprises one or more organic liquids that are non-reactive with phosphoryl chloride functional groups.

In an embodiment, the one or more organic liquids comprise one or more aprotic liquids that have a boiling point equal to or below 120° C. selected from the group consisting of a) one or more hydrocarbons selected from the group consisting of i) one or more paraffinic liquids, ii) one or more cycloparaffinics, and iii) one or more aromatic hydrocarbons, b) one or more liquid halocarbons c) one or more halohydrocarbons, and d) one or more ethers selected from the group consisting of i) 1,4-dioxane, ii) 1,3-dioxolane, iii) methyltetrahydrofuran, iv) dimethoxyethane, v) 1,3-dioxane, vi) 1,3-dioxolane, vii) 2,2-dimethyl-1,3-dioxolane, viii) diethyl ether, ix) tetrahydrofuran, and x) tetrahydropyran, e) d-limonene, f) 1,2-dimethyloxyethane and f) one or more esters selected from the group consisting of i) $C_1$-$C_6$ alkylformate and ii) $C_1$-$C_6$ alkylacetate.

In an embodiment, the method further comprises adding between 1-10 wt. % water or ammonium hydroxide.

In an embodiment, the method further comprises a filtering step. In a variation, the filtrate from the filtering step is ammonium chloride. In a variation, the ammonium chloride can be collected and used as a nitrification inhibitor.

In an embodiment, the first reactant is $PSCl_3$.

In an embodiment, the second reactant is a $C_1$-$C_6$ n-alkyl amine.

In an embodiment, the intermediate third reactant is a $C_1$-$C_6$ alkyl ammonium chloride.

In an embodiment, the intermediate fourth reactant is a n-$C_1$-$C_6$ alkyl thiophosphoric dichloro monoamide.

In an embodiment, the fifth gaseous reactant is ammonia.

In an embodiment, the reaction medium comprises a first organic liquid that is replaced by a second organic liquid.

In an embodiment, the second organic liquid is one or more liquids that can be used to deliver the one or more nitrogenous phosphoryl compounds to a substrate. In a variation, the one or more nitrogenous phosphoryl compounds are used as urease inhibitors.

In an embodiment, the substrate is a fertilizer granule.

In an embodiment, the fertilizer granule is a urea granule.

In an embodiment, the second organic liquid comprises DMSO (dimethyl sulfoxide) or NMP (n-methyl pyrrolidone) or mixtures thereof.

Liquid non-aqueous solution compositions comprising urease and nitrification inhibitors have been developed for use on animal waste to slow the biological degradation of urea and ammonium ions for stabilization of a nitrogen value of animal waste while simultaneously decreasing formation of $N_2O$. McKnight (U.S. Pat. Nos. 9,637,420; 9,650,306; 10,633,300; 10,974,999; and 11,312,667) describes improved liquid delivery compositions of urease inhibitors and/or nitrification inhibitors designed for manure-based fertilizers. The utilization of non-aqueous liquid solution compositions of nitrification inhibitors and urease inhibitors that are fluid at temperatures as low as −20° C. allows for ease of application to animal waste throughout the year. However, these compositions are based on a costly urease inhibitor, NBPT, and they require processing steps to dissolve the solid NBPT and the nitrification inhibitors into a solution. Although fluid liquid systems are preferred, the cost of these liquid systems limits their utility for treating animal waste.

Barth (U.S. Pat. No. 6,802,882) teaches the use of polyacids within a mixture wherein the mixture contains selected pyrazole derivatives functioning as nitrification inhibitors to yield stabilizers of liquid manure. These mixtures also contain water, which maintains the liquid fluidity of the composition.

McKnight (U.S. Patent Application Publication 2019/0169081) discloses dry, flowable additive compositions for slowing the biological degradation of urea and manure, which results in stabilization of a nitrogen value of animal waste while simultaneously decreasing formation of $N_2O$. These dry, flowable additive compositions are shown to comprise one or more nitrification inhibitor particles coated with one or more urease inhibitors, wherein the one or more urease inhibitors have been dissolved in one or more non-aqueous organic solvents to form liquid solutions. McKnight also teaches that the dry, flowable additive compositions can be dissolved in water and applied as an aqueous solution, wherein the aqueous solution could be applied to animal waste by an automated spraying, metering system and/or by a manual sprayer. While the aqueous composition innovation can deliver a more cost-effective level of inhibition to animal waste compared to the non-aqueous inhibitor solutions, the application of a dry flowable powder to animal waste is time consuming and requires a lot of manual labor. This innovation also relies on costly raw starting materials that are needed to produce a coated dry additive. While one can overcome the inconvenience of powder by dissolving it in water, this approach carries the cost of requiring another processing step.

The present invention relates to a low cost, fluid delivery system comprising an optimized level of urease and nitrification inhibition properties that can be applied to animal waste by an automated spraying or metering/mixing system. We expect this technology to be widely adopted by animal waste generators and farmers because it efficiently uses animal waste products in a low cost manner with potential for greatly enhancing crop yield. The mass adoption of this technology would result in better quality natural fertilizers while improving overall environmental impact of fertilization.

BRIEF SUMMARY OF THE INVENTION

In an embodiment, the present invention relates to stable, fluid suspension compositions that comprise one or more inhibitor particles selected from the group consisting of a) one or more urease inhibitor particles, b) one or more nitrification inhibitor particles, c) one or more fused particles, and d) combinations thereof, wherein said one or more fused particles compositions comprise one or more urease inhibitors and one or more nitrification inhibitors. In another embodiment, said fluid suspension compositions are be applied directly to animal waste utilizing automated spraying systems or can be metered into liquid animal waste to slow down the biological degradation of urea and ammonium ions, resulting in the stabilization of a nitrogen value of animal waste while simultaneously decreasing formation of $N_2O$.

In an embodiment, said fluid suspension compositions further comprise one or more additional nitrification inhibitors selected from the group consisting of 2-chloro-6-(trichloromethyl)pyridine, 4-amino-1,2,4-triazole-HCI, 2,4-diamino-6-trichloromethyltriazine CL-1580, dicyandiamide (DCD), thiourea, 1-mercapto-1,2,4-triazole, ammonium thiosulfate, one or more dimethyl pyrazole salts selected from the group consisting of i) organic salts, ii) inorganic salts and iii) combinations thereof and 2-amino-4-chloro-6-methylpyrimidine, wherein the fluid suspension compositions can be formulated to provide multiple modes of action thereby providing increased protection against nitrification and denitrification biological processes.

DETAILED DESCRIPTION

In an embodiment, the present invention relates to fluid suspension compositions comprising one or more inhibitor particles selected from the group consisting of a) one or more urease inhibitor particles, b) one or more nitrification inhibitor particles, c) one or more fused particles, and d) combinations thereof, wherein said one or more fused particles comprise of one or more urease inhibitors and one or more nitrification inhibitors that can be applied to animal waste utilizing automated spraying systems or can be metered into liquid animal waste to slow down the biological degradation of urea and ammonium ions resulting in the stabilization of a nitrogen value of animal waste while simultaneously decreasing formation of $N_2O$. In an embodiment, said one or more urease inhibitor particles comprise one or more nitrogenous phosphoryl compounds. In another embodiment, one or more nitrogenous phosphoryl compounds comprise one or more phosphoramides. In a variation, said one or more phosphoramides comprises one or more alkyl thiophosphoric triamides. In another variation, the one or more alkyl thiophosphoric triamides comprises N-(n-butyl)-thiophosphoric triamide (NBPT).

In an embodiment, said one or more nitrification inhibitor particles comprise one or more chloride salts. In a variation, said one or more chloride salts comprises ammonium chloride. In another variation, the cation of said one or more chloride salts is one or more metal cations selected from the group consisting of a) Na, b) K, c) Mg, d) Ca, e) Fe, f) Zn, g) Mn, h) Cu, i) Co, j) Mo, k) Ni, and l) combinations thereof. In another variation, ammonium chloride salt is a nitrification inhibitor.

In an embodiment, said fluid suspension compositions comprise one or more reaction products of one or more phosphoryl chloride functionalities reacted with one or more nitrogenous compounds within a reaction medium, wherein said reaction medium comprises organic liquid system one, wherein said organic liquid system one comprises one or more aprotic liquids, wherein said one or more aprotic liquids are of low volatility and are not reactive with said one or more phosphoryl chloride functionalities, and wherein one or more urease inhibitor particles, one or more nitrification inhibitor particles, and one or more fused particles are reaction products formed in situ within said organic liquid system one.

In an embodiment, the present invention relates to using one or more of three organic liquid systems: 1) organic liquid system one, 2) organic liquid system two, and 3) organic liquid system three. Organic liquid system one is an organic liquid system that is used as a reaction medium. Organic liquid system two (discussed in more detail below) is an organic liquid system that is added post reaction to improve properties of the fluid suspension. Organic liquid system three (discussed in more detail below) is an organic liquid system that comprises surfactants that is added post reaction to improve qualities such as water dispersability. In an embodiment, said one or more phosphoryl chloride functionalities comprises one or more phosphoryl functionalities selected from the group consisting of a) Cl—P=O, b) Cl—P, c) Cl—P=S, and d) combinations thereof. In a variation, one or more phosphoryl chloride functionalities comprise one or more of a) phosphorous trichloride ($PCl_3$), b) phosphoryl trichloride ($POCl_3$), and c) thiophosphoryl trichloride ($PSCl_3$).

In an embodiment, one or more nitrogenous compounds comprise a) one or more alkylamines selected from the group consisting of i) one or more monoalkyl amines, and ii) one or more dialkyl amines, b) ammonia and/or ammonium hydroxide, wherein the alkyl functionalities of said one or more monoalkyl amines and said one or more dialkyl amines are selected from the group consisting of (a) —$C_1H_3$, (b) —$C_2H_5$, (c) —$C_3H_7$, (d) —$C_4H_9$, (e) —$C_5Hui$, (f) —$C_6H_5$, and (g) —$C_6H_{13}$. In a variation, said alkyl functionalities comprise a linear alkyl functionality or a branched alkyl functionality.

In an embodiment, said one or more fused particles are fused binary particles comprising one or more nitrogenous phosphoryl particles and one or more chloride salt particles.

In an embodiment, a manufacturing process for the formation of said fluid suspension compositions does not comprise solvent washing of suspension particles. In another embodiment, said manufacturing process does not comprise the filtering of suspension particles. In another embodiment, said manufacturing process does not comprise the removal of the organic liquid system one.

In an embodiment, the fluid suspension compositions further comprise one or more members selected from the group consisting of a) one or more colorants, b) one or more buffers, c) one or more fragrance/odor masking agents, d) one or more micro-nutrients, and e) organic liquid system three. In a variation, said organic liquid system three comprises one or more surfactants comprising one or more functionalities selected from the group consisting of a) one or more anionic functionalities, b) one or more cationic functionalities, c) one or more ampholyte functionalities, d) one or more amphoteric functionalities, e) one or more nonionic functionalities and f) combinations thereof.

In a variation, said one or more surfactants consisting of one or more cationic functionalities comprises one or more members selected from the group consisting of (a) isostearyl amino propalkonium chloride, (b) olealkonium chloride, (c) triethylmethylammonium chloride, (d) methyl triethanol ammonium methyl sulfate, (e) ethyl triethanol ammonium ethyl sulfate, (f) coconut trimethylammonium chloride, (g) coconut trimethylammonium methyl sulfate, (h) coconut dimethylethylammonium ethyl sulfate, (f) lauryl trimethylammonium chloride, (g) lauryl trimethylammonium methyl sulfate, (h) lauryl dimethylethylammonium ethyl sulfate, (i) one or more fatty acid amido propyl trimethyl ammonium chloride wherein the one or more fatty acids is selected from the group consisting of (1) capric acid, (2) caprylic acid, (3) lauric acid, (4) isostearic acid, and (5) oleic acid, (j) one or more fatty acid amido propyl trimethyl ammonium methyl sulfates wherein the one or more fatty acids is selected from the group consisting of (1) capric acid, (2) caprylic acid, (3) lauric acid, (4) isostearic acid, and (5) oleic acid, (k) one or more fatty acid amido propyl ethyl dimethyl ammonium ethyl sulfate wherein the one or more fatty acids are selected from the group consisting of (1) capric acid, (2) caprylic acid, (3) lauric acid, (4) isostearic acid, and (5) oleic acid, (m) methyl triethanol ammonium chloride, (n) N-ethyl-N, N-dipolyethoxyethyl-N-tallowalkylammonium ethosulfate, (o) N-methyl-N,N-dipolyethoxyethyl-N-tallowalkylammonium methosulfate, and (p) N-methyl-N,N-dipolyethoxyethyl-N-tallowalkylammonium chloride.

In a variation, said one or more surfactants having one or more nonionic functionalities comprise (1) one or more alkoxylated functionalities wherein, alkoxylated refers to the reaction of one or more alkoxides selected from the group consisting of (a) ethylene oxide, (b) propylene oxide and (c) mixtures thereof with one or more functionalities wherein said one or more functionalities are selected from the group consisting of (a) one or more alkanolamides, (b) sorbitan monooleate, (c) sorbitan trioleate, (d) one or more alcohols wherein the one or more alcohols are selected from the group consisting of (i) octanol, (ii) isooctanol, (iii) 2-ethyl hexanol, (iv) nonanol, (v) decanol, (vi) isodecanol, (vii) undecanol, (viii) lauryl alcohol, (ix) trideceth alcohol, (x) oleyl alcohol, (xi) linoleyl alcohol, (xii) linolenyl alcohol, and mixtures thereof, e) tallow amine, f) lauryl amine, (g) oleyl amine and (h) one or more fatty acids wherein the one or more fatty acid are selected from the group consisting of (i) capric acid, (ii) caprylic acid, (iii) lauric acid, (iv) oleic acid, (v) isostearic acid, (vi) linoleic acid, (vii) linolenic acid, (viii) ricinoleic acid, and mixtures thereof, (2) one or more alkanolamides, (3) sorbitan monooleate, (4) sorbitan trioleate, and (5) one or more ethylene oxide/propylene oxide block copolymers.

In a variation, said one or more surfactants having one or more anionic functionalities comprise (1) one or more alkyl diphenyloxide disulfonates and/or their salts, (2) linear alkylbenzene sulfonates and/or their salts, (3) one or more alpha olefin sulfonates and/or their salts, (4) alkyl sulfates and/or their salts, (5) alkyl ethoxy sulfates and/or their salts, (6) alkyl sulfonates and/or their salts, (7) alkyl alkoxy carboxylates and/or their salts, (8) monoalkyl phosphates and/or their salts, (9) dialkyl phosphates and/or their salts, (10) sarcosinates and/or their salts, (11) sulfosuccinates and/or their salts, (12) isethionates and/or their salts, and (13) taurates and/or their salts.

In a variation, said organic liquid system three is added to said fluid suspension compositions to lower viscosity, to improve water dispersibility, and/or to improve storage stability of said fluid suspension compositions.

In an embodiment, the total compositional percentage of nitrification inhibitors may need to be increased to improve the fluid suspension composition's ability to slow down the biological processes associated with urea and with ammonium ions. In an embodiment, said fluid suspension compositions further comprise one or more additional nitrification inhibitors selected from the group consisting of 2-chloro-6-(trichloromethyl)pyridine, 4-amino-1,2,4-triazole-HCI, 2,4-diamino-6-trichloromethyltriazine CL-1580, dicyandiamide (DCD), thiourea, 1-mercapto-1,2,4-triazole, ammonium thiosulfate, one or more dimethyl pyrazole salts selected from the group consisting of i) organic salts, ii) inorganic salts, and iii) combinations thereof and 2-amino-4-chloro-6-methylpyrimidine. In a variation, increasing the compositional percentage of nitrification/denitrification inhibitors increases protection against the nitrification and denitrification biological processes in animal waste.

In an embodiment, one or more additional nitrification inhibitors is added during the manufacturing process in the formation of said fluid suspension compositions. In one embodiment, the one or more additional nitrification inhibitors is added at the completion of the reaction of the one or more phosphoryl chloride functionalities with the one or more nitrogenous compounds. In a variation, the one or more additional nitrification inhibitors can be added as solid particles during the manufacturing process of said fluid suspension compositions.

In another embodiment, one or more additional nitrification inhibitors is mixed with one or more members selected from the group consisting of a) organic liquid system one, b) organic liquid system two, c) organic liquid system three, and d) combinations thereof to form a dispersed additional nitrification inhibitors in these organic liquid systems. In a variation, the dispersed additional nitrification inhibitors are one or more members selected from the group consisting of a) a suspension, b) a colloid, and c) a solution thereof. In another variation, the dispersed additional nitrification inhibitors are blended with the fluid suspension compositions.

In an embodiment, one or more physical properties of the fluid suspension composition are selected from the group consisting of:
a) a viscosity that allows for pumping of the fluid suspension composition through a spray head and or a metering pump,
b) a smooth, homogenous fluid suspension,
c) fluid to at least 0° C.,
d) fluid to at least −10° C.,
e) fluid to at least −20° C.,
f) ease of dispersing into water, and
g) a smooth, homogeneous fluid suspension when stored at temperatures at or around 50° C.

In an embodiment, said fluid suspension composition comprises two or more of said physical properties. In an embodiment, said fluid suspension composition comprises three or more of said physical properties. In an embodiment, said fluid suspension composition comprises four or more of said physical properties. In an embodiment, said fluid suspension composition comprises five or more of said physical properties. In an embodiment, said fluid suspension composition comprises six or more of said physical properties.

In a variation, if said fluid suspension compositions show separation upon storage, said fluid suspension compositions can return to a smooth, homogeneous fluid suspension by mixing.

In an embodiment, said organic liquid system one comprises one or more aprotic liquids, wherein said one or more aprotic liquids are of low volatility and are not reactive with said one or more phosphoryl chloride functionalities, and wherein said one or more aprotic liquids are selected from the group consisting of
a) one or more alkylene carbonates selected from the group consisting of i) ethylene carbonate, ii) propylene carbonate, and iii) butylene carbonate, b) one or more trialkyl phosphates of structure:

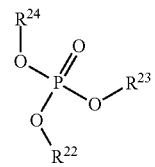

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
c) one or more polyols capped with a $C_1$-$C_6$ organic acid wherein of the one or more polyols comprise: (i) ethylene glycol, (ii) 1,3 propylene glycol, (iii) 1,2 propylene glycol, (iv) butylene glycol, (v) trimethylol propane, (vi) trimethylol ethane, (vii) pentaerythritol, (viii) sorbitol, (ix) sorbitan, (x) glucose, (xi) fructose, (xii) galactose and (xiii) glycerin, d) one or more alkylene glycol alkyl ethers acetates selected from the group consisting of (i) dipropylene glycol methyl ether acetate, (ii) tripropylene glycol methyl ether acetate, and (iii) tripropylene glycol butyl ether acetate, e) one or more diesters selected from the group consisting of (i) $C_1$-$C_6$ dialkylsuccinate, (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate, f) one or more fatty acid alkyl esters comprising a fatty acid functionality and an alkyl functionality wherein the fatty acid functionality comprises $C_8$-$C_{18}$ fatty acids and wherein the alkyl functionality is one or more $C_1$-$C_6$ alkyl radicals, and g) one or more dialkylene glycols dialkyl ethers of structure:

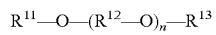

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is one or more integers selected from the group of 1 to 10.

In an embodiment, additional organic liquid system one can be added post-reaction to said fluid suspension compositions.

In an embodiment, said fluid suspension compositions further comprise an organic liquid system two, wherein said organic liquid system two comprises one or more organic liquids selected from the group consisting of:
a) one or more alkanols selected from the group consisting of $C_1$-$C_{10}$ alkanols, b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin, c) one or more polyalkylene glycols selected from the group consisting of poly($C_1$-$C_{10}$ alkylene) glycols, d) one or more dioxolane compound selected from the group consisting of i) 2,2-dimethyl-1,3-dioxolane-4-methanol and ii) 2,2-diisobutyl-1,3-dioxolane-4-methanol, e) one or more alkylene glycol alkyl ethers of structure:

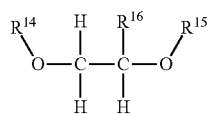

wherein
$R^{14}$ is one or more members selected from the group consisting of $CH_3$, $C_2H_5$, $C_3H_7$, $C_6H_5$, and $C_4H_9$,
$R^{15}$ is one or more members selected from the group consisting of H and

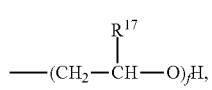

wherein
$R^{17}$ is one or more members selected from the group consisting of H and $CH_3$,
and f is an integer between 1 and 15, and
$R^{16}$ is one or more members selected from the group consisting of H and $CH_3$, f) one or more alkyl lactates selected from the group consisting of i) ethyl lactate, ii) propyl lactate and iii) butyl lactate, g) one or more alkanolamines of structure:

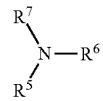

wherein
$R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$,
$R^6$ is one or more members selected from the group consisting of H, $CH_3$, $C_2H_5$, $C_2H_4OR^8$ and $C_3H_6OH$,
$R^7$ is one or more members selected from the group consisting of H, $C_2H_4OR^8$ and $C_3H_6OH$,
wherein
$R^8$ is $(C_2H_4O)_gH$
wherein
g is an integer between 1 and 10,
h) glycerol carbonate. i) dimethyl sulfoxide, j) N-methyl-2-pyrrolidone, and k) combinations thereof.

In an embodiment, organic liquid system two is added to the fluid suspension compositions post-reaction to lower viscosity, to improve water dispersibility, and/or to improve storage stability of said fluid suspension compositions.

In an embodiment, said fluid suspension composition comprises a compositional weight percentage of one or more nitrogenous phosphoryl compounds of 1-30%, 3-30%, 5-30%, 8-30%, 10-30%, 15-30%, 20-30%, 1-25%, 1-20%, 5-25%, 10-20%, or 10-25%. In a variation, said one or more nitrogenous phosphoryl compounds comprise one or more urease inhibitors. In a variation, one or more urease inhibitors comprise one or more alkyl thiophosphoric triamides. In another variation, said one or more alkyl thiophosphoric triamides comprise N-(n-butyl) thiophosphoric triamide (NBPT).

In an embodiment, said fluid suspension composition comprises a compositional weight percentage of one or more chloride salts of 1-30%, 3-30%, 5-30%, 8-30%, 10-30%, 15-30%, 20-30%, 1-25%, 1-20%, 5-25%, 10-20%, or 10-25%. In a variation, said one or more chloride salts comprise ammonium chloride.

The following Examples are presented to illustrate certain embodiments of the present invention:

| Rxt ID #: | MCT00 7088 | Lot # | 20B08 |

Example 1

51.71 grams $PCl_3$, 37.66 grams THF and 27.54 grams butyl amine were cooled to −20° C. A pre-cooled vessel was purged with $N_2$ and then 18.33 grams of THF and 51.76 grams $PCl_3$ were charged. A reaction vessel was purged with $N_2$ and the 27.54 grams butyl amine, 54.28 grams ammonium carbonate and 18.33 grams THF were charged and mixed keeping temperature below −20° C. by utilizing a chilling bath set at −30° C. The mixture of $PCl_3$/THF was slowly charged to reaction vessel over a 21 hour period at a rate wherein the temperature was desired to be maintained at a range of −10 to −20° C. while ensuring the off-gassing of carbon dioxide did not lead to excessive foaming. Fluidity of reaction vessel contents was extremely thick causing extreme difficulty in maintaining desired temperature range as the temperature range actually was −5 to 5° C. 67 additional grams of THF were charged in an effort to improve the fluidity of reaction vessel contents, replace THF loss to the reaction vessel's overhead system, and dissolve solids buildup. After charging was completed, the contents of the reaction vessel were mixed for 1 hour @−10° C. 27.88 grams of ammonia gas was fed sub-surface of the contents of the reaction vessel while allowing the temperature to slowly increase to 40° C. The reaction vessel was sealed to allow a slight pressure build of <10 psi and held for two hours. Contents of reaction vessel were extremely viscous and an additional 100 grams of THF were charged to the reaction vessel. After completion of the ammonia charge, 25.0 grams dimethyl sulfoxide was charged but had little impact on the fluidity of the contents of the reaction vessel. Contents of reaction vessel were too thick to effectively remove THF and ammonium chloride. Process was terminated and reaction vessel contents were disposed of.

The difficulties encountered in trying to produce a highly concentrated triamide composition suggested that the weight percent of the Organic Liquid System One would need to be increased.

| Rxt ID #: | MCT00 7089 | Lot # | 20B13 |
| --- | --- | --- | --- |

Example 2

56.30 grams $PCl_3$, 274.21 grams THF and 29.88 grams butyl amine were cooled to −20° C. A pre-cooled vessel was purged with $N_2$ and then 137.11 grams of THF and 56.30 grams $PCl_3$ were charged. A reaction vessel was purged with $N_2$ and the 29.88 grams butyl amine, 48.62 grams ammonium bicarbonate and 137.11 grams THF were charged and mixed keeping temperature at a range of −10 to −5° C. by utilizing a chilling bath set at −30° C. The mixture of $PCl_3$/THF was slowly charged to reaction vessel at a rate wherein the temperature was desired to be maintained at a range of −10 to 5° C. while ensuring the off-gassing of carbon dioxide did not lead to excessive foaming. Fluidity of reaction vessel contents was acceptable. Reaction vessel contents were heated to 40° C. to convert butyl ammonium chloride to butyl amine and ammonium chloride and to assist in off gassing $CO_2$ from the ammonium bicarbonate. Reaction vessel contents were cooled to −5° C. and ammonia gas charge sub-surface of reaction vessel contents began. After exotherm associated with the reaction of phosphoryl chlorides and ammonia had subsided, cooling was removed and contents of reaction vessel were allowed to rise to 41° C. and held for one hour. Agitation and heat were removed and contents were examined after 12 hours for sedimentation of inorganic chloride salts. The amount of sedimentation was insignificant. Agitation was initiated for the contents of the reaction vessel, contents were heated from 5° C. to 30° C. and 124 grams of deoxygenated distilled water was charged and mixed 15 minutes and then allowed to stand for 1 hour. 332.57 grams of the top layer was removed and charged to another reaction vessel. 29.38 grams of DMSO were charge to the top layer, content of the reaction vessel were heated to 40° C. and placed under vacuum resulting in a pressure reading of 20 mm of Hg. After removal of THF, the contents were cooled, off-loaded, and packaged.

| Rxt ID #: | MCT00 7090 | Lot # | 20B20 |
| --- | --- | --- | --- |

Example 3

42.24 grams $PCl_3$, 205.73 grams THF and 22.5 grams butyl amine were cooled to −20° C. A pre-cooled vessel was purged with $N_2$ and then 102.87 grams of THF and 42.24 grams $PCl_3$ were charged. A reaction vessel was purged with $N_2$ and the 22.5 grams butyl amine, 44.33 grams ammonium carbonate and 102.87 grams THF were charged and mixed keeping temperature at a range of −10 to −5° C. by utilizing a chilling bath set at −30° C. The mixture of $PCl_3$/THF was slowly charged to reaction vessel at a rate wherein the temperature was desired to be maintained at a range of −10 to 5° C. while ensuring the off-gassing of carbon dioxide did not lead to excessive foaming. Fluidity of reaction vessel contents was acceptable. Reaction vessel contents were heated to 40° C. to convert butyl ammonium chloride to butyl amine and ammonium chloride and to assist in off gassing $CO_2$ from the ammonium carbonate. Reaction vessel contents were cooled to −5° C. and ammonia gas charge sub-surface of reaction vessel contents began. After exotherm associated with the reaction of phosphoryl chlorides and ammonia had subsided, cooling was removed and contents of reaction vessel were allowed to rise to 40° C. and held for one hour. Agitation and heat were removed and contents were examined after 12 hours for sedimentation of inorganic chloride salts. The amount of sedimentation was insignificant. Agitation was initiated for the contents of the reaction vessel, contents were heated from 5° C. to 30° C. and 100 grams of deoxygenated distilled water was charged and mixed 15 minutes and then allowed to stand for 1 hour. Top layer was removed and charged to another reaction vessel. Content of the reaction vessel were heated to 40° C. and placed under vacuum resulting in a pressure reading of 20 mm of Hg. After removal of THF, 22.04 grams of DMSO were charge to the stripped top layer. The contents were cooled, off-loaded and packaged.

| Rxt ID #: | MCT00 7091 | Lot # | 20B23 |
| --- | --- | --- | --- |

Example 4

61.37 grams $PCl_3$, 159.38 grams THF and 32.73 grams butyl amine were cooled to −20° C. A pre-cooled reaction vessel was purged with $N_2$ and then 159.38 grams of THF, 15.75 grams sulfur, and 61.37 grams $PCl_3$ were charged and placed under agitation. 32.73 grams butyl amine, was slowly charged over a two hour period to the contents in the reaction vessel keeping temperature at a range of −10 to 0° C. by utilizing a chilling bath set at −30° C. Contents were mixed for 30 minutes, the agitation speed was reduced and 21.23 grams of ammonium bicarbonate was charged to the surface of the reaction vessel contents and mixed at slow speed for 30 minutes. Agitation speed was increased and contents heated to 40° C. Off gassing of $CO_2$ was controlled by the temperature of the reaction vessel contents. Reaction vessel contents were cooled to −5° C. and ammonia gas charge sub-surface of reaction vessel contents began. After exotherm associated with the reaction of phosphoryl chlorides and ammonia had subsided, cooling was removed and contents of reaction vessel were allowed to rise to 40° C. and held for one hour. 157 grams of deoxygenated distilled water was charged and mixed 15 minutes and then allowed to stand for 1 hour. Top layer was removed and charged to another reaction vessel, content of the reaction vessel were heated to 40° C. and placed under vacuum resulting in a pressure reading of 20 mm of Hg. After removal of THF, 32.07 grams of DMSO were charge to the stripped top layer, the contents were cooled, off-loaded and packaged.

| Rxt ID #: | MCT00 7092 | Lot # | 20C14 |

Example 5

70.92 grams $PCl_3$, 230.33 grams ethyl acetate and 37.77 grams butyl amine were cooled to −20° C. A pre-cooled reaction vessel was purged with $N_2$ and then 230.33 grams of ethyl acetate, 18.18 grams sulfur, and 70.92 grams $PCl_3$ were charged and placed under agitation. 37.77 grams butyl amine, was slowly charged over a two hour period to the contents in the reaction vessel keeping temperature at a range of −10 to 0° C. by utilizing a chilling bath set at −30° C. Contents were mixed for 15 minutes, the agitation speed was reduced and 24.81 grams of ammonium carbonate was charged to the surface of the reaction vessel contents and mixed at slow speed for 30 minutes. Agitation speed was increased and contents heated to 40° C. Off gassing of $CO_2$ was controlled by the temperature of the reaction vessel contents. Reaction vessel contents were cooled to −5° C. and ammonia gas charge sub-surface of reaction vessel contents began. After exotherm associated with the reaction of phosphoryl chlorides and ammonia had subsided, cooling was removed and contents of reaction vessel were allowed to rise to 55.7° C. and held for one hour. Content of the reaction vessel were heated to 40° C. and placed under vacuum resulting in a pressure reading of 20 mm of Hg. After removal of THF, 42.31 grams of DMSO were charge to very thick reaction vessel contents. The contents were charged to a Buchner funnel under vacuum to remove finished product from inorganic salts. The contents were too thick and filtration resulted in extremely low yield of liquid product of less than 20 grams.

| Rxt ID #: | MCT00 7093 | Lot # | 20C25 |

Example 6

88.53 grams $PSCl_3$, 204.12 grams THF and 38.28 grams butyl amine were cooled to −20° C. A pre-cooled reaction vessel was purged with $N_2$ and then 204.12 grams of THF, 24.83 grams of ammonium bicarbonate and 88.53 grams $PSCl_3$ were charged and placed under agitation. 38.28 grams butyl amine, was slowly charged over a two hour period to the contents in the reaction vessel keeping temperature at a range of −10 to 0° C. by utilizing a chilling bath set at −30° C. Contents were mixed for 15 minutes, the agitation speed was increased and the contents slowly heated to 40° C. Off gassing of $CO_2$ was controlled by the temperature of the reaction vessel contents. Reaction vessel contents were cooled to −5° C. and ammonia gas charge sub-surface of reaction vessel contents began. After exotherm associated with the reaction of phosphoryl chlorides and ammonia had subsided, cooling was removed and contents of reaction vessel were allowed to rise to 46.3° C. and held for 30 minutes. 200 grams of deoxygenated distilled water was charged and mixed 15 minutes and then allowed to stand for 1 hour. Top layer was removed and charged to reaction vessel #2 while the bottom layer was disposed of. The contents of the reaction vessel #2 were heated to 40° C. and placed under vacuum resulting in a pressure reading of 20 mm of Hg After removal of THF, 37.5 grams of DMSO were charged to the contents of reaction vessel #2 and mixed for 15 minutes. The contents of reaction vessel #2 were cooled, off-loaded and packaged

| Rxt ID #: | MCT00 7094 | Lot # | 20C30 |

Example 7

83.95 grams $PSCl_3$, 193.26 grams THF and 36.24 grams butyl amine were cooled to −20° C. A pre-cooled reaction vessel was purged with $N_2$ and then 193.26 grams of THF, and 83.95 grams $PSCl_3$ were charged and placed under agitation. 36.24 grams butyl amine, was slowly charged over a two hour period to the contents in the reaction vessel keeping temperature at a range of −10 to 0° C. by utilizing a chilling bath set at −30° C. Contents were mixed for 15 minutes, the agitation speed was increased and the contents slowly heated to 40° C. Reaction vessel contents were cooled to −5° C. and 28.57 grams of ammonia carbonate was slowly charged to reaction vessel contents in about 30 minutes. After exotherm associated with the reaction of phosphoryl chlorides and ammonia had subsided, cooling was removed and contents of reaction vessel were allowed to rise to 40° C. and held for 30 minutes. 200 grams of deoxygenated distilled water was charged and mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg. After removal of THF, 37.5 grams of DMSO were charged to contents of reaction vessel #2 and mixed for 15 minutes. The contents of reaction vessel #2 were filtered, cooled, off-loaded and packaged

| Rxt ID #: | MCT00 7095 | Lot # | 20D02 |

Example 8

87.41 grams $PSCl_3$, 201.58 grams THF and 37.80 grams butyl amine were cooled to −20° C. A pre-cooled reaction vessel #1 was purged with $N_2$ and then 201.58 grams of THF, and 87.41 grams $PSCl_3$ were charged and placed under strong agitation. 37.8 grams butyl amine, was slowly charged through reaction vessel headspace over a two hour period to the contents in the reaction vessel keeping temperature at a range of −10 to 0° C. by utilizing a chilling bath set at −30° C. Contents were mixed for 30 minutes, the agitation speed was then slowed as the contents began cooling to −10° C. if necessary. Reaction vessel #1 contents were cooled to −10° C. and 42.42 grams of ammonia was slowly charged to reaction vessel #1 sub-surface of the contents of reaction vessel #1. After 30 minutes of charging ammonia to reaction vessel #1, agitation speed was increase to medium speed. After exotherm associated with the reaction of phosphoryl chlorides and ammonia had subsided, cooling was removed and contents of reaction vessel were allowed to rise to 40° C. and held for 30 minutes. 200 grams of deoxygenated distilled water was charged and mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg. After removal of THF, 37.03 grams of DMSO were charged to contents of reaction vessel #2 and mixed for 15 minutes. The contents of reaction vessel #2 were filtered, cooled, off-loaded and packaged.

| Rxt ID #: | MCT00 7096 | Lot # | 20D11 |

Example 9

84.57 grams $PSCl_3$, 194.71 grams THF and 36.52 grams butyl amine were cooled to −20° C. A pre-cooled reaction vessel #1 was purged with $N_2$ and then 194.71 grams of THF, and 84.57 grams $PSCl_3$ were charged and placed under strong agitation. 36.52 grams butyl amine, was slowly charged sub-surface of the contents in reaction vessel #1 over a two hour period maintaining the temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 28.78 grams ammonium carbonate powder was slowly added to the surface of the contents in reaction vessel #1 with the surface barely moving. Agitation was slowly increased over a two hour period to medium speed. After two hour period, 33.95 grams of ammonia began to be charged to the headspace of the reaction vessel #1 and temperature range was maintained at −10 to 0° C. After 4½ hours, ammonia charge was switched to sub-surface and the temperature of the contents of reaction vessel #1 were allowed to increase to 40 to 50° C. Hold temperature at 40 to 50° C. for 2 hours and then charge 200 grams of deoxygenated distilled water, mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg. After removal of THF, 35.77 grams of DMSO were charged to contents of reaction vessel #2 and mixed for 15 minutes. The contents of reaction vessel #2 were filtered, cooled, off-loaded and packaged.

| Rxt ID #: | MCT00 7097 | Lot # | 20D18 |

Example 10

90.14 grams $PSCl_3$, 207.52 grams THF and 38.92 grams butyl amine were cooled to −20° C. A pre-cooled reaction vessel #1 was purged with $N_2$ and then 207.52 grams of THF, and 90.14 grams $PSCl_3$ were charged and placed under strong agitation. 38.92 grams butyl amine, was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 45.23 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 120 minutes. 200 grams of deoxygenated distilled water was charged and mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg. After removal of THF, 38.12 grams of DMSO were charged to contents of reaction vessel #2 and mixed for 15 minutes. The contents of reaction vessel #2 were filtered, cooled, off-loaded and packaged.

| Rxt ID #: | MCT00 7098 | Lot # | 20D22 |

Example 11

79.49 grams $PSCl_3$, 183.01 grams THF and 34.32 grams butyl amine were cooled to −20° C. A pre-cooled reaction vessel #1 was purged with $N_2$ and then 183.01 grams of THF, and 79.49 grams $PSCl_3$ were charged and placed under strong agitation. 34.32 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 39.89 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. Charge 200 grams of deoxygenated distilled water was charged and mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg After removal of THF, 33.62 grams of DMSO were charged to contents of reaction vessel #2 and mixed for 15 minutes. The contents of reaction vessel #2 were filtered, cooled, off-loaded and packaged.

| Rxt ID #: | MCT00 7099 | Lot # | 20D25 |

Example 12

74.01 grams PSCl$_3$, 170.40 grams THF and 31.96 grams butyl amine were cooled to −20° C. A pre-cooled reaction vessel #1 was purged with N$_2$ and then 170.40 grams of THF, and 74.01 grams PSCl$_3$ were charged and placed under strong agitation. 31.96 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 37.14 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. Turn off agitation and allow standing for 12 hours. Little or no separation was observed. 200 grams of deoxygenated distilled water was charged and mixed 15 minutes and then allowed to stand for 1 hour. Top layer was removed and charged to reaction vessel #2, the contents of reaction vessel #2 were heated to 40° C. and placed under vacuum resulting in a pressure reading of 20 mm of Hg After removal of THF, 31.30 grams of DMSO were charged to contents of reaction vessel #2 and mixed for 15 minutes. The contents of reaction vessel #2 were filtered, cooled, off-loaded and packaged.

Example 13

| Rxt ID #: | MCT00 7101 | Lot # | 20E30 |
|---|---|---|---|

75.65 grams PSCl$_3$, 174.17 grams THF and 32.66 grams butyl amine were cooled to −20° C. A pre-cooled reaction vessel #1 was purged with N$_2$ and then 174.17 grams of THF, and 75.65 grams PSCl$_3$ were charged and placed under strong agitation. 32.66 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 37.96 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. 32.00 grams of DMSO were charged to contents of reaction vessel #1. The contents of reaction vessel #1 were filtered utilize multiple washing. Filter cake was extremely sticky. Filtrate was cooled, off-loaded and packaged.

| Rxt ID #: | MCT00 7102 | Lot # | 20F07 |
|---|---|---|---|

Example 14

71.74 grams PCl$_3$, 164.70 grams THF and 38.21 grams butyl amine were cooled to −20° C. A pre-cooled reaction vessel #1 was purged with N$_2$ and then 164.70 grams of THF, and 71.74 grams PCl$_3$ were charged and placed under strong agitation. 38.21 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 44.41 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. 30.25 grams of DMSO were charged to contents of reaction vessel #1. The contents of reaction vessel #1 were cooled, off-loaded and packaged.

Example 15

100 grams of Example 14 was charged to reaction vessel #1 with chilled overhead to return THF to reaction vessel #1 and heated to 60-65° C. under agitation. 9.82 grams of Calcium Carbonate was slowly charged to contents of reaction vessel #1. Contents were held at 60-65° C. until foaming subsided. Contents were cooled to <25° C., agitation was stopped, and contents were allowed to sit for 12 hours. Minimal separation had occurred. The contents of reaction vessel #1 were off-loaded and packaged.

Exchanging a calcium ion for an ammonium ion did not result in appreciable sedimentation of the chloride salt particles.

Example 16

A number of organic liquids were each added to a 25 gram sample of Example 14 to evaluate improving sedimentation of inorganic chloride particles present in Example 14 within 24 hours of standing. Results are listed in Table below.

| Organic Liquid | Grams added/25 grams of Example 14 | Clear layer in inches of a 4 inch sample |
|---|---|---|
| dimethyl sulfoxide | 25 | 1 |
| dimethyl sulfoxide | 8 | <1 |
| triethyl phosphate | 2 | 0 |
| tributyl phosphate | 2 | <0.25 |
| 100 viscosity polydimethyl siloxane | 0.3 | 0 |

-continued

| Organic Liquid | Grams added/25 grams of Example 14 | Clear layer in inches of a 4 inch sample |
|---|---|---|
| triethyl methyl ammonium chloride | 2 | 0 |
| butyl carbonate | 2 | 0 |
| triethanolamine | 2 | <0.5 |
| ammonium hydroxide/28% | 4 | 1⅞ |

Large amounts of additional liquids seem to break the stability of the suspension.
Unexpectedly, the suspension was fairly stable for 24 hours.

| Rxt ID #: | MCT00 7103 | Lot # | 20F14 |

Example 17

71.33 grams $PCl_3$, 168.12 grams THF and 39.89 grams butyl amine were cooled to −20° C. A pre-cooled reaction vessel #1 was purged with $N_2$ and then 168.12 grams of THF, and 71.33 grams $PCl_3$ were charged and placed under strong agitation. 39.89 grams butyl amine was slowly charged sub-surface of over a two hour period to the contents in the reaction vessel keeping temperature at a range of −10 to 0° C. by utilizing a chilling bath set at −30° C. 5.15 grams of tributyl phosphate were added to the contents of reaction vessel #1. Contents were mixed for 30 minutes, the agitation speed was then slowed wherein the surface of the contents was barely moving as the contents began cooling to −10° C. if necessary. When reaction vessel #1 contents were cooled to −10° C. and 39.00 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. Agitation speed was reduced and 100 grams of ammonium hydroxide were charge to reaction vessel #1. The contents were mixed with slow agitation for 15 minutes and then the agitation was stopped. Separation occurred within 15 minutes and the bottom layer was drawn off from reaction vessel #1. The remaining contents of reaction vessel #1 were heated to 50° C. and placed under vacuum resulting in a pressure reading of 20 mm of Hg. After removal of THF, 30.88 grams of DMSO was charged to contents of reaction vessel #1. The contents of reaction vessel #1 were filtered, cooled, off-loaded and packaged.

| Rxt ID #: | MCT00 7104 | Lot # | 20F20 |

Example 18

58.07 grams $PCl_3$, 77.34 grams THF, 77.34 grams propylene carbonate and 40.21 grams butyl amine were cooled to −20° C. A pre-cooled reaction vessel #1 was purged with $N_2$ and then 77.34 grams of THF, 77.34 grams propylene carbonate and 58.07 grams $PCl_3$ were charged and placed under strong agitation. 40.21 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 33.79 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. The contents were mixed with slow agitation for 15 minutes and then the agitation was stopped. After 12 hours little of no separation occurred. 77.34 grams DMSO were charge and mixed for 15 minutes and then allowed to settle for six hours. No separation could be observed. 100 grams ammonium hydroxide was charged and mixed slowly for 15 minutes and allowed to set for 12 hours. No separation was observed. The contents of reaction vessel #1 were disposed of.

In an embodiment the presence of propylene carbonate and DMSO caused issues with the separation of the ammonium hydroxide solution containing composition from the triamide containing composition.

| Rxt ID #: | MCT00 7105 | Lot # | 20G11 |

Example 19

71.95 grams $PSCl_3$, 93.68 grams THF, 93.44 grams propylene carbonate and 40.38 grams butyl amine were cooled to −20° C. A pre-cooled reaction vessel #1 was purged with $N_2$ and then 93.68 grams of THF, 93.44 grams propylene carbonate and 71.95 grams $PSCl_3$ were charged and placed under strong agitation. 40.38 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 36.10 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. 93.68 grams of DMSO were charged to contents of reaction vessel #1 and then reaction vessel #1 was placed under vacuum resulting in a pressure reading of 20 mm of Hg. After removal of THF, sample was split into two samples; sample #1 was placed in a 50° C. oven for 24 hour and sample #2 was placed in a freezer at −1° F. for 24 hours. Sample #1 showed a slight separation at the top and sample #2 was fluid. The appearance of contents of reaction vessel #1 was a tannish-white suspension.

The particles in the suspension proved to be very resilient. The presence of DMSO did not result in the extraction of NBPT and the sedimentation of the by-product ammonium chloride.

| Rxt ID #: | MCT00 7106 | Lot # | 20H22 |

Example 20

91.36 grams $PSCl_3$, 118.96 grams THF, 118.65 grams propylene carbonate and 51.28 grams butyl amine were cooled to −20° C. A pre-cooled reaction vessel #1 was purged with $N_2$ and then 118.65 grams of THF, 118.65 grams propylene carbonate and 91.36 grams $PSCl_3$ were charged and placed under strong agitation. 51.28 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 36.10 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. Contents were cooled and packaged. MCT-710601

Example 21

30 grams of ammonium hydroxide/28% were charge to 50 grams of Example 20, mixed for 15 minutes and then allowed to settle for two hours. Separation was very poor most likely due to the presence of propylene carbonate. Sample was disposed of.
MCT-710602

Example 22

27.92 grams of DMSO were charged to 100 grams of Example 20 in reaction vessel #1 and then mixed and heated to 40-50° C. Contents of reaction vessel #1 were placed under vacuum resulting in a pressure reading of 20 mm of Hg. After removal of THF, contents were cooled and packaged. After two weeks of setting, sample began to show small amount of separation with a clear layer at the top.

The particles of the suspension did not collapse even with the presence of DMSO in which NBPT was highly soluble and in which ammonium chloride is very insoluble. The appearance of the sample was very viscous. Without being bound to theory, it is believed that the DMSO has been absorbed onto the particles in the suspension.

Example 23

65.0 grams of DMSO were charged to 150 grams of Example 20 in reaction vessel #1 and then mixed and heated to 40-50° C. 39 grams of calcium carbonate were slowly charged. Contents were placed under vacuum wherein the rate of the depth of vacuum was controlled by the formation of foam within reaction vessel #1. Contents of reaction vessel #1 reached a vacuum reading of 20 mm of Hg, then the vacuum was broken with $N_2$ subsurface sparge. After removal of THF, contents were cooled and packaged. After two weeks of setting, sample began to show small amount of separation with a clear layer at the top.

Conversion of the ammonium chloride to calcium chloride even with DMSO present did not result in a breakdown of the suspension.

| Rxt ID #: | MCT00 7107 | Lot # | 20J14 |

Example 24

83.27 grams $PSCl_3$, 88.48 grams THF, 88.48 grams propylene carbonate and 51.28 grams butyl amine were cooled to −20° C. A pre-cooled reaction vessel #1 was purged with $N_2$ and then 88.48 grams of THF, 88.48 grams propylene carbonate and 83.27 grams $PSCl_3$ were charged and placed under strong agitation. 51.28 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 41.78 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel were allowed to rise to 40° C. and held for 60 minutes. Contents were cooled and packaged. MCT 710701

Example 25

35 grams of calcium carbonate were charged to 160 grams of Example 24 in reaction vessel #1 and then mixed and heated to 45-50° C. Contents of reaction vessel #1 were allowed to off-gas and then 30 grams of DMSO was slowly charged. Contents were placed under vacuum until the contents of reaction vessel #1 reached a vacuum reading of 20 mm of Hg. The vacuum was broken with $N_2$ subsurface sparge. After removal of THF, contents were cooled and packaged. Sample was extremely thick upon setting for 24 hours.
MCT 710702

Example 26

26.15 grams of DMSO were charged to 100 grams of Example 20 in reaction vessel #1 and then mixed and heated to 40-50° C. Contents of reaction vessel #1 were placed under vacuum resulting in a pressure reading of 20 mm of Hg. After removal of THF, contents were cooled and packaged. Sample was extremely thick upon setting for 24 hours.

The suspension was found to be extremely resilient. Addition of DMSO caused a thickening of the suspension indicating that the particles of the suspension had surprising absorbed the DMSO. Not to be bound by theory, the suspension particles seemed to a fused particle of chloride salt and NBPT, wherein the NBPT portion of the fused particles had absorbed the DMSO. Surprisingly the $CaCl_2$ insolubility in propylene carbonate and DMSO did not settle out indicating that the fused particle could not be collapse with organic solvents that NBPT was very soluble in and that chloride salts were not very soluble in.

| Rxt ID #: | MCT00 710800 | Lot # | 20K17 |
|---|---|---|---|

Example 27

166.14 grams $PSCl_3$, 216.04 grams THF, 216.04 grams propylene carbonate and 93.25 grams butyl amine were cooled to −20° C. A pre-cooled reaction vessel #1 was purged with $N_2$ and then 216.04 grams of THF, 216.04 grams propylene carbonate and 166.14 grams $PSCl_3$ were charged and placed under strong agitation. 93.25 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 83.36 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel #1 were allowed to rise to 40° C. and held for 60 minutes. Contents were cooled and packaged.

| Rxt ID #: | MCT00 7111 | Lot # | 21B09 |
|---|---|---|---|

Example 28

62.14 grams $PSCl_3$, 161.61 grams propylene carbonate and 34.88 grams butyl amine were cooled to −20° C. A pre-cooled reaction vessel #1 was purged with $N_2$ and then 161.61 grams propylene carbonate and 62.14 grams $PSCl_3$ were charged and placed under strong agitation. 34.88 grams butyl amine was slowly charged sub-surface of over a two hour period to the contents in the reaction vessel keeping temperature at a range of −10 to 0° C. by utilizing a chilling bath set at −30° C. Contents were mixed for 30 minutes, the agitation speed was then slowed wherein the surface of the contents was barely moving as the contents began cooling to −10° C. if necessary. When reaction vessel #1 contents were cooled to −10° C. and 31.18 grams of ammonia began to be charged to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, ammonia was charged to the sub-surface of the contents of reaction vessel #1, cooling was removed and contents of reaction vessel #1 were allowed to rise to 40° C. and held for 60 minutes. Contents were heated to 60-70° C., then cooled and packaged.

Example 29

| Rxt ID #: | MCT00 7154 | Lot # | 22B07 | rxt SU | 681.05 |
|---|---|---|---|---|---|

57.59 grams $PSCl_3$, 132.59 grams ethyl acetate and 24.87 grams butyl amine were cooled to −20° C. A pre-cooled reaction vessel #1 was purged with $N_2$ and then the THF and the $PSCl_3$ were charged, cooled to −20 to −10° C., and placed under strong agitation utilizing baffles to ensure more turbulence and improved mixing of reactants. 24.87 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 300 rpms at the start of the butyl amine charge and increased to 500 rpms as viscosity increased. Contents were then mixed for 30 minutes, and the agitation speed was then slowed 150 rpms wherein the surface of the contents was barely moving as the contents were cooled to −20 to 0° C.

28.9 grams of ammonia were charged to the headspace of the reaction vessel #1 and temperature range was maintained at −15 to −5° C. After exotherm associated with the reaction of phosphoryl chlorides and ammonia had subsided, extra ammonia was charged to the sub-surface of the contents of reaction vessel #1, and cooling was removed. Temperature was allowed to increase to 40 to 50° C., and held for 180 minutes and agitation was slowly increased to 900 rpms. Contents were weighed and sampled wherein the weight of the contents was 231.88 grams (loss of 30.42 grams of solvent).

Example 29a 18.36 grams of 28% $NH_4OH$ were charged to reaction vessel #1, mixed and held at 40-50° C. for 20 minutes. The reaction vessel #1 contents were then charged to a Buchner funnel and a liquid was removed under vacuum of about 50 mmHg. 26.52 grams of ethyl acetate were charged to reaction vessel #1 for rinsing out vessel and the rinse ethyl acetate was charged to the Buchner funnel and allowed to sit with no vacuum for 30 minutes and then filtered. The solid residual was weighed at 69.61 grams with % solids of 83.35%. The liquid of both the first filtration and of the second filtration were added to a stripping flask and a sample was collected for analysis. % non-volatile for the liquid was 32.67%. The ethyl acetate was removed at 30-50° C. about 20 mmHg and 45.1 grams of solids were collected (85.32% of expected solids).

Example 29b 45.1 grams of N-methyl pyrrolidone were charged to the stripping flask containing Example 29a contents and mixed for 15 minutes and then off loaded and packaged. Appearance of sample was dark.

In an embodiment, liquifying the by-product, ammonium chloride, results in a large amount of liquid waste with residual solvent present that would need to be stripped out. In an embodiment this extra handling and the subsequent disposal cost of a large amount of liquid waste would increase the overall production cost. In a variation, it is believed that the collapse of the suspension particles and subsequent filtration is more cost effective. In another variation, the solid residual resulting from filtration, could have a market value driving down the cost of producing a liquified NBPT Example 30

| Rxt ID #: | MCT00 7154 | Lot # | 22A11 | rxt SU | 665.04 |
|---|---|---|---|---|---|

57.59 grams $PSCl_3$, 132.59 grams ethyl acetate and 24.87 grams butyl amine were cooled to −20° C. A pre-cooled reaction vessel #1 was purged with $N_2$ and then the THF and the $PSCl_3$ were charged, cooled to −20 to −10° C., and placed under strong agitation utilizing baffles to ensure more turbulence and improved mixing of reactants. 24.87 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 300 rpms at the start of the butyl amine charge and increased to 500 rpms as viscosity increased. Contents were then mixed for 30 minutes, and the agitation speed was then slowed 150 rpms wherein the surface of the contents was barely moving as the contents were cooled to −20 to 0° C.

29.32 grams of ammonia were charged to the headspace of the reaction vessel #1 and temperature range was maintained at −15 to −5° C. After exotherm associated with the reaction of phosphoryl chlorides and ammonia had subsided, extra ammonia was charged to the sub-surface of the contents of reaction vessel #1, and cooling was removed. Temperature was allowed to increase to 40 to 45° C., and held for 180 minutes and agitation was slowly increased to 900 rpms. Contents were weighed and sampled wherein the weight of the contents was 236.04 grams.

Example 30a 18.63 grams of 28% $NH_4OH$ were charged to reaction vessel #1, mixed and held at 40-45° C. for 20 minutes. The reaction vessel #1 contents were then charged to a Buchner funnel and a liquid was removed under vacuum of about 50 mmHg. 26.91 grams of ethyl acetate were charged to reaction vessel #1 for rinsing out vessel and the rinse ethyl acetate was charged to the Buchner funnel and allowed to sit with no vacuum for 30 minutes and then filtered. The solid residual was weighed at 68.69 grams with % solids of 74.72%. The liquid of both the first filtration and of the second filtration were added to a stripping flask. The ethyl acetate was removed at 30-50° C. about 20 mmHg and 49.22 grams of solids were collected (85.32% of expected solids).

Example 30b 29.51 grams of DMSO, 4.28 grams of propylene carbonate, and 0.43 grams of triethanolamine were charged to the stripping flask containing Example 30a contents and mixed for 15 minutes and then off loaded and packaged. Product was fluid with some color development.

Example 31

| Rxt ID #: | MCT00 7112 | Lot # | 21C07 |
|---|---|---|---|

114.79 grams $PSCl_3$, 278.27 grams propylene carbonate and 64.43 grams butyl amine were cooled to −20° C. A pre-cooled reaction vessel #1 was purged with $N_2$ and then the propylene carbonate and the $PSCl_3$ were charged, cooled to −20 to −10° C., and placed under strong agitation. 64.43 grams of Butyl amine were slowly charged sub-surface of over a two hour period to the contents in the reaction vessel keeping temperature at a range of −10 to 0° C. by utilizing a chilling bath set at −30° C. Contents were mixed for 30 minutes, and then the agitation speed was then slowed wherein the surface of the contents was barely moving as the contents were cooled to −10° C. When reaction vessel #1 contents were cooled to −10° C., began charging 57.6 grams of ammonia to the headspace of the reaction vessel #1 and temperature range was maintained at −10 to 0° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40° C. and held for 60 minutes. Contents were heated to 94.6° C., then cooled and packaged. Process yielded 508.11 (approximately 99% of theoretical yield) grams of a flowable suspension. After 2 month of storage, a small clear layer developed at the top of the sample while the sample itself was fluid.

Example 32

| Rxt ID #: | MCT00 7113 | Lot # | 21D08 |
|---|---|---|---|

113.5 grams $PSCl_3$, 221.86 grams propylene carbonate and 63.7 grams butyl amine were cooled to −20° C. A pre-cooled reaction vessel #1 was purged with $N_2$ and then the propylene carbonate and the $PSCl_3$ were charged, cooled to −20 to −10° C., and placed under strong agitation. Butyl amine was pre-mixed with 54.67 grams of propylene carbonate; however mixture produced an exotherm and was disposed of 54.67 grams of propylene carbonate at −20° C. was charged to reaction vessel #1 and then 63.7 grams of butyl amine was slowly charged sub-surface of over a two hour period to the contents in the reaction vessel keeping temperature at a range of −20 to −10° C. by utilizing a chilling bath set at −30° C. and adding dry ice as necessary to maintain temperature range. Contents were mixed for 30 minutes, and the agitation speed was then slowed wherein the surface of the contents was barely moving as the contents were cooled to −10° C. When reaction vessel #1 contents were cooled to −20 to −10° C., began charging 56.95 grams of ammonia to the headspace of the reaction vessel #1 and temperature range was maintained at −20 to −10° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40° C. and held for 60 minutes. Contents were heated to 111.1° C., then cooled and packaged. Process yielded 517.69 grams (approximately 100% of expected yield) of a flowable suspension.

Example 33

| Rxt ID #: | MCT00 7127 | Lot # | 21K01 |
| --- | --- | --- | --- |

107.86 grams $PSCl_3$, 259.82 grams glycerol triacetate and 60.55 grams butyl amine were cooled to −20° C. A pre-cooled reaction vessel #1 was purged with $N_2$ and then the propylene carbonate and the $PSCl_3$ were charged, cooled to −20 to −10° C., and placed under strong agitation. 60.55 grams of butyl amine was slowly charged using a syringe pump at a rate of 35 ul/min sub-surface of over a two hour period to the contents in the reaction vessel keeping temperature at a range of −20 to −10° C. by utilizing a chilling bath set at −30° C. and adding dry ice as necessary to maintain temperature range. Contents were mixed for 30 minutes, and the agitation speed was then slowed wherein the surface of the contents was barely moving as the contents were cooled to −10° C. When reaction vessel #1 contents were cooled to −20 to −10° C., began charging 53.53 grams of ammonia to the headspace of the reaction vessel #1 and temperature range was maintained at −20 to −10° C. After 30 minutes of charging ammonia to reaction vessel #1, agitation speed was increase to medium speed. After exotherm associated with the reaction of phosphoryl chlorides and ammonia had subsided, excess ammonia was charged to the sub-surface of the contents of reaction vessel #1, cooling was removed and contents of reaction vessel #1 were allowed to rise to 100-100° C. and held for 60 minutes. Contents were then cooled and packaged. Process yielded a thick suspension.

Example 34

| Rxt ID #: | MCT00 7128 | Lot # | 21K02 |
| --- | --- | --- | --- |

109.7 grams $PSCl_3$, 285.33 grams propylene carbonate and 61.58 grams butyl amine were cooled to −20° C. A pre-cooled reaction vessel #1 was purged with $N_2$ and then the propylene carbonate and the $PSCl_3$ were charged, cooled to −20 to −10° C., and placed under strong agitation. 61.58 grams of butyl amine were slowly charged sub-surface of over a two hour period to the contents in the reaction vessel keeping temperature at a range of −20 to −10° C. by utilizing a chilling bath set at −30° C. and adding dry ice as necessary to maintain temperature range. Contents were mixed for 30 minutes, and the agitation speed was then slowed wherein the surface of the contents was barely moving as the contents were cooled to −10° C. When reaction vessel #1 contents were cooled to −20 to −10° C., began charging 55.05 grams of ammonia to the headspace of the reaction vessel #1 and temperature range was maintained at −20 to −10° C. After 30 minutes of charging ammonia to reaction vessel #1, agitation speed was increase to medium speed. After exotherm associated with the reaction of phosphoryl chlorides and ammo-nia had subsided, excess ammonia was charged to the sub-surface of the contents of reaction vessel #1, cooling was removed and contents of reaction vessel #1 were allowed to rise to 40° C. and held for 60 minutes. Contents were heated to 60-70° C., then cooled and packaged. Process yielded a flowable suspension.

Example 35

| Rxt ID #: | MCT00 7129 | Lot # | 21K26 |
| --- | --- | --- | --- |

60.39 grams $PSCl_3$, 139.02 grams tetrahydrofuran (THF) and 26.07 grams butyl amine were cooled to −20° C. A pre-cooled reaction vessel #1 was purged with $N_2$ and then the THF and the $PSCl_3$ were charged, cooled to −20 to −10° C., and placed under strong agitation. 26.07 grams of butyl amine were slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed wherein the surface of the contents was barely moving as the contents were cooled to −10° C. When reaction vessel #1 contents were cooled to −20 to −10° C., began charging 30.30 grams of ammonia to the headspace of the reaction vessel #1 and temperature range was maintained at −20 to −10° C. After 30 minutes of charging ammonia to reaction vessel #1, agitation speed was increase to medium speed. After exotherm associated with the reaction of phosphoryl chlorides and ammo-nia had subsided, extra ammonia was charged to the sub-surface of the contents of reaction vessel #1, cooling was removed and contents of reaction vessel #1 were allowed to rise to 40° C. and held at to 55° C. for 180 minutes.

Example 35a 100 grams of 28% ammonium hydroxide and 100 grams of distilled water were stirred in. The contents were charged to a separatory funnel and allowed to sit for 3 hours. The bottom layer was removed and the top layer weighed and determined to be 227.35 grams. The solids of the top layer were determined to be 16.5% resulting in a calculated total solids weight of 37.5 grams. The process resulted in 63% of expected yield.

Example 36

| Rxt ID #: | MCT00 7131 | Lot # | 21K09 |
| --- | --- | --- | --- |

56.98 grams $PSCl_3$, 131.19 grams tetrahydrofuran (THF) and 31.98 grams butyl amine were cooled to −20° C. A pre-cooled reaction vessel #1 was purged with $N_2$ and then the THF and the $PSCl_3$ were charged, cooled to −20 to −10° C., and placed under strong agitation. 31.98 grams of butyl amine were slowly charged sub-surface of over a two hour period to the contents in the reaction vessel keeping temperature at a range of −20 to −10° C. by utilizing a chilling bath set at −20° C. and adding dry ice as necessary to maintain temperature range. Agitation was increase as contents became thicker from 80 rpms to 540 rpms during butyl amine charge. Contents were mixed for 30 minutes, and the agitation speed was then slowed wherein the surface of the contents was barely moving as the contents were cooled to −10° C. When reaction vessel #1 contents were cooled to −20 to −10° C., agitation reduced to 80 rpms and then began slowly charging 28.6 grams of ammonia to the headspace of the reaction vessel #1 while temperature range was maintained at −20 to −10° C. After 30 minutes of charging ammonia to reaction vessel #1, agitation speed was increase to 250 rpms. After exotherm associated with the reaction of phosphoryl chlorides and ammonia had subsided, excess ammonia was charged to the sub-surface of the contents of reaction vessel #1, cooling was removed and contents of reaction vessel #1 were allowed to rise to 40 to 60° C. and held for 60 minutes. Contents were then cooled 60° C. and 200 grams of 28% ammonium hydroxide and 100 grams of distilled water were stirred in. The contents were charged to a separatory funnel and allowed to sit for 3 hours. The bottom layer was removed and the top layer was determined to be 136.16 grams. The solids of the top layer were determined to be 28.83% resulting in a calculated total solids weight of 39.25 grams. The process resulted in 61.8% of expected yield.

Example 37

| Rxt ID #: | MCT00 7132 | Lot # | 21K10 |
|---|---|---|---|

60.04 grams $PSCl_3$, 145.46 grams propylene carbonate and 33.7 grams butyl amine were cooled to −20° C. A pre-cooled reaction vessel #1 was purged with $N_2$ and then the propylene carbonate and the $PSCl_3$ were charged, cooled to −20 to −10° C., and placed under strong agitation. 30.13 grams of butyl amine was slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed 60 rpms wherein the surface of the contents was barely moving as the contents were cooled to −10° C. When reaction vessel #1 contents were cooled to −20 to −10° C., began charging 30.13 grams of ammonia to the headspace of the reaction vessel #1 and temperature range was maintained at −20 to 0° C. After 30 minutes of charging ammonia to reaction vessel #1, agitation speed was increase to medium speed. After exotherm associated with the reaction of phosphoryl chlorides and ammonia had subsided, excess ammonia was charged to the sub-surface of the contents of reaction vessel #1, cooling was removed and contents of reaction vessel #1 were allowed to rise to 40° C. and held for 60 minutes. Contents were heated to 60 to 70° C., then cooled and packaged. Process yielded 267.3 grams (approximately 100% of expected yield) of a slightly thick but flowable suspension.

Example 38

| Rxt ID #: | MCT00 7133 | Lot # | 21K11 |
|---|---|---|---|

55.54 grams $PSCl_3$, 133.77 grams ParaOil 40 (hydrocarbon) and 31.17 grams butyl amine were cooled to −20° C. A pre-cooled reaction vessel #1 was purged with $N_2$ and then the ParaOil 40 and the $PSCl_3$ were charged, cooled to −20 to −10° C., and placed under strong agitation. 31.17 grams of butyl amine was slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed 60 rpms wherein the surface of the contents was barely moving as the contents were cooled to −10° C. When reaction vessel #1 contents were cooled to −20 to −10° C., began charging 27.87 grams of ammonia to the headspace of the reaction vessel #1 and temperature range was maintained at −20 to 0° C. After 30 minutes of charging ammonia to reaction vessel #1, agitation speed was increase to medium speed. After exotherm associated with the reaction of phosphoryl chlorides and ammonia had subsided, excess ammonia was charged to the sub-surface of the contents of reaction vessel #1, cooling was removed and contents of reaction vessel #1 were allowed to rise to 40° C. and held for 60 minutes. Contents were heated to 60 to 70° C., then cooled and packaged. Process yielded 248.01 grams (approximately 100% of expected yield) of a very viscous suspension. Reaction vessel #1 was extremely difficult to clean.

Example 39

| Rxt ID #: | MCT00 7134 | Lot # | 21K13 |
|---|---|---|---|

53.27 grams $PSCl_3$, 128.3 grams tetrahydrofuran (THF) and 29.9 grams butyl amine were cooled to −20° C. A pre-cooled reaction vessel #1 was purged with $N_2$ and then the THF and the $PSCl_3$ were charged and placed under strong agitation. 29.9 grams of butyl amine were slowly charged sub-surface of over a two hour period to the contents in the reaction vessel keeping temperature at a range of −20 to −5° C. by utilizing a chilling bath set at −20° C. and adding dry ice as necessary to maintain temperature range. Agitation was increase as contents became thicker from 80 rpms to 540 rpms during butyl amine charge. Contents were mixed for 30 minutes, and the agitation speed was then slowed wherein the surface of the contents was barely moving as the contents were cooled to −10° C. When reaction vessel #1 contents were cooled to −20 to −10° C., agitation reduced to 80 rpms and then began slowly charging 26.73 grams of ammonia to the headspace of the reaction vessel #1 while temperature range was maintained at −20 to −10° C. After 30 minutes of charging ammonia to reaction vessel #1, agitation speed was increase to 250 rpms. After exotherm associated with the reaction of phosphoryl chlorides and ammonia had subsided, excess ammonia was charged to the sub-surface of the contents of reaction vessel #1, cooling was removed and contents of reaction vessel #1 were allowed to rise to to 60° C. and held for 60 minutes. After three hours, contents were cooled to <40 C. grams of extra THF were added to add in fluidity. Process yielded 277.81 grams of a fluid suspension.

Example 40

| Rxt ID #: | MCT00 7136 | Lot # | 21K16 |
|---|---|---|---|

58.91 grams PSCl$_3$, 126.24 grams propylene carbonate and 27.98 grams butyl amine were cooled to −20° C. A pre-cooled reaction vessel #1 was purged with N$_2$ and then the propylene carbonate and the PSCl$_3$ were charged, cooled to −20 to −10° C., and placed under strong agitation. 27.98 grams of butyl amine was slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed 60 rpms wherein the surface of the contents was barely moving as the contents were cooled to −10° C. When reaction vessel #1 contents were cooled to −20 to −10° C., began charging 29.56 grams of ammonia to the headspace of the reaction vessel #1 and temperature range was maintained at −20 to 0° C. After 30 minutes of charging ammonia to reaction vessel #1, agitation speed was increase to medium speed. After exotherm associated with the reaction of phosphoryl chlorides and ammonia had subsided, Extra ammonia was charged to the sub-surface of the contents of reaction vessel #1, cooling was removed and contents of reaction vessel #1 were allowed to rise to 40° C. and held for 60 minutes. Contents were heated to 60 to 70° C., then cooled and packaged. Process yielded 251.17 grams (approximately 103.5% of expected yield) of a thick, flowable suspension. The higher than expected yield is the result of excess ammonia that was charged to ensure that all phosphoryl chloride functional groups were eliminated in the final composition.

Example 41

| Rxt ID #: | MCT00 7137 | Lot # | 21K17 |

60.04 grams PSCl$_3$, 145.46 grams propylene carbonate and 33.7 grams butyl amine were cooled to −20° C. A pre-cooled reaction vessel #1 was purged with N$_2$ and then the propylene carbonate and the PSCl$_3$ were charged, cooled to −20 to −10° C., and placed under strong agitation. 33.7 grams of butyl amine was slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed 60 rpms wherein the surface of the contents was barely moving as the contents were cooled to −10° C. When reaction vessel #1 contents were cooled to −20 to −10° C., began charging 33.28 grams of ammonia to the headspace of the reaction vessel #1 and temperature range was maintained at −20 to 0° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40° C. and held for 60 minutes. Contents were heated to 60 to 70° C., then cooled and packaged. Process yielded 269.75 grams (approximately 103% of expected yield) of a very thick suspension. The higher than expected yield is the result of excess ammonia that was charged to ensure that all phosphoryl chloride functional groups were eliminated in the final composition.

Example 42

| Rxt ID #: | MCT00 7139 | Lot # | 21K31 |

60.04 grams PSCl$_3$, 145.46 grams ethyl acetate and 33.7 grams butyl amine were cooled to −20° C. A pre-cooled reaction vessel #1 was purged with N$_2$ and then the propylene carbonate and the PSCl$_3$ were charged, cooled to −20 to −10° C., and placed under strong agitation. 33.7 grams of butyl amine was slowly charged sub-surface of over a two hour period to the contents in the reaction vessel keeping temperature at a range of −20 to −10° C. by utilizing a chilling bath set at −20° C. and adding dry ice as necessary to maintain temperature range. Contents were mixed for 30 minutes, and the agitation speed was then slowed 60 rpms wherein the surface of the contents was barely moving as the contents were cooled to −10° C. When reaction vessel #1 contents were cooled to −20 to −10° C., began charging 29.47 grams of ammonia to the headspace of the reaction vessel #1 and temperature range was maintained at −20 to 0° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40° C. and held for 60 minutes. Contents were heated to 60 to 750 and held for one hour. Process yielded 236.18 grams (approximately 94.95% of expected yield) of a fluid suspension.

Example 42a 200 grams of distilled water was charged to reaction vessel #1, mixed and held at 60° C. for 20 minutes. The reaction vessel #1 contents were then charged to a separatory funnel and allowed to sit for 3 hours. The bottom layer was removed and the top layer was filtered and 196.7 grams were collected. Percent solids were ran on the solution at 70° C. and found to be 18.32%. The resulting recovered solids were calculated to be 36.11 grams or 62.3% of expected recovery. The solid residue was also collected. Wash water was observed to be clear but also to have a strong sulfur odor.

In an embodiment, the lack of deoxygenating the wash water resulted in the breakdown of some of the NBPT resulting in a strong sulfur odor.

Example 43

| Rxt ID #: | MCT00 7140 | Lot # | 21L05 |

62.77 grams PSCl$_3$, 144.5 grams tetrahydrofuran (THF) and 27.1 grams butyl amine were cooled to −20° C. A pre-cooled reaction vessel #1 was purged with N$_2$ and then the THF and the PSCl$_3$ were charged, cooled to −20 to −10° C., and placed under strong agitation. 27.1 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range and increasing agitation from 150 to 450 rpms to maintain fluidity during reaction. Contents were mixed for 30 minutes, and the agitation speed was then slowed 60 rpms wherein the surface of the contents was barely moving as the contents were cooled to −8° C. When reaction vessel #1 contents were cooled to −20 to −0° C., began charging 31.50 grams of ammonia to the headspace of the reaction vessel #1 and temperature range was maintained at −8.4 to 15° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40 to 60° C. and held for 180 minutes.

Example 43a

| Rxt ID #: | MCT00 714101 | Lot # | 21L05 |
| --- | --- | --- | --- |

101.16 grams of distilled, de-oxygenated water were charged to reaction vessel #1 containing 285.86 grams of Ex 45, mixed and held at 60° C. for 20 minutes. The reaction vessel #1 contents were then charged to a separatory funnel and allowed to sit for 3 hours. The bottom layer was removed. Another 70 grams distilled, de-oxygenated water was charged to reaction vessel #1 for rinsing the residuals out and then added to the top layer. The separatory funnel was shaken and the contents allowed to separate. The bottom layer was removed and disposed of, the top layer was filtered and 182 grams were collected. Percent solids were ran on the solution at 70° C. and found to be 26.7%. The resulting recovered solids were calculated to be 47.31 grams or 76.4% of expected recovery. Wash water was observed to be hazy.

33.09 grams of DMSO were added to reaction vessel #1 contents. THF was stripped out up to a temperature of 71° C. and replaced by 0.3 grams of triethanolamine, 10 grams of propylene glycol and 3.92 additional grams of DMSO. Product was clear but dark in color.

Example 44

| Rxt ID #: | MCT00 | 7142 | Lot # | 21L10 |
| --- | --- | --- | --- | --- |

101.16 grams of distilled, de-oxygenated water were charged to reaction vessel #1 containing 238.9 grams of Ex 40, mixed and held at 60° C. for 20 minutes. The reaction vessel #1 contents were then charged to a separatory funnel and allowed to sit for 3 hours. The bottom layer was removed. Another 20 grams distilled, de-oxygenated water was charged to reaction vessel #1 for rinsing the residuals out and then added to the top layer. The separatory funnel was shaken and the contents allowed to separate. The bottom layer was removed and disposed of, the top layer was filtered and 179.49 grams were collected. Percent solids were ran on the solution at 70° C. and found to be 28.83%. The resulting recovered solids were calculated to be 39.11 grams or 66.11% of expected recovery. Wash water was observed to be hazy.

THF was stripped out at a temperature of 40-50° C. and then replaced by 21.05 grams of DMSO, 0.24 grams of triethanolamine, and 2.37 grams of propylene glycol were added to contents Example 45

| Rxt ID #: | MCT00 7143 | Lot # | 21L14 |
| --- | --- | --- | --- |

106.83 grams PSCl$_3$, 214.42 grams ethyl acetate and 46.12 grams butyl amine were cooled to −20° C. A pre-cooled reaction vessel #1 was purged with N$_2$ and then the ethyl acetate and the PSCl$_3$ were charged, cooled to −20 to −10° C., and placed under strong agitation. 46.12 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range and increasing agitation from 360 to 520 rpms to maintain fluidity during reaction. Contents were mixed for 30 minutes, and the agitation speed was then slowed 60 rpms wherein the surface of the contents was barely moving as the contents were cooled to −8° C. When reaction vessel #1 contents were cooled to −20 to −0° C., began charging 53.6 grams of ammonia to the headspace of the reaction vessel #1 and temperature range was maintained at −0 to −10° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed and contents of reaction vessel #1 were allowed to rise to 40 to 50° C. and held for 180 minutes.

84.43 grams of DMSO, 16.72 grams of propylene carbonate and 0.84 gram of triethanolamine were added to reaction vessel #1 and mixed for 15 minutes. 200 grams of distilled, deoxygenated water were added to contents of reaction vessel #1, mixed for 15 minutes and then allowed to sit for three hours. Resulting product did not split and was in fact extremely thick and could not be filtered.

Example 46

| Rxt ID #: | MCT00 7149 | Lot # | 21M08 | rxt SU | 559.3 |
| --- | --- | --- | --- | --- | --- |

50.16 grams PSCl$_3$, 115.48 grams tetrahydrofuran (THF) and 21.66 grams butyl amine were cooled to −20° C. A pre-cooled reaction vessel #1 was purged with N$_2$ and then the THF and the PSCl$_3$ were charged, cooled to −20 to −10° C., and placed under strong agitation. 21.66 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 150 pms to control froth formation during reaction. Contents were mixed for 30 minutes, and the agitation speed was then slowed 114 rpms wherein the surface of the contents was barely moving as the contents were cooled to −11° C. When reaction vessel #1 contents were cooled to −20 to −0° C., began charging 25.17 grams of ammonia to the headspace of the reaction vessel #1 and temperature range was maintained at −15 to −5° C. After 30 minutes of charging ammonia to reaction vessel #1, agitation speed was increase to medium speed. After exotherm associated with the reaction of phosphoryl chlorides and ammonia had subsided, extra ammonia was charged to the sub-surface of the contents of reaction vessel #1, cooling was removed.

Example 46a

Contents of reaction vessel #1 were allowed to rise to 10° C. and held for 30 minutes and then sampled for % NBPT.

Example 46b

Contents of reaction vessel #1 were allowed to rise to 20° C. and held for 30 minutes and then sampled for % NBPT.

Example 46c

Contents of reaction vessel #1 were allowed to rise to 30° C. and held for 30 minutes and then sampled for % NBPT.

Example 47

| Rxt ID #: | MCT00 7150 | Lot # | 21M10 | rxt SU | 568.38 |
| --- | --- | --- | --- | --- | --- |

57.54 grams $PSCl_3$, 132.47 grams tetrahydrofuran (THF) and 24.84 grams butyl amine were cooled to −20° C. A pre-cooled reaction vessel #1 was purged with $N_2$ and then the THF and the $PSCl_3$ were charged, cooled to −20 to −10° C., and placed under strong agitation. 24.84 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 150 pms and increased to 300 rpms over the course of the charge. Contents were mixed for 30 minutes, and the agitation speed was then slowed 100 rpms wherein the surface of the contents was barely moving as the contents were cooled to −11° C. When reaction vessel #1 contents were cooled to −20 to −0° C., began charging 28.87 grams of ammonia to the headspace of the reaction vessel #1 and temperature range was maintained at −15 to −5° C. After exotherm associated with the reaction of phosphoryl chlorides and ammonia had subsided, extra ammonia was charged to the sub-surface of the contents of reaction vessel #1, cooling was removed and agitation was increased to 350 rpms. Temperature was allowed to increase to 30° C. and held for 90 minutes. Contents were weighed and sampled wherein the weight of the contents was 249.43 grams (estimated loss of 40.29 grams related to potential solvent loss)

Example 47a 18.34 grams of distilled, de-oxygenated water were charged to reaction vessel #1 mixed and held at 23° C. for 20 minutes. The reaction vessel #1 contents were then charged to a Buchner funnel and a liquid was removed under vacuum of about 50 mmHg. 78 grams of THF was charged to reaction vessel #1 for rinsing out vessel and the rinse THF was charged to the Buchner funnel and allowed to sit with no vacuum for 30 minutes and then filtered. The liquid of both the first filtration and of the second filtration were added to a stripping flask. The THF was removed at 30-50° C. about 20 mmHg and 35.5 grams of solids were collected.

Example 47b 29.7 grams of DMSO, 3.14 grams of propylene carbonate, and 0.16 grams of triethanolamine were charged to the stripping flask containing Example 47a contents and mixed for 15 minutes and then off loaded and packaged.

Example 48

| Rxt ID #: | MCT00 7150 | Lot # | 21M27 | rxt SU | 620.12 |
| --- | --- | --- | --- | --- | --- |

51.8 grams $PSCl_3$, 119.26 grams tetrahydrofuran (THF) and 22.37 grams butyl amine were cooled to −20° C. A pre-cooled reaction vessel #1 was purged with $N_2$ and then the THF and the $PSCl_3$ were charged, cooled to −20 to −10° C., and placed under strong agitation. 22.37 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 33 pms and increased to 100 rpms over the course of the charge to reduce foam formation. Contents were mixed for 30 minutes, and the agitation speed was then slowed 50 rpms wherein the surface of the contents was barely moving as the contents were cooled to −11° C. When reaction vessel #1 contents were cooled to −20 to −0° C., began charging 26.0 grams of ammonia to the headspace of the reaction vessel #1 and temperature range was maintained at −15 to −5° C. After exotherm associated with the reaction of phosphoryl chlorides and ammonia had subsided, extra ammonia was charged to the sub-surface of the contents of reaction vessel #1, cooling was removed and agitation was increased to 95 rpms. Temperature was allowed to increase to 45° C. and held for 180 minutes. Contents were weighed and sampled wherein the weight of the contents was 215.44 grams.

| Rxt ID #: | MCT00 715201 | Lot # | 22A02 | rxt SU | 620.12 |
| --- | --- | --- | --- | --- | --- |

Example 48a 12.57 grams of 28% ammonium hydroxide were charged to 166.99 grams of Example 48, mixed and held at 40° C. for 20 minutes. The reaction vessel #1 contents were then charged to a Buchner funnel and a liquid was removed under vacuum of about 50 mmHg. 18.15 grams of THF was charged to reaction vessel #1 for rinsing out vessel and the rinse THF was charged to the Buchner funnel and allowed to sit with no vacuum for 30 minutes and then filtered. The liquid of both the first filtration and of the second filtration were added to a stripping flask. The solids content of the collected liquid was 32%.

In an embodiment, the use of ammonium hydroxide for breaking the fused suspension particle results in further converting any residual phosphoryl chloride functional groups to phosphoryl amide groups.

| Rxt ID #: | MCT00 7150 | Lot # | 21M28 | rxt SU | 846.58 |

Example 49

51.48 grams $PSCl_3$, 118.52 grams tetrahydrofuran (THF) and 22.23 grams butyl amine were cooled to −20° C. A pre-cooled reaction vessel #1 was purged with $N_2$ and then the THF and the $PSCl_3$ were charged, cooled to −20 to −10° C., and placed under strong agitation. 22.23 grams of butyl amine was slowly charged sub-surface by a syringe pump with a charge setting of 1 ml/min to the contents in the reaction vessel keeping temperature at a range of −20 to −10° C. by utilizing a chilling bath set at −20° C. and adding dry ice as necessary to maintain temperature range. Agitation was set at 300 rpms. Contents were mixed for 30 minutes, and the agitation speed was then slowed 75 rpms wherein the surface of the contents was barely moving as the contents were cooled to −12° C. When reaction vessel #1 contents were cooled to −20 to −0° C., began charging 25.83 grams of ammonia to the headspace of the reaction vessel #1 and temperature range was maintained at −15 to −5° C. After exotherm associated with the reaction of phosphoryl chlorides and ammonia had subsided, extra ammonia was charged to the sub-surface of the contents of reaction vessel #1, and cooling was removed. Temperature was allowed to increase to 50 to 55° C. and held for 180 minutes. Contents were weighed and sampled wherein the weight of the contents was 206.79 grams.

| Rxt ID #: | MCT00 715201 | Lot # | 22A02 | rxt SU | 620.12 |

Example 49a 14.6 grams of 28% ammonium hydroxide were charged to 193.96 grams of Example 49, mixed and held at 40° C. for 20 minutes. The reaction vessel #1 contents were then charged to a Buchner funnel and a liquid was removed under vacuum of about 50 mmHg. 21.08 grams of THF was charged to reaction vessel #1 for rinsing out vessel and the rinse THF was charged to the Buchner funnel and allowed to sit with no vacuum for 30 minutes and then filtered. The liquid of both the first filtration and of the second filtration were added to a stripping flask. The solids content of the collected liquid was 49.12%.

Example 50

A number of the examples were tested for inhibition performance. The experimental samples were applied to urea using standard overhead mixer with an anchor agitator. The amount of the sample to charge was determined by the specific gravity of the sample times the volumetric treatment level. For example:
Determining the amount of Example 42 to be charged at a rate of 3 quarts/ton of urea:

Specific gravity = 1.08 gm/ml = 9.0 lbs/gal

At an application level of 3 quart/ton of urea=6.75 lbs of Example 42/2000 lbs of urea The application level would be 0.336% of Example 42 200 grams of urea was placed in a vessel, agitation was set so not to sling the urea out of the vessel and the calculated amount of the experimental sample was dripped onto the agitating urea. After completing the sample addition, the urea was agitated for an additional minute to insure uniform coverage.

Example 51

In 143.5 cubic inch plastic containers with a hole in the side large enough for a tube attached Draeger am-5000 meter to be safely inserted, 200 grams of West Texas Soil (Estacado Clay Loam) with a 10% pH of 8 to 9 and a moisture content of 25 to 30%. The surface area of the soil was calculated to 47.8 sq inches. Exactly 0.75 grams of each urea sample was added to the surface of the soil and the plastic container and its hole were sealed. The headspace of each sealed container was analyzed for ppm ammonia by using a Draeger am-5000 meter attached to the tube which was inserted into the plastic container's hole and the pump was engaged 15 minutes pulling the contents of the container's headspace through a NH3 detector. The readings were captured in the Draeger meter and downloaded at the end of sample readings. The total NH3 readings were calculated each day for each sample tested. Charts below show the performance of Examples versus urea and versus a similarly formulated inhibitor sample. The test was repeated after the urea was stored for one month and for two months.

| | Initial Measuring Ammonia Generation | | | | | | | |
|---|---|---|---|---|---|---|---|---|
| | Days Ran | | | | | | | |
| Sample ID | 3 | 4 | 5 | 6 | 7 | 10 | 11 | Total |
| Example 42* | 46 | 0 | 102 | 98 | 90 | 53 | 6 | 395 |
| NBPT | 9 | 10 | 4 | 4 | 14 | 97 | 88 | 226 |
| urea | 1257 | 1263 | 1283 | 980 | 855 | 533 | 222 | 6393 |

*Example 42 was adjusted to a calculated level of 20% and 1% of a colorant for ensuring adequate coating and coverage of the urea particles.

| | One Month Storage Measuring Ammonia Generation | | | | | | | | |
|---|---|---|---|---|---|---|---|---|---|
| | Days Ran | | | | | | | | |
| Sample ID | 3 | 4 | 5 | 6 | 7 | 10 | 11 | 12 | 13 | Total |
| Example 29 | 28 | 37 | 82 | 193 | 325 | 399 | 231 | 55 | 12 | 1362 |
| NBPT | 111 | 51 | 57 | 98 | 236 | 349 | 251 | 301 | 153 | 1607 |
| Urea | 1043 | 1763 | 1351 | 1458 | 1099 | 844 | 650 | 544 | 382 | 9134 |

Two Month Storage
Measuring Ammonia Generation

| Sample ID | Days Ran | | | | | | | | | | Total |
|---|---|---|---|---|---|---|---|---|---|---|---|
| | 1 | 5 | 6 | 7 | 8 | 9 | 13 | 14 | 15 | 16 | |
| Example 29 | 37 | 78 | 5 | 10 | 211 | 337 | 223 | 47 | 116 | 62 | 1089 |
| NBPT | 103 | 99 | 32 | 129 | 159 | 130 | 152 | 66 | 49 | 68 | 884 |
| Urea | 307 | 1196 | 1129 | 1091 | 918 | 798 | 202 | 199 | 125 | 74 | 5732 |

Urea treated with Example 29 had equivalent performance to NBPT in controlling ammonia generation over a two month period.

Example 52

Testing was performed on Example 31 (approximately 25% NBPT) versus N Yield (approximately a 20% NBPT). To compensate for the differences in concentration, N Yield was applied at a 3 quart/ton rate while Example 31 was applied at a 2.67 quart/tone rate Measuring Ammonia Generation

| Sample ID | Days Ran | | | Total |
|---|---|---|---|---|
| | 3 | 4 | 7 | |
| Example 31 | 340 | 234 | 655 | 1229 |
| N Yield | 273 | 131 | 301 | 705 |
| Urea | 202 | 603 | 341 | 1146 |

Example 31 was a suspension that was tested as a urease inhibitor and compared to N Yield. Ammonia generation readings were surprising. Example 31 was performing as a nitrification inhibitor. Testing was conducted to determine if ammonium chloride had nitrification inhibition properties.

Example 53

N Yield was compared to N Yield+NH4Cl

| | wt. in grams | Distilled Water |
|---|---|---|
| Solution of N Yield | 0.25 | 999.75 |
| Solution of NH$_4$Cl | 0.5 | 999.5 |

| N Yield | | N Yield NH4CL | |
|---|---|---|---|
| N Yield solution | 20 | N Yield solution | 20 |

| N Yield | | N Yield NH4CL | |
|---|---|---|---|
| NH$_4$ solution urea | 1.5 | NH$_4$ solution urea | 2 |
| Water | 2 | Water | 1.5 |
| | 23.5 | | 23.5 |
| mix with stir plate | | mix with stir plate | |

Charge 11.75 grams of solution by dropping onto soil sample

Measuring Ammonia Generation

| Sample ID | Days Ran | | | | Total NH3 |
|---|---|---|---|---|---|
| | 3 | 4 | 5 | 6 | |
| N Yield | 241 | 140 | 226 | 186 | 792 |
| N Yield + NH$_4$Cl | 660 | 271 | 303 | 241 | 1475 |

Surprisingly, NH4Cl seemingly was performing as a nitrification inhibitor even in the presence of NBPT.

Example 54

NH4Cl performance as a nitrification inhibitor was compared to dicyandiamide (DCD), a well-known nitrification inhibitor.

| RM | 21L1609 gms | 21L16010 gms |
|---|---|---|
| 34% DCD solution in DMSO | | 24.26 |
| DMSO | 27.71 | 12.50 |
| Ammonium Chloride | 17.00 | |
| Water | 57.68 | 12.94 |
| Liquid Blue Dye | 0.62 | 0.30 |

The compositions were applied to urea at a 4 quart/ton rate.

| Sample ID | 1 | 5 | 6 | 7 | 8 | 9 | 13 | 14 | 15 | 16 | Total |
|---|---|---|---|---|---|---|---|---|---|---|---|
| NH$_4$Cl 21L1609 | 308 | 1586 | 1495 | 1149 | 932 | 727 | 308 | 155 | 53 | 100 | 6505 |
| DCD 21L16010 | 316 | 1346 | 1230 | 1280 | 1,152 | 1,095 | 358 | 99 | — | 49 | 6609 |
| Urea | 307 | 1196 | 1129 | 1091 | 918 | 798 | 202 | 202 | 125 | 74 | 5735 |

NH$_4$Cl performance as a nitrification inhibitor was equivalent to DCD.

Example 55

A few of the Examples were evaluated by HPLC for % NBPT. The following HPLC method was utilized
NBPT Isocratic HPLC Method
1. Diluent=50:50 acetonitrile:water
2. Internal Standard Solution
   To a 200-mL volumetric flask, add the following:
     1.59 g acetanalide.
     Bring to volume with Diluent.
3. Sample:
   To a 100-mL volumetric flask, add the following:
     100 mg NBPT equivalent sample,
     10 mL internal standard (IS) Acetanalide (75 mg/mL).
   For Example:
     26% NBPT Product
     100 mg NBPT
     --------------------=385 mg product weighted 0.26
     Bring to volume with diluent.
     Mix well.
4. Transfer a portion through a Nylon 0.45-μm syringe filter into an HPLC vial.
5. Inject on LC/UV.

HPLC/UV Conditions

Column Information

| | |
|---|---|
| Phase: | Zorbax SB-C18 |
| Diameter: | 4.6 mm |
| Length: | 250 mm |
| Particle Size: | 5 μm |
| Mobile Phase: | 54:46 H$_2$O:ACN |
| Pump: | Shimadzu LC-10AT, 1.0 ml/min Isocratic |
| Autoinjector: | Shimadzu SIL-10AXL |
| Detector Type: | Shimadzu SPD-10A Detector @ 214 nm |
| Controller: | Shimadzu SCL-10A |
| Data Acquisition System: | Empower 2, Build 2154 |
| Volume Injection: | 1 μL |
| Column Oven: | Timberline Instruments; Temperature = 40° C. |
| Average Retention Time: | NBPT = 3.6 min |
| | IS = 4.1 min |
| Run Time: | 15 min |

| Example ID | HPLC results | Expected Results | Process % Yields NBPT |
|---|---|---|---|
| Example 35 | 16.55% | 30% | 55.17% |
| Example 42 | 17.05% | 23.3% | 73.2% |
| Example 29 | 17.8% | 23.3% | 76.39% |

Note:
Samples that utilized propylene carbonate could not be ran as the HPLC solution were not clear due to poor solubilization of the suspended particles that were removed by the Nylon 0.45-μm syringe filter giving unreliable results.

Example 56

86.15 grams PSCl$_3$, 198.35 grams propylene carbonate and 37.2 grams butyl amine were cooled to −20° C. A pre-cooled reaction vessel was purged with N$_2$ and then 198.35 grams propylene carbonate and 86.15 grams PSCl$_3$ were charged under an initial agitation of 300 rpms. 37.2 grams butyl amine were slowly charged sub-surface over a two-hour period to the contents in the reaction vessel keeping temperature at a range of −15 to −5° C. by utilizing a chilling bath set at −30° C. The agitation speed was slowly increased to 500 rpms as the viscosity of the reaction contents increased. After completion of the butyl amine charge, the contents were mixed for 15 minutes and cooled to −10 to −15° C. The agitation speed was then slowed to a level wherein the surface of the reaction was barely moving. With the reaction contents at −10° C. or less, 43.23 grams ammonia was very slowly charged to the headspace of the reaction vessel and the temperature range was maintained at around −10° C. After 30 minutes of charging ammonia to the reaction vessel, the agitation speed was slowly increased from 75 rpms to 150 rpms while ensuring that any exotherm was controlled so as to limit temperature so it remained at or below −5° C. After the exotherm associated with the reaction of phosphoryl chlorides and ammonia had subsided, ammonia was charged at the sub-surface of the reaction contents, the cooling was removed and the contents of reaction vessel #1 were allowed to rise to 95-100° C. and held for 10 minutes, and then cooled to 70° C. for 30 minutes where excess ammonia was charged to ensure complete reaction. The reactor contents were cooled to to 20° C., and then a vacuum was applied to remove excess ammonia. The vacuum was broken with N$_2$ and the contents were then packaged.

Example 56 with Additional Nitrification Inhibitors

| | Example 57 | | Example 58 | | Example 59 | | Example 60 | | Example 61 | |
|---|---|---|---|---|---|---|---|---|---|---|
| RM | gms | % | gms | % | gms | % | gms | % | gms | % |
| Example 56 | 6.00 | 20.0% | 10 | 33.3 | 47.50 | 95.0% | 10.00 | 33.3% | | |
| DMSO | 15.84 | 52.8% | | | | | | | | |
| propylene carbonate | | | 16 | 53.3 | | | | | | |
| Dicyandiamide (DCD) | 8.2 | 27.2% | | | | | 4.0 | 13.3% | 2.4 | 8.0% |
| thiourea | | | | | | | | | | |
| 3,4-dimethyl pyrazole | | | | | | | | | | |
| 2-chloro-6-(trichloromethyl) pyridine | | | 4 | 13.3 | 2.50 | 5.0% | | | | |
| polyphosphoric acid | | | | | | | | | | |

-continued

|  | | | | | | 16.0 | 53.3% | 9.6 | 32.0% |
|---|---|---|---|---|---|---|---|---|---|
| Polyethylene glycol - 300 (PEG 300) | | | | | | | | | |
| Example 59 | | | | | | | | 18.0 | 60.0% |
| desired | 30.0 | | 30.0 | | 50.00 | 30.0 | | 30.0 | |
| Total | 30.0 | 100% | 30.0 | 100% | 50.00  100% | 30.0 | 100% | 30.0 | 100.0% |
| Process | 1) charge DMSO and DCD and heat to 80 C. 2) when clear cool to 20° C. 3) charge Example 56 and mix for 30 minutes and package. | | 1) charge propylene carbonate and 2-chloro-6-(trichloromethyl) pyridine and Example 56, 2) mix for 30 minutes and package. | | 1) Heat Example 56 to 60° C. under agitation. 2) charge 2-chloro-6-(trichloromethyl) pyridine and mix for 30 minutes. 3) cool to 10 - 20° C. and package. | 1) charge PEG 300 and DCD and heat to 80° C. 2) when clear cool to 20° C. 3) charge Example 56 and mix for 30 minutes and package. | | 1) charge PEG 300 and DCD and heat to 80° C. 2) when clear cool to 20° C. 3) charge Example 59 and mix for 30 minutes and package. | |
| Appearance | White and very viscous | | Light Brown | | Slight tan | White | | White | |
| flowability after 24 hrs. | Not flowable, Paste | | very fluid | | fluid | Thick but fluid | | Thick but fluid | |
| stability/7 days | No separation | | Slight clear layer at top of sample- mixing to homogenous suspension | | Slight clear layer at top of sample- mixing to homogenous suspension | homogenous suspension | | homogenous suspension | |
| 1% dispersibility rating in water | 4 | | 1 | | 1 | 10 | | 10 | |

|  | Example 62 | | Example 63 | | Example 64 | | Example 65 | | Example 66 | |
|---|---|---|---|---|---|---|---|---|---|---|
| RM | gms | % | gms | % | gms | % | gms | % | gms | % |
| Example 56 | 100.00 | 100.0% | 10.00 | 33.3% | 9.84 | 32.8% | 10.00 | 33.3% | 34.48 | 34.5% |
| propylene glycol | | | | | | | 16.00 | 53.33% | | |
| DMSO | | | | | | | | | | |
| propylene carbonate | | | 16.00 | 53.3% | 15.74 | 52.5% | | | | |
| Dicyandiamide (DCD) | | | | | | | | | 12.41 | 12.4% |
| thiourea | | | | | | | 4.00 | 13.33% | | |
| 3,4-dimethyl pyrazole (DMP) | | | 4.00 | 13.33% | 3.93 | 13.11% | | | | |
| 2-chloro-6-(trichloromethyl) pyridine | | | | | | | | | 3.45 | 3.45% |
| polyphosphoric acid | | | | | 0.09 | 1.6% | | | | |
| Polyethylene glycol - 300 (PEG 300) | | | | | | | | | 49.66 | 49.7% |
| Example 59 | | | | | | | | | | |
| Desired | 100.00 | | 30.00 | | 30.00 | | 30.00 | | 100.00 | |
| Total | 100.00 | 100.0% | 30.00 | 100% | 30.00 | 100% | 30.00 | 100% | 100.00 | 100% |
| Process | 1) Cool to 10 to 20° C. 2) Pour into lab mall mill simulator. 3) charge 25 grams of 3 mm glass media. (run simulator at 40 rpms for 30 minutes | | 1) charge propylene carbonate and DMP and heat to 60° C. 2) when clear cool to <40° C. 3) charge Example 56 and mix for 30 minutes and package. | | 1) charge propylene carbonate and DMP and heat to 60° C. 2) when clear cool to <40° C. and adjust pH to 5.5-6.5 with polyphos. 3) charge Example 56 and mix for 30 minutes and package. | | 1) charge propylene glycol and thiourea and heat to 80° C. 2) when clear cool to <40° C. 3) charge Example 56 and mix for 30 minutes and package. | | 1) charge PEG 300 and DCD and heat to 80° C. 2) when clear cool to 60° C. and charge and 2-chloro-6-(trichloromethyl) pyridine and mix until clear. 3) cool to <40° C. and charge Example 56 4) mix for 30 minutes and package. | |

| | | | | |
|---|---|---|---|---|
| Appearance | White | White | White | Light whitish yellow | White |
| flowability after 24 hrs. | very fluid | very fluid | very fluid | very fluid | Good fluidity |
| stability/7 days | No noticeable separations | some larger particles on bottom | some larger particles on bottom, signs of instability | Slight clear layer at top of sample- mixing to homogenous suspension | homogenous suspension |
| 1% dispersibility rating in water | 2 | 1 | 1 | 9.5 | 10 |

Rating
1 = large particles and clinging to glass surface
10 = a solution

Charging of additional nitrification inhibitors shows that pre-dispersed nitrification inhibitors that do not contain DMSO demonstrate good suspension properties with little or no separation after 7 days. DMP-based systems showed the poorest stability. Adding DMP to the suspension at 50° C. was unstable. Pre-dispersing DMP in an organic liquid, even with a small amount of phosphoric acid to did not improve stability. The solution of 20% DCD in PEG 300 resulted in the best stability and smoothest suspension, although slightly thicker than desired. Addition of additional organic liquids to Example 60 and Example 66 is expected to result in lower viscosity. The DCD/DMSO solution formed a thick, non-flowable sample. Without being bound by theory, it is believed that the DMSO caused the suspension to thicken due to the swelling of the DMSO soluble NBPT.

The dispersibility of the fluid suspension composition comprising additional nitrification inhibitors improved when the additional nitrification inhibitors were pre-dispersed in organic liquids that possesses water miscible properties, such as propylene glycol and polyethylene glycol 300. Examples 60, 65, and 66 were instantly dispersed into a solution or a colloid. This is a desirable property that ensures a more homogeneous distribution of inhibitors within animal waste.

Example 67

Examples were chilled to −20° C. and checked for fluidity:

| Example Number | Fluidity Rating |
|---|---|
| Example 56 | Extremely fluid |
| Example 58 | Extremely fluid |
| Example 59 | Fluid |
| Example 60 | Poorly fluid |
| Example 61 | Thick but fluid |
| Example 63 | Fluid |
| Example 65 | Extremely Fluid |
| Example 66 | Fluid but slightly thick |

Although Example 60 and Example 66 were thicker than the other samples, all were fluid at −20° C. This should allow for the use of this invention during cold winter days.

Example 68

Viscosities of the samples were measured @25° C. on a Brookfield viscometer with spindle #63 @60 RPMs

| Example Number | Viscosity |
|---|---|
| Example 56 | 158 cps |
| Example 58 | 60 cps |
| Example 60 | 1200 cps |
| Example 63 | 60 cps |
| Example 65 | 140 cps |
| Example 66 | 288 cps |

The lower viscosities examples demonstrated poorer suspension stability as the clear layer was larger. However, the examples showing a slight clearing at the top were returned to a smooth, homogeneous suspension upon slight mixing. The difference in viscosity between Example 60 and Example 66 was surprising but may have been due to the processes used, wherein the temperature of the DCD solution in Example 60 was thick at 20° C. wherein the temperature used in Example 66 was just below 40° C.

Example 69

Example 69 evaluated the impact of 4% additional organic liquids on stability, water solubility and flowability of Example 56. Stability was determined by the measurement of the top clear layer after 3 days @50° C. Flowability was determined by measuring the elapsed time that it took for 4 grams of the 5 gram sample to flow out of a container with a 0.9 cm opening @25° C.

A 1% dispersibility of each sample was examined by adding 1 gram of the sample to 99 grams of water. It is well-known that NBPT is poorly soluble in water (0.43% by weight solubility in water) and therefore the addition of small amounts of various organic liquids and surfactants was used to determine their impact on Example 56.

| 4% Organic Liquid added to Example 56 | Clear layer (cm) | seconds | 1% dispersibility in water rating |
|---|---|---|---|
| Example 56 (control) | 0.4 | 3.07 | 2 |
| Glycerin | 0.4 | 2.35 | 6 |
| Tridecyl alcohol −6 moles EO | 0.45 | 3.7 | 1 |
| Polyethylene glycol methoxy capped, molecular weight 550 | 0.5 | 4.45 | 4 |
| Polyethylene glycol, molecular weight 600 | 0.4 | 2.6 | 4 |
| Triethanolamine | 0.25 | 2.24 | 2 |
| EO/PO Glycol (Pluronic L-61) | 0.4 | 4.04 | 1 |
| Polypropylene glycol, molecular weight 425 | 0.4 | 9.07 | 1 |
| Tripropylene glycol methoxy capped | 0.2 | 2.54 | 3 |
| Triethylphosphate | 0.4 | 4.03 | 6 |

-continued

| 4% Organic Liquid added to Example 56 | Clear layer (cm) | seconds | 1% dispersibility in water rating |
|---|---|---|---|
| N-methyl pyrrolidone | 0.45 | 2.49 | 3 |
| Dimethyl sulfoxide | 0 | 20.3 | 4 |
| Polyaspartate ammonium salt in DMSO | 0 | 12.64 | 8 |
| 2-ethylhexyl-2 EO phosphate K+ salt | 0.45 | 8.8 | 9.5 |
| 2,2-dimethyl-1,3-dioxolane-4-methanol | 0.3 | 3.85 | 6 |

Rating: 1 = large particles, clinging to glass surface 10 = solution

It was expected that dilution of the fluid suspension with various organic liquids would increase the top clear layer (reduce stability) and reduce the viscosity slightly (improve flowability). Overall, Example 56 has good stability with only a 0.4 cm clear layer. The impact of the addition of 4% organic liquid on the size of the clear layer was marginal with the exception of DMSO and the Polyaspartate ammonium salt in DMSO. Both samples showed no separation and lower flowability. Not to be bound by theory, this was thought to be due to the increase in viscosity caused by the DMSO swelling the NBPT part of the fused particles as ammonium chloride is very poorly soluble in DMSO.

Dispersibility of the fluid suspension composition in water is a desirable property as animal waste typically contains a large amount of water. Because of the poor solubility of NBPT in water, several organic liquids were added to Example 56 at a 4% level to determine which organic liquids could improve dispersibility. Poor dispersibility would result in poor performance as particles of undissolved urease inhibitors would not be homogeneously spread through the animal waste. Several of the organic liquids evaluated were known to be good solvents for NBPT, but they did not dramatically improve Example 56's dispersibility in water. However, a few of the organic liquids tested did improve Example 56's dispersibility in water significantly (i.e., 2,2-dimethyl-1,3-dioxolane-4-methanol, glycerin, triethyl phosphate) while two anionic organic liquids (2-ethylhexyl-2 EO phosphate K+ salt and Polyaspartate ammonium salt in DMSO) resulted in dispersions that were very close to solutions.

In an embodiment, fluid suspension compositions can undergo mechanical processes to reduce inhibitor particle size, which in turn improves storage stability of said fluid suspension compositions. In a variation, the fluid suspension composition may be processed through a ball mill to mechanically reduce the inhibitor particle size to improve one or more of its physical properties. In a variation, the one or more physical properties improved are selected from the group consisting of:
  a) reducing viscosity,
  b) improving the smoothness and homogeneity of fluid suspension compositions,
  c) improving the smoothness and homogeneity of fluid suspension compositions when stored, and
  d) improving homogeneity of delivery of fluid suspension compositions to animal waste.

In an embodiment, the fluid suspension compositions are dissolved in an aqueous composition, wherein the aqueous composition comprises a) water and b) one or more organic liquids selected from the group consisting of i) organic liquid system one, ii) organic liquid system two, iii) organic liquid system three, and iv) combinations thereof. In a variation, the aqueous composition is applied directly to animal waste. In another variation, the aqueous composition is applied directly to said animal waste by one or more methods selected from the group consisting of a) an automated spraying system, b) a metering system, c) a manual sprayer and d) combinations thereof. All of these systems slow down the biological degradation of urea and ammonium ions, resulting in the stabilization of a nitrogen value of animal waste while simultaneously decreasing the formation of $N_2O$.

In an embodiment, the present invention relates to a composition comprising a) animal waste and b) a fluid suspension composition, wherein said fluid suspension composition comprises: i) one or more reaction products of one or more phosphoryl chloride functionalities reacting with one or more nitrogenous compounds within ii) a reaction medium. In a variation, said reaction medium comprises organic liquid system one, wherein said organic liquid system one comprises one or more aprotic liquids. In another variation, said one or more aprotic liquids are of low volatility and are not reactive with said one or more phosphoryl chloride functionalities.

In an embodiment, said one or more phosphoryl chloride functionalities comprise one or more of a) phosphorous trichloride ($PCl_3$), b) phosphoryl trichloride ($POCl_3$), or c) thiophosphoryl trichloride ($PSCl_3$).

In an embodiment, said one or more nitrogenous compounds are selected from the group consisting of a) one or more alkylamines selected from the group consisting of i) one or more monoalkyl amines, and ii) one or more dialkyl amines, and b) ammonia and/or ammonium hydroxide.

In a variation, the one or more monoalkyl amines or the one or more dialkyl amines have alkyl functionalities selected from the group consisting of (a) —$C_1H_3$, (b) —$C_2H_5$, (c) —$C_3H_7$, (d) —$C_4H_9$, (e) —$C_5H_{11}$, (f) —$C_6H_5$, and (g) —$C_6H_{13}$. In a variation, said alkyl functionalities comprise one or more members selected from the group consisting of a) a linear alkyl functionality, b) a branched alkyl functionality, and c) combinations thereof.

In an embodiment, the alkyl functionalities of said one or more dialkyl amines are selected from the group consisting of (a) —$C_1H_3$, (b) —$C_2H_5$, (c) —$C_3H_7$, (d) —$C_4H_9$, and (e) —$C_5H_{11}$. In a variation, said alkyl functionalities of said one or more dialkyl amines comprise one or more members selected from the group consisting of a) a linear alkyl functionality, b) a branched alkyl functionality, and c) combinations thereof.

In an embodiment, said one or more reaction products comprise one or more members selected from the group consisting of a) one or more nitrogenous phosphoryl particles, b) one or more chloride salt particles, c) one or more fused particles, and d) combinations thereof. In a variation, said one or more fused particles comprise a) said one or more nitrogenous phosphoryl particles and b) said one or more chloride salt particles, wherein the chloride salt particles adhere to a surface of the one or more nitrogenous phosphoryl particles.

In an embodiment, said one or more nitrogenous phosphoryl particles comprise one or more urease inhibitor particles. In a variation, said one or more urease inhibitor particles comprise one or more alkyl thiophosphoric triamide particles. In another variation, said one or more alkyl thiophosphoric triamide particles comprise NBPT (N-(n-butyl) thiophosphoric triamide) particles.

In an embodiment, said one or more chloride salt particles comprise ammonium chloride. In an embodiment, ammonium chloride is a nitrification inhibitor. In a variation, the one or more chloride salt particles further comprise one or more cations of said one or more chloride salt particles, and wherein said one or more cations are selected from the group consisting of a) one or more metal cations selected from the group consisting of i) Na, ii) K, iii) Mg, iv) Ca, v) Fe, vi) Zn, vii) Mn, viii) Cu, ix) Co, x) Mo, xi) Ni, and xii) combinations thereof.

In an embodiment, the fluid suspension composition further comprises a) one or more additional nitrification inhibitors, b) a denitrification inhibitor and c) combinations thereof.

In an embodiment, said one or more additional nitrification inhibitors comprise one or more members selected from the group consisting of a) 2-chloro-6-(trichloromethyl)pyridine, b) 4-amino-1,2,4-triazole-HCI, c) 2,4-diamino-trichloromethyltriazine CL-1580, d) dicyandiamide (DCD), e) thiourea, f) 1-mercapto-1,2,4-triazole, g) ammonium thiosulfate, h) one or more dimethyl pyrazole salts selected from the group consisting of (i) organic salts, (ii) inorganic salts and (iii) combinations thereof and i) 2-amino-4-chloro-6-methylpyrimidine and combinations thereof.

In an embodiment, said one or more aprotic liquids are selected from the group consisting of: a) one or more alkylene carbonates selected from the group consisting of i) ethylene carbonate, ii) propylene carbonate and iii) butylene carbonate b) one or more trialkyl phosphates of structure:

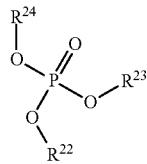

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$
c) one or more polyols capped with a $C_1$-$C_6$ organic acid wherein of the one or more polyols comprise: (i) ethylene glycol, (ii) 1,3 propylene glycol, (iii) 1,2 propylene glycol, (iv) butylene glycol, (v) trimethylol propane, (vi) trimethylol ethane, (vii) pentaerythritol, (viii) sorbitol, (ix) sorbitan, (x) glucose, (xi) fructose, (xii) galactose and (xiii) glycerin, d) one or more alkylene glycol alkyl ether acetates selected from the group consisting of (i) dipropylene glycol methyl ether acetate, (ii) tripropylene glycol methyl ether acetate, and (iii) tripropylene glycol butyl ether acetate, e) one or more diesters selected from the group consisting of: dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate, f) one or more fatty acid alkyl esters comprising a fatty acid functionality and an alkyl functionality wherein the fatty acid functionality comprises $C_8$-$C_{18}$ fatty acids and wherein the alkyl functionality is one or more $C_1$-$C_6$ alkyl radicals, and g) one or more dialkylene glycol dialkyl ethers of structure:

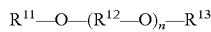

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$,
and n is 1 to 10.

In an embodiment, the composition further comprises organic liquid system two, wherein said organic liquid system two comprises one or more organic liquids selected from the group consisting of a) one or more alkanols selected from the group consisting of $C_1$-$C_{10}$ alkanols, b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin, c) one or more polyalkylene glycols selected from the group consisting of poly($C_1$-$C_{10}$ alkylene) glycols, d) one or more dioxolane compound selected from the group consisting of i) 2,2-dimethyl-1,3-dioxolane-4-methanol and ii) 2,2-diisobutyl-1,3-dioxolane-4-methanol, e) one or more alkylene glycol alkyl ethers of structure:

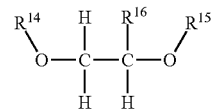

wherein
$R^{14}$ is one or more members selected from the group consisting of $CH_3$, $C_2H_5$, $C_3H_7$, $C_6H_5$, and $C_4H_9$,
$R^{15}$ is one or more members selected from the group consisting of H and

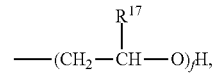

wherein
$R^{17}$ is one or more members selected from the group consisting of H and $CH_3$,
and f is an integer between 1 and 15, and
$R^{16}$ is one or more members selected from the group consisting of H and $CH_3$,
f) one or more alkyl lactates selected from the group consisting of i) ethyl lactate, ii) propyl lactate and iii) butyl lactate, g) one or more alkanolamines of structure:

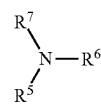

wherein
$R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$,
$R^6$ is one or more members selected from the group consisting of H, $CH_3$, $C_2H_5$, $C_2H_4OR^8$ and $C_3H_6OH$,
$R^7$ is one or more members selected from the group consisting of H, $C_2H_4OR^8$ and $C_3H_6OH$,
wherein
$R^8$ is $(C_2H_4O)_gH$ wherein
g is an integer between 1 and 10,
h) glycerol carbonate, i) dimethyl sulfoxide, j) N-methyl pyrrolidone, and k) combinations thereof.

In an embodiment, said fluid suspension composition further comprises one or more members selected from the group consisting of a) one or more colorants, b) b) one or more buffers, c) one or more fragrance/odor masking agents, d) one or more micro-nutrients, and e) organic liquid system three, wherein said organic liquid system three comprises one or more surfactants, comprising one or more functionalities selected from the group consisting of a) one or more anionic functionalities, b) one or more cationic functionalities, c) one or more ampholytic functionalities, d) one or more amphoteric functionalities, e) one or more nonionic functionalities, and f) combinations thereof.

In an embodiment, said fluid suspension composition is applied directly to said animal waste by one or more methods selected from the group consisting of: a) an automated spraying system, b) a metering system, c) a manual sprayer and d) combinations thereof, to slow down the biological degradation of urea and ammonium ions, resulting in stabilization of a nitrogen value of animal waste while simultaneously decreasing formation of $N_2O$.

All references cited herein are incorporated by reference in their entireties for all purposes including the following references.

| | |
|---|---|
| 9,637,420 | McKnight |
| 9,650,306 | McKnight |
| 10,633,300 | McKnight |
| 10,974,999 | McKnight |
| 11,312,667 | McKnight |
| 6,802,882 | Barth |
| 20190169081 | McKnight |

It should be understood that the present invention is not to be limited by the above description. Modifications can be made to the above without departing from the spirit and scope of the invention. It is contemplated and therefore within the scope of the present invention that any feature that is described above can be combined with any other feature that is described above. Moreover, it should be understood that the present invention contemplates minor modifications that can be made to the formulations, compositions, fertilizer additives and methods of the present invention. When ranges are discussed, any number that may not be explicitly disclosed but fits within the range is contemplated as an endpoint for the range. For example, if a range of 35-60 is given, it should be understood, that any number between 35 and 60 can be used as the end point for said range (e.g., 36, 37, 38, etc.). Moreover, if a list of species within a genus are listed, it is contemplated that any particular species or any group of species within the genus is contemplated as being a subgenus that fits within the scope of the invention. The scope of protection to be afforded is to be determined by the claims which follow and the breadth of interpretation which the law allows.

We claim:

1. A composition comprising:
    a) animal waste, and
    b) a fluid suspension composition;
wherein said fluid suspension composition comprises: i) one or more reaction products of one or more phosphoryl chloride functionalities reacting with one or more nitrogenous compounds within ii) a reaction medium; wherein said reaction medium comprises organic liquid system one;
wherein said organic liquid system one comprises one or more aprotic liquids, and
wherein properties of said one or more aprotic liquids are a) boiling point of greater than 160° C., b) have a flashpoint greater than 145° F. c) environmentally safe, d) safe for contact with humans and animals, e) serves as the delivery system or components of a delivery system that delivers the desired nitrogenous compound to the surface of a substrate, f) does not degrade the one or more nitrogenous phosphoryl compounds, and g) are not reactive with said one or more phosphoryl chloride functionalities.

2. The composition of claim 1, wherein said one or more reaction products comprise one or more members selected from the group consisting of a) one or more nitrogenous phosphoryl particles, b) one or more chloride salt particles, c) one or more fused particles, and d) combinations thereof.

3. The composition of claim 2, wherein said one or more nitrogenous phosphoryl particles comprise one or more urease inhibitor particles.

4. The composition of claim 3, wherein said one or more urease inhibitor particles comprise one or more alkyl thiophosphoric triamide particles.

5. The composition of claim 4, wherein said one or more alkyl thiophosphoric triamide particles comprise NBPT (N-(n-butyl) thiophosphoric triamide) particles.

6. The composition of claim 2, wherein said one or more chloride salt particles comprise ammonium chloride, and wherein ammonium chloride is a nitrification inhibitor.

7. The composition of claim 6, wherein the one or more chloride salt particles further comprise one or more cations of said one or more chloride salt particles, and wherein said one or more cations are selected from the group consisting of a) one or more metal cations selected from the group consisting of i) Na, ii) K, iii) Mg, iv) Ca, v) Fe, vi) Zn, vii) Mn, viii) Cu, ix) Co, x) Mo, xi) Ni, and xii) combinations thereof.

8. The composition of claim 2, wherein said one or more fused particles comprise a) said one or more nitrogenous phosphoryl particles and b) said one or more chloride salt particles, wherein the chloride salt particles adhere to a surface of the one or more nitrogenous phosphoryl particles.

9. The composition of claim 1, wherein said one or more nitrogenous compounds are selected from the group consisting of a) one or more alkylamines selected from the group consisting of i) one or more monoalkyl amines, and ii) one or more dialkyl amines, b) ammonia, c) ammonium hydroxide, and d) mixtures thereof.

10. The composition of claim 9, wherein the alkyl functionality of the one or more alkylamines are selected from the group consisting of (a) —$C_1H_3$, (b) —$C_2H_5$, (c) —$C_3H_7$, (d) —$C_4H_9$, (e) —$C_5H_{11}$, (f) —$C_6H_5$, and (g) —$C_6H_{13}$.

11. The composition of claim 10, wherein said alkyl functionalities comprise one or more members selected from the group consisting of a) a linear alkyl functionality, b) a branched alkyl functionality, and c) combinations thereof.

12. The composition of claim 1, wherein the fluid suspension composition further comprises a) one or more additional nitrification inhibitors, b) a denitrification inhibitor and c) combinations thereof.

13. The composition of claim 12, wherein said one or more additional nitrification inhibitors comprise one or more members selected from the group consisting of a) 2-chloro-6-(trichloromethyl) pyridine, b) 4-amino-1,2,4-triazole-HCl, c) 2,4-diamino-trichloromethyltriazine CL-1580, d) dicyandiamide (DCD), e) thiourea, f) 1-mercapto-1,2,4-triazole, g)

ammonium thiosulfate, h) one or more dimethyl pyrazole salts selected from the group consisting of (i) organic salts, (ii) inorganic salts and (iii) combinations thereof and i) 2-amino-4-chloro-6-methylpyrimidine and combinations thereof.

14. The composition of claim 1, wherein said one or more phosphoryl chloride functionalities comprise one or more members selected from the group consisting of a) phosphorous trichloride ($PCl_3$), b) phosphoryl trichloride ($POCl_3$), c) thiophosphoryl trichloride ($PSCl_3$), and d) mixtures thereof.

15. The composition of claim 1, wherein said one or more aprotic liquids are selected from the group consisting of: a) one or more alkylene carbonates selected from the group consisting of i) ethylene carbonate, ii) propylene carbonate and iii) butylene carbonate b) one or more trialkyl phosphates of structure:

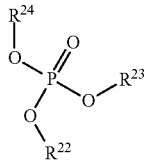

wherein:
$R^{22}$ is alkyl radical —$C_1H_3$ to —$C_6H_{13}$
$R^{23}$ is alkyl radical —$C_1H_3$ to —$C_6H_{13}$
$R^{24}$ is alkyl radical —$C_1H_3$ to —$C_6H_{13}$ c) one or more polyols capped with a $C_1$-$C_6$ organic acid wherein of the one or more polyols comprise: (i) ethylene glycol, (ii) 1,3 propylene glycol, (iii) 1,2 propylene glycol, (iv) butylene glycol, (v) trimethylol propane, (vi) trimethylol ethane, (vii) pentaerythritol, (viii) sorbitol, (ix) sorbitan, (x) glucose, (xi) fructose, (xii) galactose and (xiii) glycerin, d) one or more alkylene glycol alkyl ether acetates selected from the group consisting of (i) dipropylene glycol methyl ether acetate, (ii) tripropylene glycol methyl ether acetate, and (iii) tripropylene glycol butyl ether acetate, e) one or more diesters selected from the group consisting of: (i) $C_1$-$C_6$ dialkylsuccinate, (ii) $C_1$-$C_6$ dialkyladipate, (iii) $C_1$-$C_6$ dialkylmethylglutarate, (iv) $C_1$-$C_6$ dialkyl glutarate, (v) $C_1$-$C_6$ dialkyl ethylsuccinate, and (vi) $C_1$-$C_6$ dialkyl maleate, f) one or more fatty acid alkyl esters comprising a fatty acid functionality and an alkyl functionality wherein the fatty acid functionality comprises $C_8$-$C_{18}$ fatty acids and wherein the alkyl functionality is one or more $C_1$-$C_6$ alkyl radicals, and g) one or more dialkylene glycol dialkyl ethers of structure:

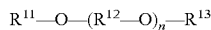

wherein:
$R^{11}$ is one or more alkyl radicals selected from the group consisting of $C_1$ to $C_6$,
$R^{12}$ is one or more alkylene radicals selected from the group consisting of $C_1$ to $C_4$,
$R^{13}$ is one or more alkyl radicals selected from the group consisting of $C_1$ to $C_6$, and n is 1 to 10.

16. The composition of claim 1, wherein the composition further comprises organic liquid system two, wherein said organic liquid system two comprises one or more organic liquids selected from the group consisting of a) one or more alkanols selected from the group consisting of $C_1$-$C_{10}$ alkanols, b) one or more polyols selected from the group consisting of i) trimethylol propane, ii) trimethylol ethane, iii) pentaerythritol, iv) sorbitol, v) sorbitan, vi) glucose, vii) fructose, viii) galactose, and ix) glycerin, c) one or more polyalkylene glycols selected from the group consisting of poly ($C_1$-$C_{10}$ alkylene) glycols, d) one or more dioxolane compound selected from the group consisting of i) 2,2-dimethyl-1,3-dioxolane-4-methanol and ii) 2,2-diisobutyl-1,3-dioxolane-4-methanol, e) one or more alkylene glycol alkyl ethers of structure:

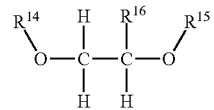

wherein
$R^{14}$ is one or more members selected from the group consisting of $CH_3$, $C_2H_5$, $C_3H_7$, $C_6H_5$, and $C_4H_9$,
$R^{15}$ is one or more members selected from the group consisting of H and

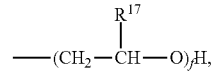

wherein
$R^{17}$ is one or more members selected from the group consisting of H and $CH_3$,
and f is an integer between 1 and 15, and
$R^{16}$ is one or more members selected from the group consisting of H and $CH_3$, f) one or more alkyl lactates selected from the group consisting of i) ethyl lactate, ii) propyl lactate and iii) butyl lactate, g) one or more alkanolamines of structure:

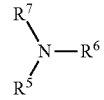

wherein
$R^5$ is one or more members selected from the group consisting of $CH_3$, $C_2H_5$, $C_2H_4OR^8$, $C(CH_3)_2CH_2OH$, $CH(C_2H_5)CH_2OH$, $CH_3CH(OH)CH_2$, and $C_3H_6OH$,
$R^6$ is one or more members selected from the group consisting of H, $CH_3$, $C_2H_5$, $C_2H_4OR^8$ and $C_3H_6OH$,
$R^7$ is one or more members selected from the group consisting of H, $C_2H_4OR^8$ and $C_3H_6OH$,
wherein
$R^8$ is $(C_2H_4O)_gH$
wherein
g is an integer between 1 and 10,
h) glycerol carbonate, i) dimethyl sulfoxide, j) N-methyl pyrrolidone, and k) combinations thereof.

17. The composition of claim 1, wherein said fluid suspension composition further comprises one or more members selected from the group consisting of a) one or more colorants, b) b) one or more buffers, c) one or more fragrance/odor masking agents, d) one or more micronutrients, and e) organic liquid system three, wherein said organic liquid system three comprises one or more surfactants, comprising one or more functionalities selected from the group consisting of a) one or more anionic functionalities, b) one or more cationic functionalities, c) one or more ampholytic functionalities, d) one or more amphoteric functionalities, e) one or more nonionic functionalities, and f) combinations thereof.

18. The composition of claim 1, wherein said fluid suspension composition is configured for direct application to said animal waste by one or more methods selected from the group consisting of: a) an automated spraying system, b) a metering system, c) a manual sprayer, and d) combinations thereof, to slow down the biological degradation of urea and ammonium ions, resulting in stabilization of a nitrogen value of animal waste while simultaneously decreasing formation of $N_2O$.

19. The composition of claim 1, wherein said fluid suspension composition can further comprise water, wherein the fluid suspension is dispersed in water before being applied to animal waste.

20. The composition of claim 1, wherein said fluid suspension composition can undergo mechanical processes to reduce inhibitor particle size to improve one or more physical properties selected from the group consisting of:
  a) improving storage stability
  b) reducing viscosity,
  c) improving the smoothness and homogeneity of fluid suspension compositions,
  d) improving the smoothness and homogeneity of fluid suspension compositions when stored, and
  e) improving homogeneity of delivery of fluid suspension compositions to animal waste.

* * * * *